US012762253B2

(12) United States Patent
Rahman et al.

(10) Patent No.: US 12,762,253 B2
(45) Date of Patent: *Oct. 13, 2026

(54) DYNAMIC MULTI-MODEL MONITORING AND VALIDATION FOR ARTIFICIAL INTELLIGENCE MODELS

(71) Applicant: Citibank, N.A., New York, NY (US)

(72) Inventors: Sofia Rahman, New York, NY (US); James Myers, New York, NY (US); Prashant Praveen, New York, NY (US); Shardul Malviya, London (GB); Wayne Liao, London (GB); Deepak Jain, London (GB); Samantha Cory, London (GB); Mariusz Saternus, Cracow (PL); Daniel Lewandowski, Cracow (PL); Biraj Krushna Rath, London (GB); Stuart Murray, London (GB); Philip Davies, London (GB); Payal Jain, London (GB); Tariq Husayn Maonah, London (GB); Vishal Mysore, Mississauga (CA); Ramkumar Ayyadurai, Jersey City, NJ (US); Chamindra Desilva, London (GB); William Franklin Cameron, Jacksonville, FL (US); Miriam Silver, Tel Aviv (IL); Prithvi Narayana Rao, Allen, TX (US); Pramod Goyal, Ahmedabad (IN); Manjit Rajaretnam, Irving, TX (US)

(73) Assignee: CITIBANK, N.A., New York, NY (US)

(*) Notice: Subject to any disclaimer, the term of this patent is extended or adjusted under 35 U.S.C. 154(b) by 33 days.

This patent is subject to a terminal disclaimer.

(21) Appl. No.: 19/182,585

(22) Filed: Apr. 18, 2025

(65) Prior Publication Data

US 2025/0245351 A1 Jul. 31, 2025

Related U.S. Application Data

(63) Continuation of application No. 18/947,102, filed on Nov. 14, 2024, now Pat. No. 12,299,140, and a
(Continued)

(51) Int. Cl.
*G06F 21/57* (2013.01)
*G06F 11/3668* (2025.01)
(Continued)

(52) U.S. Cl.
CPC .......... *G06F 21/577* (2013.01); *G06F 21/552* (2013.01)

(58) Field of Classification Search
CPC .. G06F 21/577; G06F 21/552; G06F 11/3688; G06F 11/3692; G06F 11/3684;
(Continued)

(56) References Cited

U.S. PATENT DOCUMENTS 8,347,147 B2 1/2013 Adiyapatham et al.
8,380,817 B2 2/2013 Okada
(Continued)

FOREIGN PATENT DOCUMENTS

CN 106502890 A 3/2017
CN 115796299 A 3/2023
(Continued)

OTHER PUBLICATIONS

International Search Report and Written Opinion Received in Application No. PCT/US25/24939, dated Jul. 30, 2025, 12 pages.
(Continued)

*Primary Examiner* — Darren B Schwartz
(74) *Attorney, Agent, or Firm* — Ashurst Perkins Coie US LLP

(57) ABSTRACT

The systems and methods disclosed herein receives artifacts generated using a first set of models within a multi-model
(Continued)

superstructure. The multi-model superstructure includes a second set of models to test the first set of models. The multi-model superstructure dynamically routes the artifacts of the first set of models to one or more models of the second set of models by (i) determining a set of dimensions of the artifacts against which to evaluate the artifacts and (ii) identifying the models in the second set used to test the particular dimension. The second set of models then assesses each artifact against a set of assessment metrics. If an artifact fails to meet one or more assessment metrics, the second set of models generates actions to align the artifact with the set of assessment metrics.

20 Claims, 18 Drawing Sheets

Related U.S. Application Data continuation-in-part of application No. 18/782,019, filed on Jul. 23, 2024, now Pat. No. 12,197,859, which is a continuation-in-part of application No. 18/771,876, filed on Jul. 12, 2024, now Pat. No. 12,204,323, application No. 19/182,585 is a continuation-in-part of application No. 18/739,111, filed on Jun. 10, 2024, now Pat. No. 12,223,063, said application No. 18/661,532 is a continuation-in-part of application No. 18/661,519, filed on May 10, 2024, now Pat. No. 12,106,205, said application No. 18/771,876 is a continuation-in-part of application No. 18/661,532, filed on May 10, 2024, now Pat. No. 12,111,747, said application No. 18/947,102 is a continuation-in-part of application No. 18/653,858, filed on May 2, 2024, now Pat. No. 12,198,030, which is a continuation-in-part of application No. 18/637,362, filed on Apr. 16, 2024, now Pat. No. 12,111,754, said application No. 18/661,532 is a continuation-in-part of application No. 18/633,293, filed on Apr. 11, 2024, now Pat. No. 12,147,513, said application No. 18/739,111 is a continuation-in-part of application No. 18/607,141, filed on Mar. 15, 2024, now Pat. No. 12,608,486, which is a continuation of application No. 18/399,422, filed on Dec. 28, 2023, now Pat. No. 12,367,292, which is a continuation-in-part of application No. 18/327,040, filed on May 31, 2023, now Pat. No. 11,874,934, which is a continuation-in-part of application No. 18/114,194, filed on Feb. 24, 2023, now Pat. No. 11,763,006, which is a continuation-in-part of application No. 18/098,895, filed on Jan. 19, 2023, now Pat. No. 11,748,491.

(51) Int. Cl.

| | |
|---|---|
| ***G06F 21/55*** | (2013.01) |
| ***G06N 3/044*** | (2023.01) |
| ***G06N 3/045*** | (2023.01) |
| ***G06N 3/047*** | (2023.01) |
| ***G06N 3/0475*** | (2023.01) |
| ***G06N 3/08*** | (2023.01) |
| ***G06N 3/082*** | (2023.01) |
| ***G06N 3/084*** | (2023.01) |
| ***G06N 3/088*** | (2023.01) |
| ***G06N 3/094*** | (2023.01) |
| ***G06N 3/096*** | (2023.01) |
| ***G06N 3/0985*** | (2023.01) |
| ***G06N 5/02*** | (2023.01) |
| ***G06N 5/022*** | (2023.01) |
| ***G06N 20/00*** | (2019.01) |
| ***G06N 20/20*** | (2019.01) |

(58) Field of Classification Search
CPC ........ G06N 3/044; G06N 3/045; G06N 3/047; G06N 3/0475; G06N 3/08; G06N 3/082; G06N 3/084; G06N 3/088; G06N 3/094; G06N 3/096; G06N 3/0985; G06N 5/02; G06N 5/022; G06N 20/00; G06N 20/20
See application file for complete search history.

(56) References Cited

U.S. PATENT DOCUMENTS

| | | | | |
|---|---|---|---|---|
| 8,387,020 | B1 | 2/2013 | Maclachlan et al. | |
| 9,842,045 | B2 | 12/2017 | Heorhiadi et al. | |
| 10,324,827 | B2 | 6/2019 | Narayanan et al. | |
| 10,426,442 | B1 | 10/2019 | Schnorr | |
| 10,620,988 | B2 | 4/2020 | Lauderdale et al. | |
| 10,764,150 | B1 | 9/2020 | Hermoni et al. | |
| 10,943,067 | B1 | 3/2021 | Brown et al. | |
| 10,949,337 | B1 | 3/2021 | Yalla et al. | |
| 10,951,485 | B1 | 3/2021 | Hermoni et al. | |
| 11,042,647 | B1 | 6/2021 | Joyce et al. | |
| 11,106,801 | B1 | 8/2021 | Levine et al. | |
| 11,133,942 | B1 | 9/2021 | Griffin | |
| 11,153,177 | B1 | 10/2021 | Hermoni et al. | |
| 11,164,078 | B2 | 11/2021 | Jin et al. | |
| 11,227,047 | B1 | 1/2022 | Vashisht et al. | |
| 11,227,187 | B1 | 1/2022 | Weinberger | |
| 11,271,822 | B1 | 3/2022 | Hermoni et al. | |
| 11,328,068 | B1 | 5/2022 | Niedzwiedz et al. | |
| 11,410,136 | B2 | 8/2022 | Cook et al. | |
| 11,449,798 | B2 | 9/2022 | Olgiati et al. | |
| 11,470,106 | B1 | 10/2022 | Lin et al. | |
| 11,503,075 | B1 | 11/2022 | Sirianni et al. | |
| 11,516,158 | B1 | 11/2022 | Luzhnica et al. | |
| 11,516,222 | B1 | 11/2022 | Srinivasan et al. | |
| 11,521,716 | B2 | 12/2022 | Vianu et al. | |
| 11,573,848 | B2 | 2/2023 | Linck et al. | |
| 11,620,481 | B2 * | 4/2023 | Givental | G06F 18/214 706/22 |
| 11,636,027 | B2 | 4/2023 | Sloane | |
| 11,652,839 | B1 | 5/2023 | Aloisio et al. | |
| 11,656,852 | B2 | 5/2023 | Mazurskiy | |
| 11,681,811 | B1 | 6/2023 | Dixit | |
| 11,683,333 | B1 | 6/2023 | Dominessy et al. | |
| 11,706,241 | B1 | 7/2023 | Cross et al. | |
| 11,720,686 | B1 | 8/2023 | Cross et al. | |
| 11,734,418 | B1 | 8/2023 | Epstein | |
| 11,750,717 | B2 | 9/2023 | Walsh et al. | |
| 11,853,418 | B2 * | 12/2023 | Bean | G06F 21/566 |
| 11,875,123 | B1 | 1/2024 | Ben David et al. | |
| 11,875,130 | B1 * | 1/2024 | Bosnjakovic | G06F 40/35 |
| 11,893,341 | B2 | 2/2024 | Itani | |
| 11,924,027 | B1 | 3/2024 | Mysore et al. | |
| 11,947,435 | B2 | 4/2024 | Boulineau et al. | |
| 11,960,386 | B2 | 4/2024 | Indani et al. | |
| 11,960,515 | B1 | 4/2024 | Pallakonda et al. | |
| 11,983,806 | B1 | 5/2024 | Ramesh et al. | |
| 11,990,139 | B1 | 5/2024 | Sandrew | |
| 11,995,412 | B1 | 5/2024 | Mishra | |
| 12,001,462 | B1 | 6/2024 | Madisetti et al. | |
| 12,001,463 | B1 | 6/2024 | Pallakonda et al. | |
| 12,026,599 | B1 | 7/2024 | Lewis et al. | |
| 12,028,368 | B1 | 7/2024 | Cohen et al. | |
| 12,061,970 | B1 | 8/2024 | Lo et al. | |
| 12,106,205 | B1 | 10/2024 | Jain et al. | |
| 12,111,747 | B1 | 10/2024 | Jain et al. | |
| 12,111,754 | B1 | 10/2024 | Mysore et al. | |
| 12,135,949 | B1 | 11/2024 | Cameron et al. | |
| 12,147,513 | B1 | 11/2024 | Jain et al. | |
| 12,149,553 | B1 | 11/2024 | Fly et al. | |
| 12,149,558 | B1 | 11/2024 | Brown et al. | |
| 12,155,781 | B1 | 11/2024 | Helfgott et al. | |
| 12,182,258 | B2 | 12/2024 | Stokes et al. | |
| 12,198,030 | B1 | 1/2025 | Mysore et al. | |

(56) References Cited

U.S. PATENT DOCUMENTS

2003/0007178 A1 1/2003 Jeyachandran et al.
2004/0098454 A1 5/2004 Trapp et al.
2005/0166094 A1 7/2005 Blackwell et al.
2005/0204348 A1 9/2005 Horning et al.
2006/0095918 A1 5/2006 Hirose
2007/0067848 A1 3/2007 Gustave et al.
2010/0275263 A1 10/2010 Bennett et al.
2010/0313189 A1 12/2010 Beretta et al.
2014/0137257 A1 5/2014 Martinez et al.
2014/0258998 A1 9/2014 Adl-tabatabai et al.
2014/0297954 A1 10/2014 Clevenger
2016/0103996 A1 4/2016 Salajegheh et al.
2017/0061132 A1 3/2017 Hovor et al.
2017/0262164 A1 9/2017 Jain et al.
2017/0295197 A1 10/2017 Parimi et al.
2018/0020021 A1 1/2018 Gilmore et al.
2018/0089252 A1 3/2018 Long et al.
2018/0095866 A1 4/2018 Narayanan et al.
2018/0239903 A1 8/2018 Bodin et al.
2018/0307894 A1 10/2018 Lim et al.
2018/0343114 A1 11/2018 Ben-ari
2019/0079854 A1 3/2019 Lassance Oliveira E Silva et al.
2019/0188706 A1 6/2019 Mccurtis
2019/0236661 A1 8/2019 Hogg et al.
2019/0286816 A1 9/2019 Fu
2020/0012493 A1 1/2020 Sagy
2020/0043164 A1 2/2020 Fuchs et al.
2020/0074470 A1 3/2020 Deshpande et al.
2020/0153855 A1 5/2020 Kirti et al.
2020/0219009 A1 7/2020 Dao et al.
2020/0233979 A1 7/2020 Tahmasebi Maraghoosh et al.
2020/0259852 A1 8/2020 Wolff et al.
2020/0309767 A1 10/2020 Loo et al.
2020/0314191 A1 10/2020 Madhavan et al.
2020/0334326 A1 10/2020 Zhang et al.
2020/0349054 A1 11/2020 Dai et al.
2020/0349466 A1 11/2020 Hoogerwerf et al.
2020/0380118 A1 12/2020 Miller et al.
2020/0387608 A1 12/2020 Miller et al.
2021/0012486 A1 1/2021 Huang et al.
2021/0049288 A1 2/2021 Li
2021/0089941 A1 3/2021 Chen et al.
2021/0097433 A1 4/2021 Olgiati et al.
2021/0133182 A1 5/2021 Anderson et al.
2021/0185094 A1 6/2021 Waplington et al.
2021/0211431 A1 7/2021 Albero et al.
2021/0256125 A1 8/2021 Miller et al.
2021/0264547 A1 8/2021 Li
2021/0273957 A1 9/2021 Boyer et al.
2021/0390465 A1 12/2021 Werder et al.
2022/0004923 A1 1/2022 Kamkar et al.
2022/0050928 A1 2/2022 Shukla et al.
2022/0114251 A1 4/2022 Guim Bernat et al.
2022/0114399 A1 4/2022 Castiglione et al.
2022/0147636 A1 5/2022 Mahuli et al.
2022/0164732 A1 5/2022 Brannon et al.
2022/0166789 A1 5/2022 Murray et al.
2022/0179906 A1 6/2022 Desai et al.
2022/0188460 A1 6/2022 Hadar et al.
2022/0191236 A1 6/2022 Henderson
2022/0198304 A1 6/2022 Szczepanik et al.
2022/0201042 A1 6/2022 Crabtree et al.
2022/0210200 A1 6/2022 Crabtree et al.
2022/0210202 A1 6/2022 Crabtree et al.
2022/0222089 A1 7/2022 Joshi et al.
2022/0224702 A1 7/2022 Dherange et al.
2022/0224723 A1 7/2022 Crabtree et al.
2022/0237565 A1 7/2022 Dzierzanowski et al.
2022/0286438 A1 9/2022 Burke et al.
2022/0294789 A1 9/2022 Tikhomirov et al.
2022/0303302 A1 9/2022 Hwang et al.
2022/0311681 A1 9/2022 Palladino et al.
2022/0318654 A1 10/2022 Lin et al.
2022/0327620 A1 10/2022 Ndoutoumou
2022/0334818 A1 10/2022 Mcfarland
2022/0342846 A1 10/2022 Kunchakarra et al.
2022/0345457 A1 10/2022 Jeffords et al.
2022/0358023 A1 11/2022 Moser et al.
2022/0366140 A1 11/2022 Saito et al.
2022/0368728 A1 11/2022 Murray et al.
2022/0377093 A1 11/2022 Crabtree et al.
2022/0398149 A1 12/2022 Mcfarland et al.
2022/0400135 A1 12/2022 Gamra
2022/0414213 A1 12/2022 Dixit
2022/0414536 A1 12/2022 M L et al.
2022/0417274 A1 12/2022 Madanahalli et al.
2023/0007039 A1 1/2023 Waplington
2023/0009999 A1 1/2023 Higuchi et al.
2023/0018960 A1 1/2023 Ardel
2023/0019072 A1 1/2023 Okunlola
2023/0028339 A1 1/2023 Sloane
2023/0032686 A1 2/2023 Williams et al.
2023/0033317 A1 2/2023 Lin et al.
2023/0035321 A1 2/2023 Vijayaraghavan
2023/0039855 A1 2/2023 Greene
2023/0052608 A1 2/2023 Wattiau et al.
2023/0067128 A1 3/2023 Engelberg et al.
2023/0071264 A1 3/2023 Hakala et al.
2023/0076372 A1 3/2023 Engelberg et al.
2023/0076795 A1 3/2023 Indani et al.
2023/0077527 A1 3/2023 Sarkar
2023/0113621 A1 4/2023 Griffin et al.
2023/0114719 A1 4/2023 Thomas et al.
2023/0117962 A1 4/2023 Kaimal et al.
2023/0118388 A1 4/2023 Crabtree et al.
2023/0123314 A1 4/2023 Crabtree et al.
2023/0132703 A1 5/2023 Marsenic et al.
2023/0135660 A1 5/2023 Chapman et al.
2023/0148116 A1 5/2023 Stokes et al.
2023/0164158 A1 5/2023 Fellows et al.
2023/0169397 A1 6/2023 Smith et al.
2023/0171282 A1 6/2023 Bollinger
2023/0177441 A1 6/2023 Durvasula et al.
2023/0177613 A1 6/2023 Crabtree et al.
2023/0186175 A1 6/2023 Usatov et al.
2023/0205888 A1 6/2023 Tyagi et al.
2023/0205891 A1 6/2023 Yellapragada et al.
2023/0208869 A1 6/2023 Bisht et al.
2023/0208870 A1 6/2023 Yellapragada et al.
2023/0208871 A1 6/2023 Yellapragada et al.
2023/0229542 A1 7/2023 Watkins et al.
2023/0252393 A1 8/2023 Orzechowski et al.
2023/0259860 A1 8/2023 Sarkar
2023/0269272 A1 8/2023 Dambrot et al.
2023/0274003 A1* 8/2023 Liu ....................... G06F 21/577 726/26
2023/0274089 A1 8/2023 Tunstall-pedoe et al.
2023/0316003 A1 10/2023 Friedman et al.
2023/0359789 A1 11/2023 Andre et al.
2023/0362200 A1 11/2023 Crabtree et al.
2023/0396641 A1 12/2023 Hebbagodi et al.
2023/0412635 A1 12/2023 Binyamini et al.
2024/0012734 A1 1/2024 Lee et al.
2024/0020538 A1 1/2024 Socher et al.
2024/0054233 A1 2/2024 Ohayon et al.
2024/0054249 A1 2/2024 Loubet Moundi et al.
2024/0095077 A1 3/2024 Singh et al.
2024/0095463 A1 3/2024 Leary et al.
2024/0111960 A1 4/2024 Earle et al.
2024/0129345 A1 4/2024 Kassam et al.
2024/0146734 A1 5/2024 Southgate et al.
2024/0202442 A1 6/2024 Saito et al.
2024/0202539 A1 6/2024 Poirier et al.
2024/0242040 A1 7/2024 Cogswell et al.
2024/0256678 A1 8/2024 Thompson
2024/0273306 A1 8/2024 Somaiya et al.
2024/0330466 A1 10/2024 Constable et al.
2024/0333741 A1 10/2024 Abdelrahman et al.
2024/0338387 A1 10/2024 Iscen et al.
2024/0346283 A1 10/2024 Ayachitula et al.
2024/0364749 A1 10/2024 Crabtree et al.
2024/0370476 A1 11/2024 Madisetti et al.
2024/0385614 A1* 11/2024 Morris ............... G05B 23/0294
2024/0403428 A1 12/2024 Lal et al.

(56) References Cited

U.S. PATENT DOCUMENTS

| | | | |
|---|---|---|---|
| 2024/0403437 A1 | 12/2024 | Szigeti et al. | |
| 2024/0403445 A1 | 12/2024 | Straub et al. | |
| 2024/0406145 A1 | 12/2024 | Crabtree et al. | |
| 2024/0411896 A1 | 12/2024 | Myers et al. | |
| 2024/0414211 A1 | 12/2024 | Boyer et al. | |
| 2025/0029042 A1* | 1/2025 | Bronevetsky | G06Q 10/0635 |
| 2025/0142373 A1* | 5/2025 | Harris | H04W 24/02 |

FOREIGN PATENT DOCUMENTS

| | | |
|---|---|---|
| CN | 116775837 A | 9/2023 |
| CN | 117391216 A | 1/2024 |
| CN | 117453915 A | 1/2024 |
| CN | 117633174 B | 6/2024 |
| CN | 118170874 A | 6/2024 |
| WO | 2021160499 A1 | 8/2021 |
| WO | 2022125803 A1 | 6/2022 |
| WO | 2022135973 A1 | 6/2022 |
| WO | 2023161630 A1 | 8/2023 |
| WO | 2024020416 A1 | 1/2024 |

OTHER PUBLICATIONS

Meike Nauta et al., 'From Anecdotal Evidence to Quantitative Evaluation Methods: A Systematic Review on Evaluating Explainable AI', arXiv:2201.08164v3, pp. 1-43, Feb. 24, 2023.

Extended European Search Report issued Sep. 2, 2025, in EP Application No. 25169838.7 (13 pages).

AI Risk Management Framework NIST, retrieved on Jun. 17, 2024, https://www.nist.gov/itl/ai-risk-management-framework.

Empower Your Team with a Compliance Co-Pilot, Sedric, retrieved on Sep. 25, 2024. https://www.sedric.ai/.

Independent analysis of AI language models and API providers. Artificial Analysis, retrieved on Jun. 13, 2024, https://artificialanalysis.ai/, 11 pages.

What is AI Verify?, AI Verify Foundation, Jun. 11, 2024, 3 pages, https://aiverifyfoundation.sg/.

Aka et al., Measuring Model Biases in the Absence of Ground Truth, AIES '21, May 19-21, 2021, Virtual Event, USA.; pp. 327-335 (Year: 2021).

Brown, D., et al., "The Great AI Challenge: We Test Five Top Bots on Useful, Everyday Skills," The Wall Street Journal, published May 25, 2024.

Brown, Nik Bear, "Enhancing Trust in LLMs: Algorithms for Comparing and Interpreting LLMs", Arxiv ID: 2406.01943 Publication Date: Jun. 3, 2024, pp. 1-58. (Year: 2024).

Chen, Kua, et at, Automated Domain Modeling with Large Language Models: A Comparative Study, 2023 ACM/IEEE 26th International Conference on Model Driven Engineering Languages and Systems (MODELS) (2023, pp. 162-172) (Year: 2023).

Cranium, Adopt & Accelerate AI Safely, retrieved on Nov. 7, 2024, from https://cranium.ai/.

Dakhel et al, Apr. 2024, "Effective test generation using pre-trained Large Language Models and mutation testing" (Year: 2024).

Do et al., Apr. 3, 2024, "Automatic Prompt Selection for Large Language Models" (Year: 2024).

Dong, Y., et al., "Building Guardrails for Large Language Models," https://ar5iv.labs.arxiv.org/html/2402.01822v1, published May 29, 2024, 20 pages.

Futurism, "Sam Altman Admits That OpenAl Doesn't Actually Understand How Its AI Works", Jun. 11, 2024, 4 pages, https://futurism.com/sam-altman-admits-openai-understand-ai.

Generative machine learning models; IPCCOM000272835D, Aug. 17, 2023. (Year: 2023).

Guldimann, P., et al. "COMPL-AI Framework: A Technical Interpretation and LLM Benchmarking Suite for the EU Artificial Intelligence Act," arXiv:2410.07959v1 [cs.CL] Oct. 10, 2024, 38 pages.

Hu, Q., J., et al., "Routerbench: A Benchmark for Multi-LLM Routing System," arXiv:2403.12031v2 [cs.LG] Mar. 28, 2024, 16 pages.

International Search Report and Written Opinion received in Application No. PCT/US24/47571, dated Dec. 9, 2024, 10 pages.

Kojima, Takeshi, et al. "Large Language Models are Zero-Shot Reasoners," 36th Conference on Neural Information Processing Systems (NeurIPS 2022), arXiv:2205.11916 [cs.CL], Jan. 29, 2023, 42 pages.

Lai et al., Towards a Science of Human-Al Decision Making: A Survey of Empirical Studies, arXiv:2112.11471v1 [cs.AI] Dec. 21, 2021; Total pp. 36 (Year: 2021).

Malode, 2023, "Benchmarking public large language model" (Year: 2023).

Mathews, A. W., "What AI Can Do in Healthcare—and What It Should Never Do," The Wall Street Journal, published on Aug. 21, 2024, retrieved on Sep. 5, 2024 https://www.wsj.com.

Mavrepis, P., et al., "XAI for All: Can Large Language Models Simplify Explainable AI?," https://arxiv.org/abs/2401.13110, Jan. 23, 2024, 10 pages.

Mollick, E., "Latent Expertise: Everyone is in R&D," One Useful Thing, published on Jun. 20, 2024, https://www.oneusefulthing.org/p/latent-expertise-everyone-is-in-r.

Nauta, M., et al., "From Anecdotal Evidence to Quantative Evaluation Methods: A Systematic Review of Evaluating Explainable AI" ACM Computing Surveys, vol. 55 No. 13s Article 295, 2023 [retrieved Jul. 3, 2024].

Naveed et al, 2023, "A Comprehensive Overview of Large Language Models" (Year: 2023).

Peers, M., "What California AI Bill Could Mean," The Briefing, published and retrieved Aug. 30, 2024, 8 pages, https://www.theinformation.com/articles/what-california-ai-bill-could-mean.

Schick et al., Toolformer: Language Models Can Teach Themselves to Use Tools, 37th Conference on Neural Information Processing Systems (NeurIPS 2023); Total pp. 13 (Year: 2023).

Wang, Yudong, et al., "Exploring Activation Patterns of Parameters in Language Models", Arxiv ID: 2405.17799 Publication Date: May 27, 2024, pp. 1-23. (Year: 2024).

Wei, Jason, et al. "Chain-of-Thought Prompting Elicits Reasoning in Large Language Models," 36th Conference on Neural Information Processing Systems (NeurIPS 2022), arXiv:2201.11903 [cs.CL], Jan. 10, 2023, 43 pages.

Yuan et al., R-Judge: Benchmarking Safety Risk Awareness for LLM Agents, arXiv:2401.10019v1 [cs.CL] Jan. 18, 2024; Total pp. 23 (Year: 2024).

Zhao, H., et al., "Explainability for Large Language Models: A Survey," https://arxiv.org/abs/2309.01029, Nov. 28, 2024, 38 pages.

Zhou, Y., Liu, Y., Li, X., Jin, J., Qian, H., Liu, Z., Li, C., Dou, Z., Ho, T., & Yu, P. S. (2024). Trustworthiness in Retrieval-Augmented Generation Systems: A Survey. ArXiv./abs/2409.10102.

"Singapore launches Project Moonshot", a generative Artificial Intelligence testing toolkit to address LLM safety and security challenges, https://www.imda.gov.sg/resources/press-releases-factsheets-and-speeches/press-releases/2024/sg-launches-project-moonshot, May 31, 2024, 8 pages.

Aggarwal, Nitin, KPIs for gen AI: Why measuring your new Al is essential to its success, https://cloud.google.com/transform/kpis-for-gen-ai-why-measuring-your-new-ai-is-essential-to-its-success.

Anthrop/C, Mapping the Mind of a Large Language Model, https://www.anthropic.com/research/mapping-mind-language-model, May 21, 2024.

Claburn, Thomas, OpenAI's GPT-4 can exploit real vulnerabilities by reading security advisories, The Register, https://www.theregister.com/2024/04/17/gpt4_can_exploit_real_vulnerabilities/?utm_source=tldrai, Apr. 17, 2024, 3 pages.

Marshall, Andrew, Threat Modeling AI/ML Systems and Dependencies, Nov. 2, 2022, 27 pages.

Roose, Kevin, "A.I. Has a Measurement Problem", The New York Times, Apr. 15, 2024, 5 pages.

Roose, Kevin, "A.I.'s Black Boxes Just Got a Little Less Mysterious", The New York Times, May 21, 2024, 5 pages.

Shah, Harshay, Decomposing and Editing Predictions by Modeling Model Computation, arXiv:2404.11534v1 [cs.LG] Apr. 17, 2024.

(56) References Cited

OTHER PUBLICATIONS

Shankar, Ram, "Failure Modes in Machine Learning", Nov. 2019, 14 pages.
International Search Report and Written Opinion received in Application No. PCT/US25/24406, dated Jul. 18, 2025, 10 pages.
Sumuk Shashidhar et al., 'Democratizing LLMs: An Exploration of Cost-Performance Trade-offs in Self-Refined Open-Source Models', arXiv:2310.07611v2, pp. 1-15, Oct. 2023.
Yang Liu et al., 'Trustworthy LLMs: a Survey and Guideline for Evaluating Large Language Models' Alignment', arXiv:2308.05374v2, pp. 1-81, Mar. 2024.

* cited by examiner

DYNAMIC MULTI-MODEL MONITORING AND VALIDATION FOR ARTIFICIAL INTELLIGENCE MODELS

CROSS-REFERENCE TO RELATED APPLICATION(S)

This application is a continuation of U.S. patent application Ser. No. 18/947,102 entitled "DYNAMIC MULTI-MODEL MONITORING AND VALIDATION FOR ARTIFICIAL INTELLIGENCE MODELS" filed Nov. 14, 2024, which is a continuation-in-part of U.S. patent application Ser. No. 18/653,858 entitled "VALIDATING VECTOR CONSTRAINTS OF OUTPUTS GENERATED BY MACHINE LEARNING MODELS" filed on May 2, 2024, which is a continuation-in-part of U.S. patent application Ser. No. 18/637,362 entitled "DYNAMICALLY VALIDATING AI APPLICATIONS FOR COMPLIANCE" filed on Apr. 16, 2024.

This application is further a continuation-in-part of U.S. patent application Ser. No. 18/782,019 entitled "IDENTIFYING AND ANALYZING ACTIONS FROM VECTOR REPRESENTATIONS OF ALPHANUMERIC CHARACTERS USING A LARGE LANGUAGE MODEL" and filed Jul. 23, 2024, which is a continuation-in-part of U.S. patent application Ser. No. 18/771,876 entitled "MAPPING IDENTIFIED GAPS IN CONTROLS TO OPERATIVE STANDARDS USING A GENERATIVE ARTIFICIAL INTELLIGENCE MODEL" and filed Jul. 12, 2024, which is a continuation-in-part of U.S. patent application Ser. No. 18/661,532 entitled "DYNAMIC INPUT-SENSITIVE VALIDATION OF MACHINE LEARNING MODEL OUTPUTS AND METHODS AND SYSTEMS OF THE SAME" and filed May 10, 2024, which is a continuation-in-part of U.S. patent application Ser. No. 18/661,519 entitled "DYNAMIC, RESOURCE-SENSITIVE MODEL SELECTION AND OUTPUT GENERATION AND METHODS AND SYSTEMS OF THE SAME" and filed May 10, 2024, and is a continuation-in-part of U.S. patent application Ser. No. 18/633,293 entitled "DYNAMIC EVALUATION OF LANGUAGE MODEL PROMPTS FOR MODEL SELECTION AND OUTPUT VALIDATION AND METHODS AND SYSTEMS OF THE SAME" and filed Apr. 11, 2024. The content of the foregoing applications is incorporated herein by reference in their entirety.

This application is further a continuation-in-part of U.S. patent application Ser. No. 18/739,111 entitled "END-TO-END MEASUREMENT, GRADING AND EVALUATION OF PRETRAINED ARTIFICIAL INTELLIGENCE MODELS VIA A GRAPHICAL USER INTERFACE (GUI) SYSTEMS AND METHODS" and filed Jun. 10, 2024, which is a continuation-in-part of U.S. patent application Ser. No. 18/607,141 entitled "GENERATING PREDICTED END-TO-END CYBER-SECURITY ATTACK CHARACTERISTICS VIA BIFURCATED MACHINE LEARNING-BASED PROCESSING OF MULTI-MODAL DATA SYSTEMS AND METHODS" filed on Mar. 15, 2024, which is a continuation-in-part of U.S. patent application Ser. No. 18/399,422 entitled "PROVIDING USER-INDUCED VARIABLE IDENTIFICATION OF END-TO-END COMPUTING SYSTEM SECURITY IMPACT INFORMATION SYSTEMS AND METHODS" filed on Dec. 28, 2023, which is a continuation of U.S. patent application Ser. No. 18/327,040 (now U.S. Pat. No. 11,874,934) entitled "PROVIDING USER-INDUCED VARIABLE IDENTIFICATION OF END-TO-END COMPUTING SYSTEM SECURITY IMPACT INFORMATION SYSTEMS AND METHODS" filed on May 31, 2023, which is a continuation-in-part of U.S. patent application Ser. No. 18/114,194 (now U.S. Pat. No. 11,763,006) entitled "COMPARATIVE REAL-TIME END-TO-END SECURITY VULNERABILITIES DETERMINATION AND VISUALIZATION" filed Feb. 24, 2023, which is a continuation-in-part of U.S. patent application Ser. No. 18/098,895 (now U.S. Pat. No. 11,748,491) entitled "DETERMINING PLATFORM-SPECIFIC END-TO-END SECURITY VULNERABILITIES FOR A SOFTWARE APPLICATION VIA GRAPHICAL USER INTERFACE (GUI) SYSTEMS AND METHODS" filed Jan. 19, 2023.

BACKGROUND

Artificial intelligence (AI) models often operate based on extensive and enormous training models. The models include a multiplicity of inputs and how each should be handled. When the model receives a new input, the model produces an output based on patterns determined from the data the model was trained on. A large language model (LLM) is a language model notable for its ability to achieve general-purpose language generation and other natural language processing tasks such as classification. LLMs can be used for text generation, a form of generative AI (e.g., GenAI, GAI), by taking an input text and repeatedly predicting the next token or word. LLMs acquire these abilities by learning statistical relationships from text documents during a computationally intensive self-supervised and semi-supervised training process. Generative AI models, such as LLMs, are increasing in use and applicability over time. However, generative AI models risk being exploited by cyber attackers due to the model(s)' reliance on learned patterns and data. Cyber attackers can exploit vulnerabilities in the models by identifying and manipulating the specific data points or patterns the models have been trained on, which can be particularly damaging in the context of high-risk fields such as financial compliance.

Figure 1:
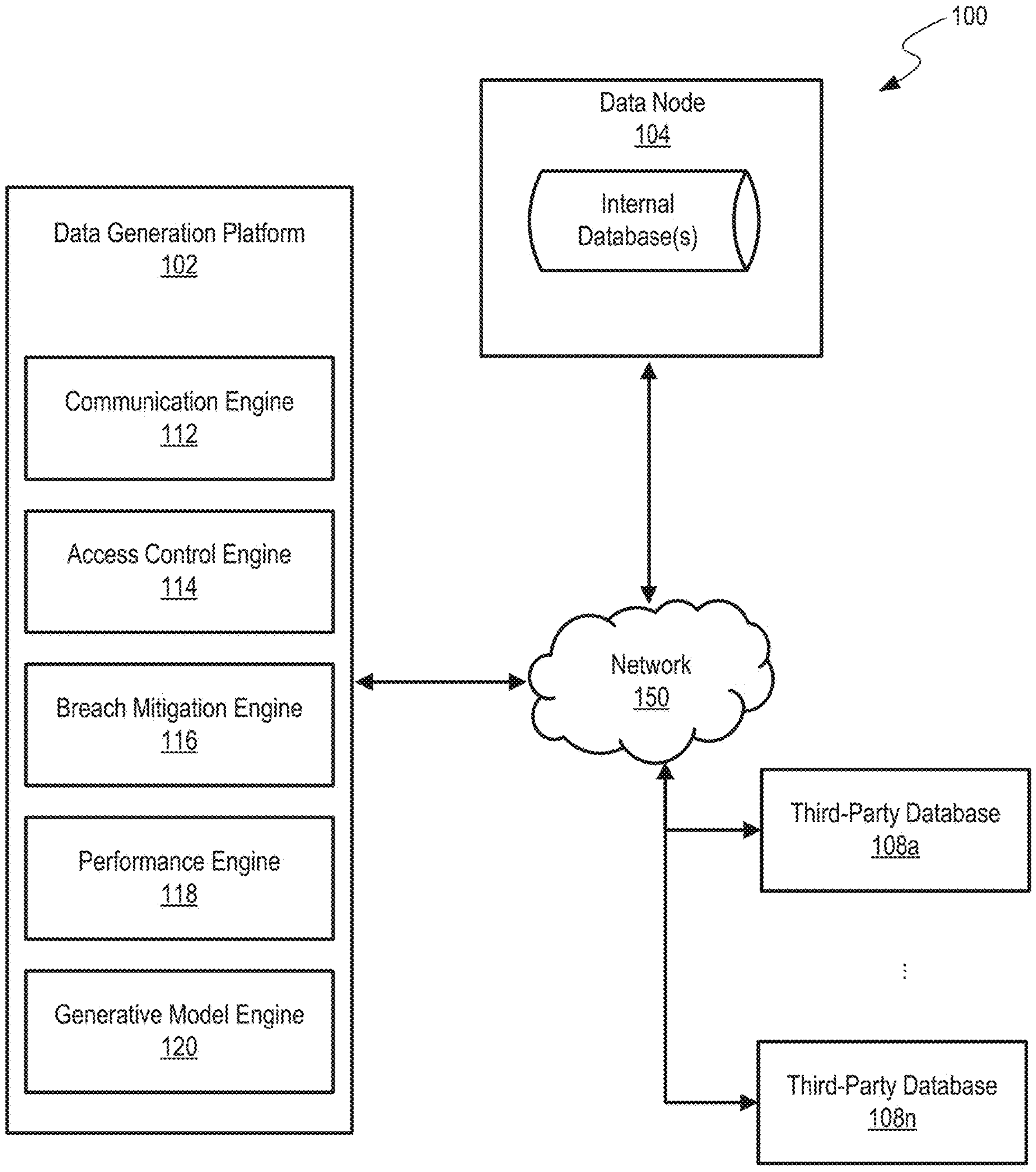
FIG. 1 shows an illustrative environment for evaluating language model prompts and outputs for model selection and validation, in accordance with some implementations of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Pre-existing LLMs and other generative machine learning models are promising for a variety of natural language processing and generation applications. In addition to generating human-readable, verbal outputs, pre-existing systems can leverage LLMs to generate technical content, including software code, architectures, or code patches based on user prompts, such as in the case of a data analysis or software development pipeline. Based on particular model architectures and training data used to generate or tune LLMs, such models can exhibit different performance characteristics, specializations, performance behaviors, and attributes.

However, users or services of pre-existing software development systems (e.g., data pipelines for data processing and model or application development) do not have intuitive, consistent, or reliable ways to select particular LLM models and/or design associated prompts in order to solve a given problem (e.g., to generate a desired code associated with a particular software application). As such, pre-existing systems risk selection of sub-optimal (e.g., relatively inefficient and/or insecure) generative machine learning models. Furthermore, pre-existing software development systems do not control access to various system resources or models. Moreover, pre-existing development pipelines do not validate outputs of the LLMs for security breaches in a context-dependent, and flexible manner. Code generated through an LLM can contain an error or a bug that can cause system instability (e.g., through loading the incorrect dependencies). Some generated outputs can be misleading or unreliable (e.g., due to model hallucinations or obsolete training data). Additionally or alternatively, some generated data (e.g., associated with natural language text) is not associated with the same severity of security risks. As such, pre-existing software development pipelines can require manual application of rules or policies for output validation depending on the precise nature of generated output, thereby leading to inefficiencies in data processing and application development.

The data generation platform disclosed herein enables dynamic evaluation of machine learning prompts for model selection, as well as validation of the resulting outputs, in order to improve the security, reliability, and modularity of data pipelines (e.g., software development systems). The data generation platform can receive a prompt from a user (e.g., a human-readable request relating to software development, such as code generation) and determine whether the user is authenticated based on an associated authentication token (e.g., as provided concurrently with the prompt). Based on the selected model, the data generation platform can determine a set of performance metrics (and/or corresponding values) associated with processing the requested prompt via the selected model. By doing so, the data generation platform can evaluate the suitability of the selected model (e.g., LLM) for generating an output based on the received input or prompt. The data generation platform can validate and/or modify the user's prompt according to a prompt validation model. Based on the results of the prompt validation model, the data generation platform can modify the prompt such that the prompt satisfies any associated validation criteria (e.g., through the redaction of sensitive data or other details) thereby mitigating the effect of potential security breaches, inaccuracies, or adversarial manipulation associated with the user's prompt.

The selected model(s) encounter further challenges with respect to the compliance of AI models with an array of vector constraints (e.g., guidelines, regulations, standards) related to ethical or regulatory considerations, such as protections against bias, harmful language, and intellectual property (IP) rights. For example, vector constraints can include requirements that require AI applications to produce outputs that are free from bias, harmful language, and/or IP rights violations to uphold ethical standards and protect users. Traditional approaches to regulatory compliance often involve manual interpretation of regulatory texts, followed by ad-hoc efforts to align AI systems with compliance requirements. However, the manual process is subjective, lacks scalability, and is error-prone, which makes the approach increasingly unsustainable in the face of growing guidelines and the rapid prevalence of AI applications.

As such, the inventors have further developed a system (e.g., within the data generation platform) to provide a systematic and automated approach to assess and ensure adherence to guidelines (e.g., preventing bias, harmful language, IP violations). The disclosed technology addresses the complexities of compliance for AI applications. In some implementations, the system uses a meta-model that consists of one or more models to analyze different aspects of AI-generated content. For example, one of the models can be trained to identify certain patterns (e.g., patterns indicative of bias) within the content by evaluating demographic attributes and characteristics present in the content. By quantifying biases within the training dataset, the system can effectively scan content for disproportionate associations with demographic attributes and provide insights into potential biases that can impact the fairness and equity of AI applications. In some implementations, the system generates actionable validation actions (e.g., test cases) that operate as input into the AI model for evaluating AI application compliance. The system evaluates the AI application against the set of validation actions and generates one or more compliance indicators and/or a set of actions based on comparisons between expected and actual outcomes and explanations. In some implementations, the system can incorporate a correction module that automates the process of implementing corrections to remove non-compliant content from AI models. The correction module adjusts the parameters of the AI model and/or updates training data based on the findings of the detection models to ensure that non-compliant content is promptly addressed and mitigated.

Unlike manual processes that rely on humans to interpret guidelines and assess compliance, the system can detect subtleties that traditional methods for content moderation often struggle to identify. The system can parse and analyze text data within the response of the AI model and identify nuanced expressions, connotations, and cultural references that can signal biased or harmful content. Additionally, by standardizing the validation criteria, the system establishes clear and objective criteria for assessing the content of an AI application, thereby minimizing the influence of individual biases or interpretations. The system can process large volumes of content rapidly and consistently, ensuring that all content is evaluated against the same set of standards and guidelines, reducing the likelihood of discrepancies or inconsistencies in enforcement decisions.

In cases where non-compliance is detected, conventional approaches to mapping gaps (e.g., issues) in controls (e.g., a set of expected actions) to operative standards (e.g., obligations, criteria, measures, principles, conditions) heavily rely on manually mapping each gap to one or more operative standards. Gaps represent situations where an expected control is either absent or not functioning properly, such as the failure to establish a specific framework within an organization. Operative standards contain controls that can be based on publications such as regulations, organizational guidelines, best practice guidelines, and others. Using manual processes heavily depends on individual knowledge and thus poses a significant risk for potential bias. This subjectivity can result in inconsistent mappings, as different individuals may understand and apply operative standards such as regulatory requirements in varied ways. Further, the sheer volume of identified gaps complicates traditional compliance efforts. Manually managing such a vast number of gaps is not only labor-intensive but also prone to oversights. Another significant disadvantage of traditional methods is the static nature of the mapping process. Conventional approaches often fail to account for the dynamic and evolving nature of regulatory requirements and organizational controls.

As such, the inventors have further developed a system (e.g., within the data generation platform) to use generative AI (e.g., GAI, GenAI, generative artificial intelligence) models, such as a large language model (LLM) in the above-described data generation platform, to map gaps in controls to corresponding operative standards. The system determines a set of vector representations of alphanumeric characters represented by one or more operative standards, which contain a first set of actions adhering to constraints in the set of vector representations. The system receives, via a user interface, an output generation request that includes an input with a set of gaps associated with scenarios failing to satisfy operative standards of the set of vector representations. Using the received input, the system constructs a set of prompts for each gap, where the set of prompts for a particular gap includes the set of attributes defining the scenario and the first set of actions of the operative standards. Each prompt can compare the corresponding gap against the first set of actions of the operative standards or the set of vector representations. For each gap, the system maps the gap to one or more operative standards of the set of vector representations by supplying the prompt into the LLM and, in response, receiving from the LLM a gap-specific set of operative standards that include the operative standards associated with the particular gap. The system, as compared to conventional approaches, reduces reliance on individual knowledge, thus minimizing personal biases and resulting in more uniform mappings across different individuals and teams. Additionally, the system can efficiently handle the large volumes of gaps that organizations face, significantly reducing the labor-intensive nature of manual reviews.

In another example, conventional approaches to identifying actionable items from guidelines present several challenges. Typically, conventional methods include either human reviewers or automated systems processing guidelines in a linear fashion. The conventional linear approach often leads to an overwhelming number of actionable items being identified. Furthermore, conventional approaches lack the ability to dynamically adapt to changes in guidelines over time. When new guidelines are introduced or existing ones are updated, conventional systems typically simply add new actionable items without reassessing the overall set of actionable items to ensure that the new actionable items are not redundant or contradictory to previously set actionable items. The conventional approach further fails to account for subtle shifts in interpretation that may arise from changes in definitions or regulatory language, potentially leading to outdated or irrelevant requirements remaining on the list. Consequently, organizations may end up with an inflated and confusing set of actionable items that do not accurately reflect the current landscape of the guidelines (e.g., the current regulatory landscape).

As such, the inventors have further developed a system (e.g., within the data generation platform) to use generative AI models, such as an LLM in the above-described data generation platform, to identify actionable items from guidelines. The system receives, from a user interface, an output generation request that includes an input for generating an output using an LLM. The guidelines are partitioned into multiple text subsets based on predetermined criteria, such as the length or complexity of each text subset. Using the partitioned guidelines, the system constructs a set of prompts for each text subset. Each text subset can be mapped to one or more actions in the first set of actions. Subsequent actions in this second set can be generated based on previous actions. The system generates a third set of actions by aggregating the corresponding second set of actions for each text subset. Unlike conventional linear processes that result in an overwhelming number of redundant actionable items, by heuristically analyzing guidelines, the system can identify common actionable items without the parsing through the guideline documents word by word. The disclosed system reduces the number of identified actionable items to only relevant actionable items. Moreover, the system's dynamic and context-aware nature allows the system to respond to changes in guidelines over time by reassessing and mapping shifts in actionable items as the shifts occur.

Even using a monitoring AI application to assess the compliance of monitored AI models (or any other artifact, such as a hardware asset or software asset), however, there is a risk of overfitting, where the monitored AI model becomes too tailored to the specific criteria and patterns identified by the monitoring AI application. The overfitting occurs when the monitored model excessively optimizes its performance to meet the compliance checks, potentially at the expense of the monitored model's broader generalization capabilities. For example, if a monitoring AI application specialized in detecting fraudulent transactions only focuses on specific patterns of known fraudulent activities, the monitored model may excel at flagging transactions that fit the specific patterns, but miss new types of fraud that do not match the specific patterns. As a result, the monitored model may perform well under the scrutiny of the monitoring application but fail to adapt to new, unforeseen scenarios or datasets that fall outside the predefined compliance criteria. Overfitting can lead to a false sense of security, where the model appears compliant and robust within the narrow scope of the monitoring application but is vulnerable to real-world variations and challenges.

In addition, relying on a single monitoring model or single group of monitoring models presents a significant vulnerability. Cyber attackers are becoming increasingly sophisticated, often exploiting the specific patterns and weaknesses of static models or groups of models. When an organization uses a single monitoring model or single group of monitoring models, it creates a predictable and uniform defense mechanism that cyber attackers can more easily understand and circumvent. The predictability allows cyber attackers to tailor their strategies to bypass the model's checks, leading to successful breaches and exploitation. Furthermore, a single monitoring model framework may not be equipped to handle the diverse and evolving nature of cyber threats, leaving gaps in the security framework. The gaps can be exploited by attackers who continuously adapt their methods to outpace the static defenses.

Attempting to create a system to monitor and validate artifacts (e.g., model outputs) using not a single model framework, but instead a multi-model superstructure in view of the available conventional approaches created significant technological uncertainty. Creating such system required addressing several unknowns in conventional approaches in artifact validation, such as the integration of diverse models, ensuring interoperability among different models, and maintaining the accuracy and reliability of the validation process across different types of artifacts. Additionally, the system needed to adapt to the dynamic nature of regulatory requirements and integrate new compliance standards without compromising model performance. Conventional approaches in artifact validation did not provide methods of continuously learning and adapting to new regulatory changes and updates.

Conventional approaches rely on static models and periodic updates, which are insufficient in the face of rapidly evolving regulatory landscapes and emerging threats. The static models lacked the flexibility to incorporate real-time data and insights, leading to outdated compliance checks and increased vulnerability to non-compliance and fraud. Furthermore, conventional systems often depend on manual processes and static documentation, which are labor-intensive and prone to human error. The reliance on manual intervention not only slows down the validation process but also increases the risk of oversight and inaccuracies. As a result, organizations using conventional approaches struggle to maintain up-to-date compliance, leaving them exposed to regulatory penalties and reputational damage.

To overcome the technological uncertainties, the inventors systematically evaluated multiple design alternatives. For example, the inventors tested various methods for reducing overfitting on particular monitoring models and increasing the resilience of the monitoring models. For example, the inventors experimented with the periodic retraining and updating of the monitoring models to keep the models current with the latest data and threats. However, periodic training required a substantial amount of data and computational power to retrain the models regularly. Further, the inventors also explored ensemble methods, where multiple models were combined to improve detection accuracy and resilience. However, while ensemble methods showed some improvement in performance, ensemble methods introduced additional complexity and computational overhead.

Thus, the inventors experimented with different methods for integrating the monitoring model into a suite of models in the form of a multi-model superstructure. For example, the inventors tested various orchestration frameworks to manage the interactions between the monitoring models within the superstructure. For example, the inventors tested a centralized orchestration framework, where a single controller managed the flow of data and coordination between models. Another method tested was a decentralized peer-to-peer communication system, where models communicated directly with each other without a central controller. Further, the inventors tested various methods of improving the resilience of the multi-model superstructure by rotating the monitoring models, for example, at random or at predefined intervals.

As such, the inventors have developed a system (e.g., an engine within the data generation platform, a multi-model superstructure) for dynamic multi-model monitoring and validation of a generative artificial intelligence model. The system obtains artifacts, such as a model output generated using a first set of models, which can be within a multi-model superstructure itself. The multi-model superstructure includes a second set of models to test the first set of models. The multi-model superstructure dynamically routes the artifacts of the first set of models to one or more models of the second set of models (using, for example, a third set of models within the multi-model superstructure) by (i) determining a set of dimensions of the artifacts against which to evaluate the artifacts and (ii) identifying the models in the second set used to test the particular dimension. The second set of models assesses each artifact against a set of assessment metrics. If an artifact fails to meet one or more assessment metrics, the second set of models generates actions to align the artifact with the set of assessment metrics.

In some implementations, the system constructs the set of assessments by generating a set of seed assessments that test the particular dimension of the artifact against threshold values of the corresponding assessment metrics. The values of the artifact are compared with these threshold values, and a set of seed assessment results is generated, indicating the degree of satisfaction of the artifact with the threshold values. Based on the results, the system dynamically constructs a set of subsequent assessments to further evaluate the artifact. If an artifact fails to meet one or more assessment metrics, the second set of models generates actions to align the artifact with the set of assessment metrics. The actions could include suggestions for corrections to the artifact or first set of models, automatic adjustments to the artifact or first set of models, and/or feedback loops to the first set of models for retraining or fine-tuning.

Unlike conventional approaches that rely on static models and predefined rules, the system developed by the inventors reduces overfitting by frequently updating and changing (e.g., shuffling, switching, rotating) the models, ensuring that the monitored models do not become too specialized on a particular dataset and remain adaptable to new data. The changing of models can further mean that different monitoring models are used for different tasks over time, preventing any single model from becoming overly dominant and specialized. Further, the dynamic nature of the multi-model superstructure, where models are frequently updated and changed, makes it significantly harder for malicious actors to exploit vulnerabilities, as the attack surface is continuously shifting. The system can establish a predefined schedule to change the models in the second set, using time intervals or the number of output generation requests processed, ensuring that no single model remains static for too long. By continuously refreshing the monitoring models, the system creates a moving target for potential cyber threats.

While the current description provides examples related to LLMs, one of skill in the art would understand that the disclosed techniques can apply to other forms of machine learning or algorithms, including unsupervised, semi-supervised, supervised, and reinforcement learning techniques. For example, the disclosed data generation platform can evaluate model outputs from support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Overview of the Data Generation Platform

FIG. 1 shows an illustrative environment 100 for evaluating machine learning model inputs (e.g., language model prompts) and outputs for model selection and validation, in accordance with some implementations of the present technology. For example, the environment 100 includes the data generation platform 102, which is capable of communicating with (e.g., transmitting or receiving data to or from) a data node 104 and/or third-party databases 108*a*-108*n* via a network 150. The data generation platform 102 can include software, hardware, or a combination of both and can reside on a physical server or a virtual server (e.g., as described in FIG. 3) running on a physical computer system. For example, the data generation platform 102 can be distributed across various nodes, devices, or virtual machines (e.g., as in a distributed cloud server). In some implementations, the data generation platform 102 can be configured on a user device (e.g., a laptop computer, smartphone, desktop computer, electronic tablet, or another suitable user device). Furthermore, the data generation platform 102 can reside on a server or node and/or can interface with third-party databases 108*a*-108*n* directly or indirectly.

The data node 104 can store various data, including one or more machine learning models, prompt validation models, associated training data, user data, performance metrics and corresponding values, validation criteria, and/or other suitable data. For example, the data node 104 includes one or more databases, such as an event database (e.g., a database for storage of records, logs, or other information associated with LLM-related user actions), a vector database, an authentication database (e.g., storing authentication tokens associated with users of the data generation platform 102), a secret database, a sensitive token database, and/or a deployment database.

An event database can include data associated with events relating to the data generation platform 102. For example, the event database stores records associated with users' inputs or prompts for generation of an associated natural language output (e.g., prompts intended for processing using an LLM). The event database can store timestamps and the associated user requests or prompts. In some implementations, the event database can receive records from the data generation platform 102 that include model selections/determinations, prompt validation information, user authentication information, and/or other suitable information. For example, the event database stores platform-level metrics (e.g., bandwidth data, central processing unit (CPU) usage metrics, and/or memory usage associated with devices or servers associated with the data generation platform 102). By doing so, the data generation platform 102 can store and track information relating to performance, errors, and troubleshooting. The data generation platform 102 can include one or more subsystems or subcomponents. For example, the data generation platform 102 includes a communication engine 112, an access control engine 114, a breach mitigation engine 116, a performance engine 118, and/or a generative model engine 120.

A vector database can include data associated with vector embeddings of data. For example, the vector database includes a numerical representations (e.g., arrays of values) that represent the semantic meaning of unstructured data (e.g., text data, audio data, or other similar data). For example, the data generation platform 102 receives inputs such as unstructured data, including text data, such as a prompt, and utilize a vector encoding model (e.g., with a transformer or neural network architecture) to generate vectors within a vector space that represents meaning of data objects (e.g., of words within a document). By storing information within a vector database, the data generation platform 102 can represent inputs, outputs, and other data in a processable format (e.g., with an associated LLM), thereby improving the efficiency and accuracy of data processing.

An authentication database can include data associated with user or device authentication. For example, the authentication database includes stored tokens associated with registered users or devices of the data generation platform 102 or associated development pipeline. For example, the authentication database stores keys (e.g., public keys that match private keys linked to users and/or devices). The authentication database can include other user or device information (e.g., user identifiers, such as usernames, or device identifiers, such as medium access control (MAC) addresses). In some implementations, the authentication database can include user information and/or restrictions associated with these users.

A sensitive token (e.g., secret) database can include data associated with secret or otherwise sensitive information. For example, secrets can include sensitive information, such as application programming interface (API) keys, passwords, credentials, or other such information. For example, sensitive information includes personally identifiable information (PII), such as names, identification numbers, or biometric information. By storing secrets or other sensitive information, the data generation platform 102 can evaluate prompts and/or outputs to prevent breaches or leakage of such sensitive information.

A deployment database can include data associated with deploying, using, or viewing results associated with the data generation platform 102. For example, the deployment database can include a server system (e.g., physical or virtual) that stores validated outputs or results from one or more LLMs, where such results can be accessed by the requesting user.

The data generation platform 102 can receive inputs (e.g., prompts), training data, validation criteria, and/or other suitable data from one or more devices, servers, or systems. The data generation platform 102 can receive such data using communication engine 112, which can include software components, hardware components, or a combination of both. For example, the communication engine 112 includes or interfaces with a network card (e.g., a wireless network card and/or a wired network card) that is associated with software to drive the card and enables communication with network 150. In some implementations, the communication engine 112 can also receive data from and/or communicate with the data node 104, or another computing device. The communication engine 112 can communicate with the access control engine 114, the breach mitigation engine 116, the performance engine 118, and the generative model engine 120.

In some implementations, the data generation platform 102 can include the access control engine 114. The access control engine 114 can perform tasks relating to user/device authentication, controls, and/or permissions. For example, the access control engine 114 receives credential information, such as authentication tokens associated with a requesting device and/or user. In some implementations, the access control engine 114 can retrieve associated stored credentials (e.g., stored authentication tokens) from an authentication database (e.g., stored within the data node 104). The access control engine 114 can include software components, hardware components, or a combination of both. For example, the access control engine 114 includes one or more hardware components (e.g., processors) that are able to execute operations for authenticating users, devices, or other entities (e.g., services) that request access to an LLM associated with the data generation platform 102. The access control engine 114 can directly or indirectly access data, systems, or nodes associated with the third-party databases **108*a*-108*n* and can transmit data to such nodes. Additionally or alternatively, the access control engine 114 can receive data from and/or send data to the communication engine 112, the breach mitigation engine 116, the performance engine 118, and/or the generative model engine 120**.

The breach mitigation engine 116 can execute tasks relating to the validation of inputs and outputs associated with the LLMs. For example, the breach mitigation engine 116 validates inputs (e.g., prompts) to prevent sensitive information leakage or malicious manipulation of LLMs, as well as validate the security or safety of the resulting outputs. The breach mitigation engine 116 can include software components (e.g., modules/virtual machines that include prompt validation models, performance criteria, and/or other suitable data or processes), hardware components, or a combination of both. As an illustrative example, the breach mitigation engine 116 monitors prompts for the inclusion of sensitive information (e.g., PII), or other forbidden text, to prevent leakage of information from the data generation platform 102 to entities associated with the target LLMs. The breach mitigation engine 116 can communicate with the communication engine 112, the access control engine 114, the performance engine 118, the generative model engine 120, and/or other components associated with the network 150 (e.g., the data node 104 and/or the third-party databases **108*a*-108*n***).

The performance engine 118 can execute tasks relating to monitoring and controlling performance of the data generation platform 102 (e.g., or the associated development pipeline). For example, the performance engine 118 includes software components (e.g., performance monitoring modules), hardware components, or a combination thereof. To illustrate, the performance engine 118 can estimate performance metric values associated with processing a given prompt with a selected LLM (e.g., an estimated cost or memory usage). By doing so, the performance engine 118 can determine whether to allow access to a given LLM by a user, based on the user's requested output and the associated estimated system effects. The performance engine 118 can communicate with the communication engine 112, the access control engine 114, the performance engine 118, the generative model engine 120, and/or other components associated with the network 150 (e.g., the data node 104 and/or the third-party databases **108*a*-108*n***).

The generative model engine 120 can execute tasks relating to machine learning inference (e.g., natural language generation based on a generative machine learning model, such as an LLM). The generative model engine 120 can include software components (e.g., one or more LLMs, and/or API calls to devices associated with such LLMs), hardware components, and/or a combination thereof. To illustrate, the generative model engine 120 can provide users' prompts to a requested, selected, or determined model (e.g., LLM) to generate a resulting output (e.g., to a user's query within the prompt). As such, the generative model engine 120 enables flexible, configurable generation of data (e.g., text, code, or other suitable information) based on user input, thereby improving the flexibility of software development or other such tasks. The generative model engine 120 can communicate with the communication engine 112, the access control engine 114, the performance engine 118, the generative model engine 120, and/or other components associated with the network 150 (e.g., the data node 104 and/or the third-party databases **108*a*-108*n***).

Engines, subsystems, or other components of the data generation platform 102 are illustrative. As such, operations, subcomponents, or other aspects of particular subsystems of the data generation platform 102 can be distributed, varied, or modified across other engines. In some implementations, particular engines can be deprecated, added, or removed. For example, operations associated with breach mitigation are performed at the performance engine 118 instead of at the breach mitigation engine 116.

Suitable Computing Environments for the Data Generation Platform

Figure 2:
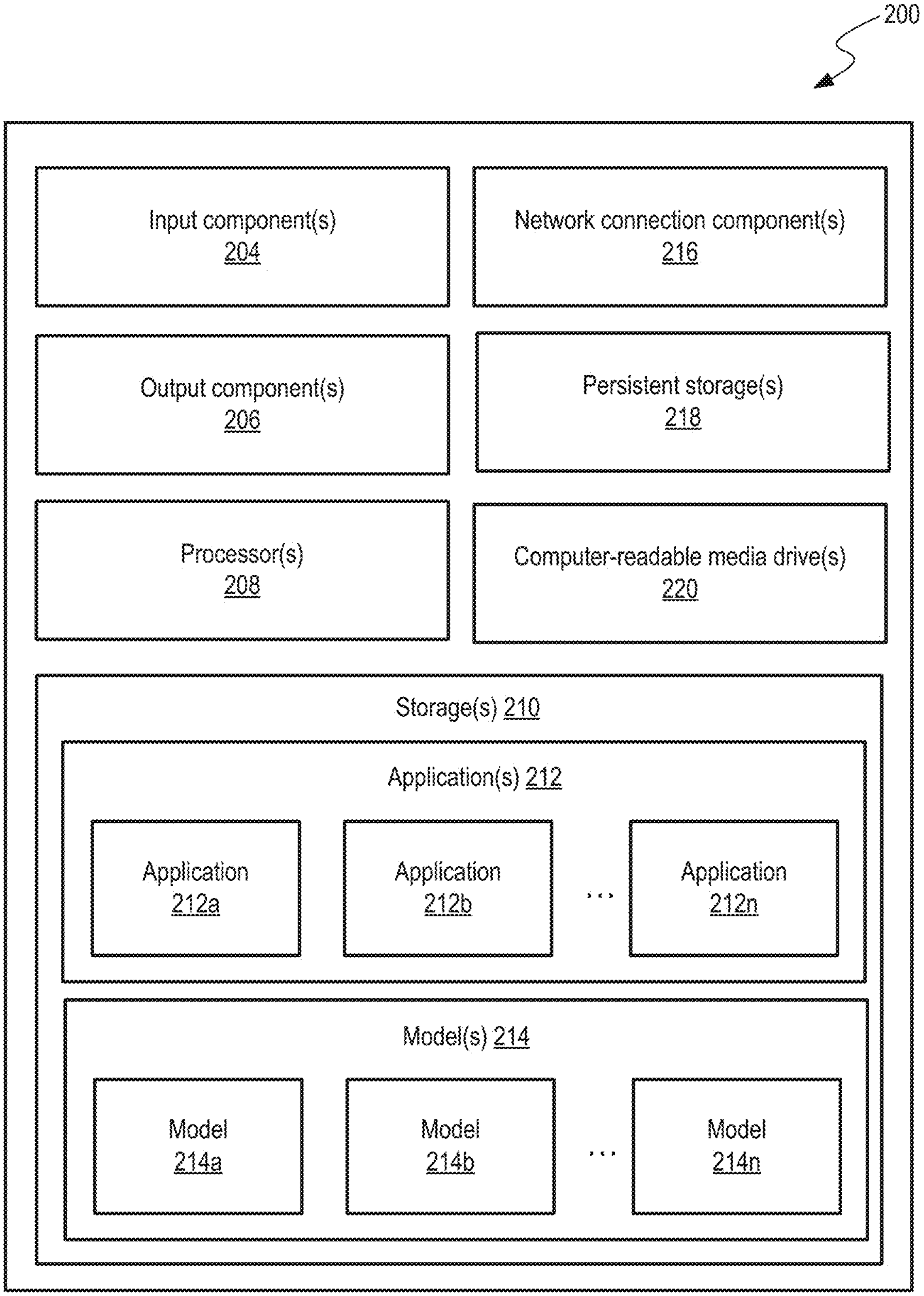
FIG. 2 shows a block diagram showing some of the components typically incorporated in at least some of the computer systems and other devices on which the disclosed system operates in accordance with some implementations of the present technology.

FIG. 2 shows a block diagram showing some of the components typically incorporated in at least some of the computer systems and other devices 200 on which the disclosed system (e.g., the data generation platform 102) operates in accordance with some implementations of the present technology. In various implementations, these computer systems and other device(s) 200 can include server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: input components 204, including keyboards, microphones, image sensors, touch screens, buttons, track pads, mice, compact disc (CD) drives, digital video disc (DVD) drives, 3.5 mm input jack, High-Definition Multimedia Interface (HDMI) input connections, Video Graphics Array (VGA) input connections, Universal Serial Bus (USB) input connections, or other computing input components; output components 206, including display screens (e.g., liquid crystal displays (LCDs), organic light-emitting diodes (OLEDs), cathode ray tubes (CRTs), etc.), speakers, 3.5 mm output jack, lights, light emitting diodes (LEDs), haptic motors, or other output-related components; processor(s) 208, including a CPU for executing computer programs, a GPU for executing computer graphic programs and handling computing graphical elements; storage(s) 210, including at least one computer memory for storing programs (e.g., application(s) 212, model(s) 214, and other programs) and data while they are being used, including the facility and associated data, an operating system including a kernel, and device drivers; a network connection component(s) 216 for the computer system to communicate with other computer systems and to send and/or receive data, such as via the Internet or another network and its networking hardware, such as switches, routers, repeaters, electrical cables and optical fibers, light emitters and receivers, radio transmitters and receivers, and the like; a persistent storage(s) device 218, such as a hard drive or flash drive for persistently storing programs and data; and computer-readable media drives 220 (e.g., at least one non-transitory computer-readable medium) that are tangible storage means that do not include a transitory, propagating signal, such as a floppy, CD-ROM, or DVD drive, for reading programs and data stored on a computer-readable medium. While computer systems configured as described above are typically used to support the operation of the facility, those skilled in the art will appreciate that the facility can be implemented using devices of various types and configurations and having various components.

Figure 3:
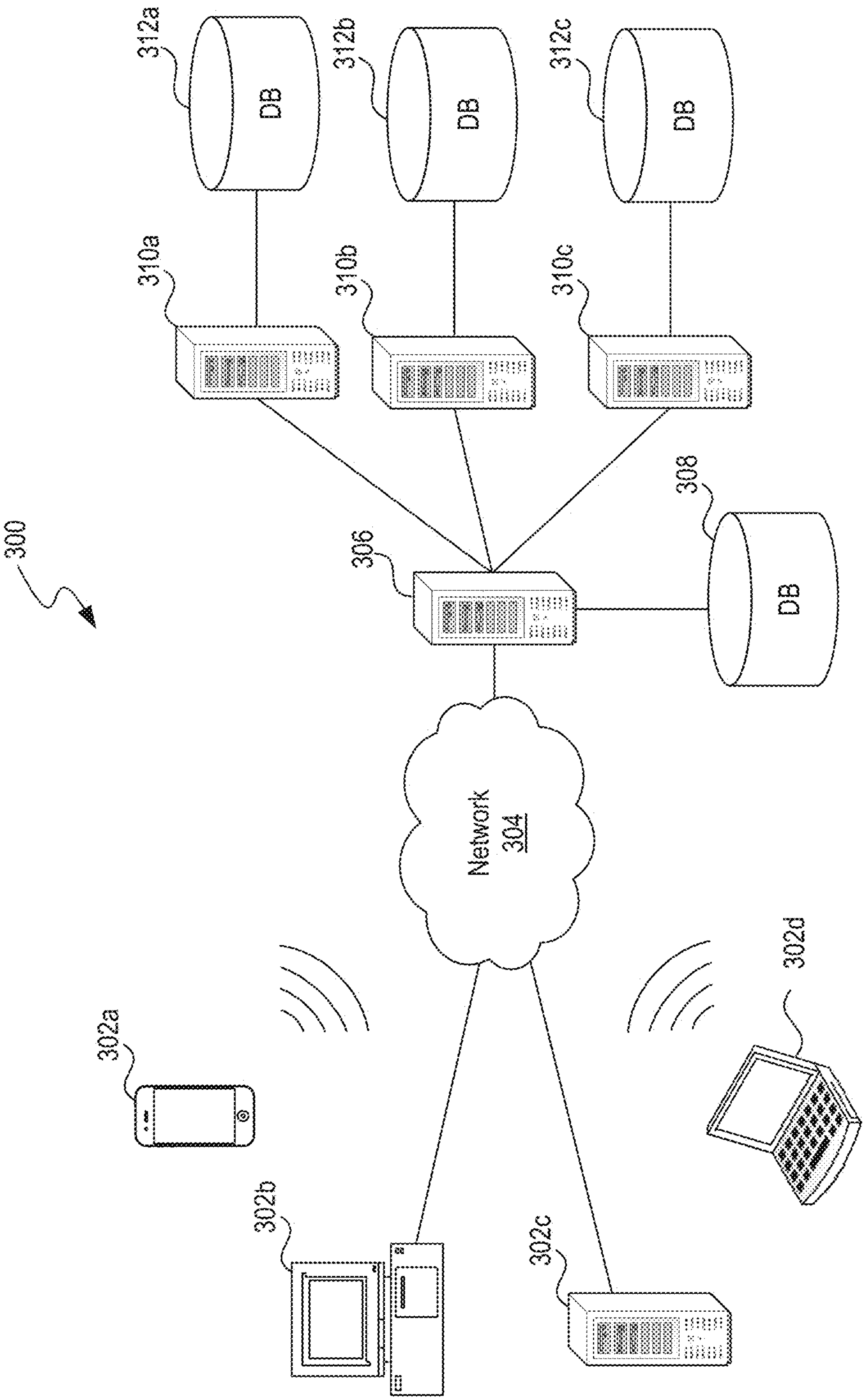
FIG. 3 is a system diagram illustrating an example of a computing environment in which the disclosed system operates in some implementations of the present technology.

FIG. 3 is a system diagram illustrating an example of a computing environment 300 in which the disclosed system operates in some implementations of the present technology. In some implementations, environment 300 includes one or more client computing devices 302*a*-302*d*, examples of which can host graphical user interfaces associated with client devices. For example, one or more of the client computing devices 302*a*-302*d* includes user devices and/or devices associated with services requesting responses to queries from LLMs. Client computing devices 302 operate in a networked environment using logical connections through network 304 (e.g., the network 150) to one or more remote computers, such as a server computing device (e.g., a server system housing the data generation platform 102 of FIG. 1). In some implementations, client computing devices 302 can correspond to device 200 (FIG. 2).

In some implementations, server computing device 306 is an edge server that receives client requests and coordinates fulfillment of those requests through other servers, such as server computing devices 310*a*-310*c*. In some implementations, server computing devices 306 and 310 comprise computing systems. Though each server computing device 306 and 310 is displayed logically as a single server, server computing devices can each be a distributed computing environment encompassing multiple computing devices located at the same or at geographically disparate physical locations. In some implementations, each server computing device 310 corresponds to a group of servers.

Client computing devices 302 and server computing devices 306 and 310 can each act as a server or client to other server or client devices. In some implementations, server computing devices (306, 310*a*-310*c*) connect to a corresponding database (308, 312*a*-312*c*). For example, the corresponding database includes a database stored within the data node 104 (e.g., a sensitive token database, an event database, or another suitable database). As discussed above, each server computing device 310 can correspond to a group of servers, and each of these servers can share a database or can have its own database (and/or interface with external databases, such as third-party databases 108*a*-108*n*). In addition to information described concerning the data node 104 of FIG. 1, databases 308 and 312 can warehouse (e.g., store) other suitable information, such as sensitive or forbidden tokens, user credential data, authentication data, graphical representations, code samples, system policies or other policies, templates, computing languages, data structures, software application identifiers, visual layouts, computing language identifiers, mathematical formulae (e.g., weighted average, weighted sum, or other mathematical formulas), graphical elements (e.g., colors, shapes, text, images, multimedia), system protection mechanisms (e.g., prompt validation model parameters or criteria), software development or data processing architectures, machine learning models, AI models, training data for AI/machine learning models, historical information, or other information.

Though databases 308 and 312 are displayed logically as single units, databases 308 and 312 can each be a distributed computing environment encompassing multiple computing devices, can be located within their corresponding server, or can be located at the same or at geographically disparate physical locations.

Network 304 (e.g., corresponding to the network 150) can be a local area network (LAN) or a wide area network (WAN) but can also be other wired or wireless networks. In some implementations, network 304 is the Internet or some other public or private network. Client computing devices 302 are connected to network 304 through a network interface, such as by wired or wireless communication. While the connections between server computing device 306 and server computing device 310 are shown as separate connections, these connections can be any kind of LAN, WAN, wired network, or wireless network, including network 304 or a separate public or private network.

Example Implementations of Models in the Data Generation Platform

Figure 4:
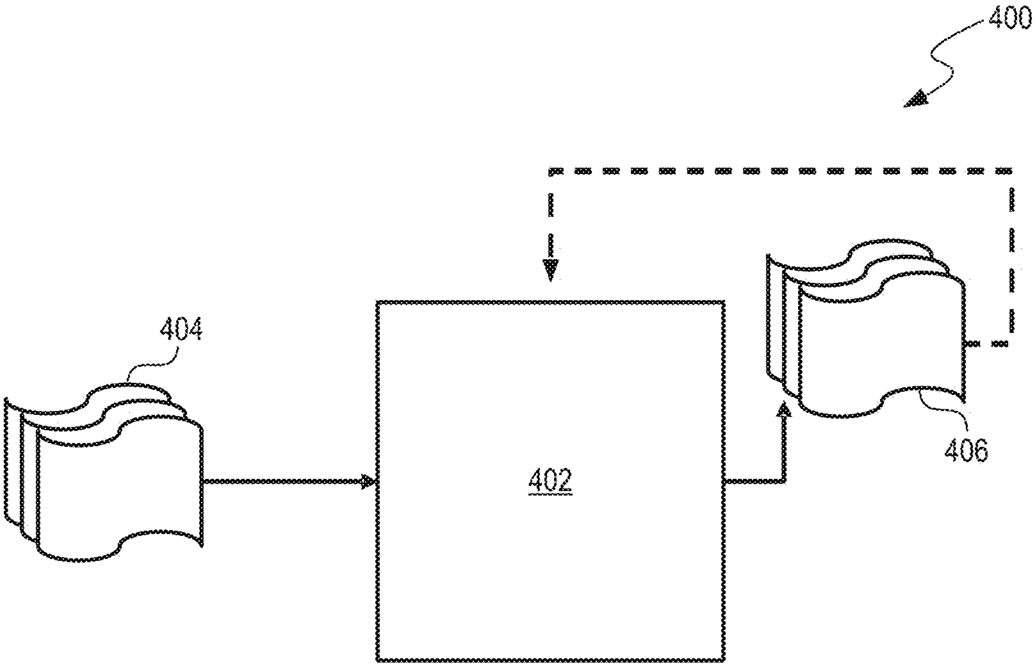
FIG. 4 shows a diagram of an artificial intelligence (AI) model, in accordance with some implementations of the present technology.

FIG. 4 shows a diagram of an AI model, in accordance with some implementations of the present technology. AI model 400 is shown. In some implementations, AI model 400 can be any AI model. In some implementations, AI model 400 can be part of, or work in conjunction with, server computing device 306 (FIG. 3). For example, server computing device 306 can store a computer program that can use information obtained from AI model 400, provide information to AI model 400, or communicate with AI model 400. In other implementations, AI model 400 can be stored in database 308 and can be retrieved by server computing device 306 to execute/process information related to AI model 400, in accordance with some implementations of the present technology.

In some implementations, AI model 400 can be a machine learning model 402. Machine learning model 402 can include one or more neural networks or other machine learning models. As an example, neural networks can be based on a large collection of neural units (or artificial neurons). Neural networks can loosely mimic the manner in which a biological brain works (e.g., via large clusters of biological neurons connected by axons). Each neural unit of a neural network can be connected with many other neural units of the neural network. Such connections can be enforcing or inhibitory in their effect on the activation state of connected neural units. In some implementations, each individual neural unit can have a summation function that combines the values of all its inputs together. In some implementations, each connection (or the neural unit itself) can have a threshold function such that the signal must surpass the threshold before it propagates to other neural units. These neural network systems can be self-learning and trained, rather than explicitly programmed, and can perform significantly better in certain areas of problem solving, as compared to traditional computer programs. In some implementations, neural networks can include multiple layers (e.g., where a signal path traverses from front layers to back layers). In some implementations, backpropagation techniques can be utilized by the neural networks, where forward stimulation is used to reset weights on the "front" neural units. In some implementations, stimulation and inhibition for neural networks can be more free-flowing, with connections interacting in a more chaotic and complex fashion.

As an example, with respect to FIG. 4, machine learning model 402 can take inputs 404 and provide outputs 406. In one use case, outputs 406 can be fed back to machine learning model 402 as input to train machine learning model 402 (e.g., alone or in conjunction with user indications of the accuracy of outputs 406, labels associated with the inputs, or other reference feedback information). In another use case, machine learning model 402 can update its configurations (e.g., weights, biases, or other parameters) based on its assessment of its prediction (e.g., outputs 406) and reference feedback information (e.g., user indication of accuracy, reference labels, or other information). In another use case, where machine learning model 402 is a neural network, connection weights can be adjusted to reconcile differences between the neural network's prediction and the reference feedback. In a further use case, one or more neurons (or nodes) of the neural network can require that their respective errors are sent backward through the neural network to them to facilitate the update process (e.g., backpropagation of error). Updates to the connection weights can, for example, be reflective of the magnitude of error propagated backward after a forward pass has been completed. In this way, for example, the machine learning model 402 can be trained to generate better predictions.

As an example, where the prediction models include a neural network, the neural network can include one or more input layers, hidden layers, and output layers. The input and output layers can respectively include one or more nodes, and the hidden layers can each include a plurality of nodes. When an overall neural network includes multiple portions trained for different objectives, there may or may not be input layers or output layers between the different portions. The neural network can also include different input layers to receive various input data. Also, in differing examples, data can be input to the input layer in various forms, and in various dimensional forms input to respective nodes of the input layer of the neural network. In the neural network, nodes of layers other than the output layer are connected to nodes of a subsequent layer through links for transmitting output signals or information from the current layer to the subsequent layer, for example. The number of the links can correspond to the number of the nodes included in the subsequent layer. For example, in adjacent fully connected layers, each node of a current layer can have a respective link to each node of the subsequent layer, noting that in some examples such full connections can later be pruned or minimized during training or optimization. In a recurrent structure, a node of a layer can be again input to the same node or layer at a subsequent time, while in a bi-directional structure, forward and backward connections can be provided. The links are also referred to as connections or connection weights, referring to the hardware-implemented connections or the corresponding "connection weights" provided by those connections of the neural network. During training and implementation, such connections and connection weights can be selectively implemented, removed, and varied to generate or obtain a resultant neural network that is thereby trained and that can be correspondingly implemented for the trained objective, such as for any of the above example recognition objectives.

Figure 5:
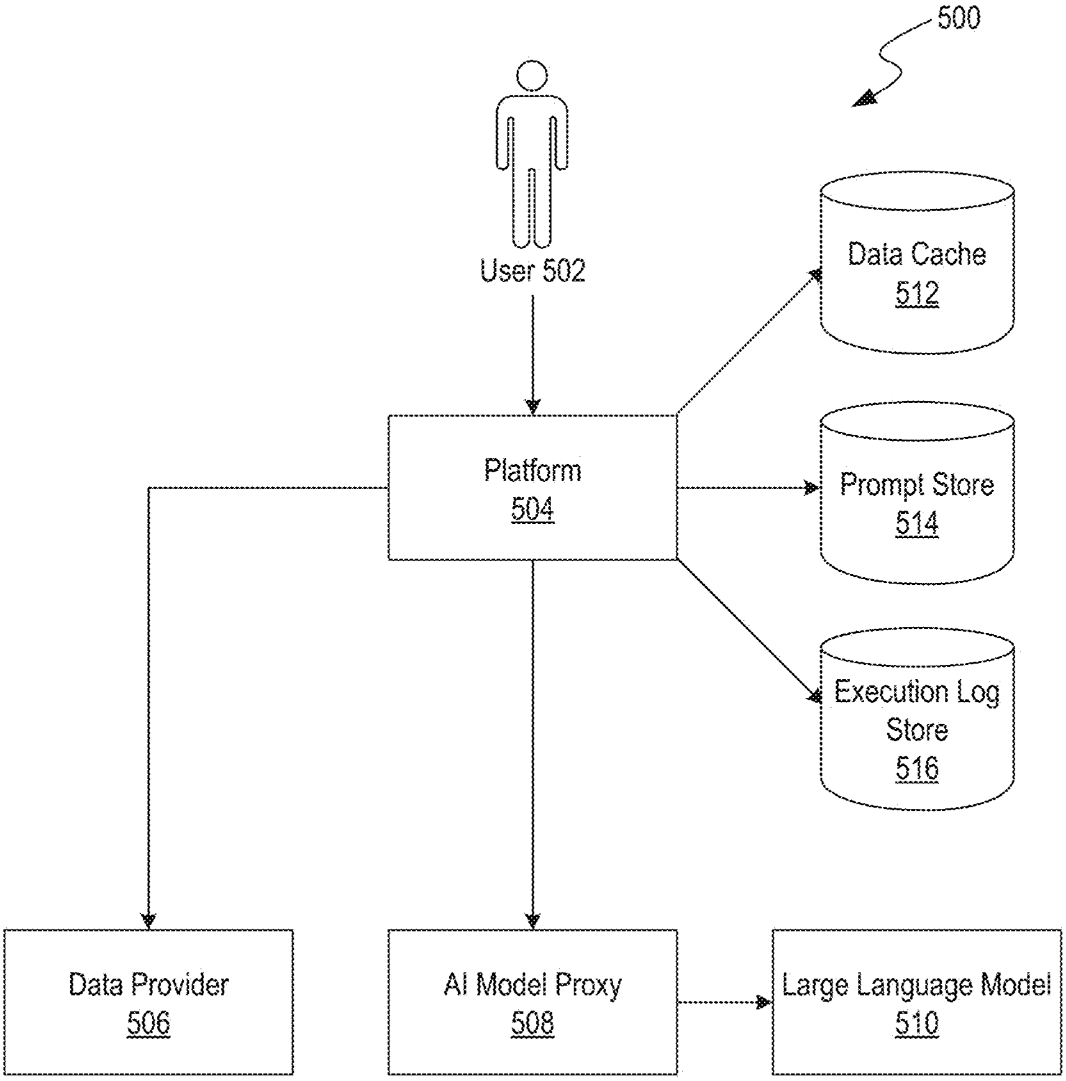
FIG. 5 is an illustrative diagram illustrating an example environment of a platform for automatically managing guideline compliance, in accordance with some implementations of the present technology.

Mapping Gaps in Controls to Operative Standards Using the Data Generation Platform FIG. 5 is an illustrative diagram illustrating an example environment 500 of a platform for automatically managing guideline compliance, in accordance with some implementations of the present technology. Environment 500 includes user 502, platform 504, data provider 506, AI model proxy 508, LLM 510, data cache 512, prompt store 514, and execution store log 516. Platform 504 is implemented using components of example devices 200 and computing devices 302 illustrated and described in more detail with reference to FIG. 2 and FIG. 3, respectively. Likewise, implementations of example environment 500 can include different and/or additional components or can be connected in different ways.

User 502 interacts with the platform 504 via, for example, a user interface. Platform 504 can be the same as or similar to data generation platform 102 with reference to FIG. 1. Users 502 can input data, configure compliance parameters, and manage guideline compliance performance through an intuitive interface provided by the platform. The platform 504 can perform a variety of compliance management tasks, such as compliance checks and regulatory analyses.

Data provider 506 supplies the platform 504 with the data used in the management, which can include regulatory guidelines, compliance requirements, organizational guidelines, and other relevant information. The data supplied by data provider 506 can be accessed via an application programming interface (API) or database that contains policies, obligations, and/or controls in operative standards. In some implementations, the data supplied by data provider 506 contains the publications (e.g., regulatory guidelines, compliance requirements, organizational guidelines) themselves. The structured repository of data provider 506 allows platform 504 to efficiently retrieve and use the data in different management processes. In some implementations, data provider 506 includes existing mappings associated with the operative standards. For example, the pre-established mappings can be between the operative standards and gaps (e.g., issues). In another example, the pre-established mappings can be between the operative standards and publications. Using the existing relationships, the platform 504 can more efficiently map particular identified gaps to the relevant operative standards. For example, if a newly identified gap is similar to or the same as a previously identified gap (e.g., shares similar scenario attributes, metadata tags) within the pre-existing mappings, the platform 504 can use the pre-existing mapping of the previously identified gap to more easily identify the mapping for the newly identified gap.

AI model proxy 508 is an intermediary between the platform and the large language model (LLM) 510. AI model proxy 508 facilitates the communication and data exchange between the platform 504 and the LLM 510. AI model proxy 508, in some implementations, operates as a plugin to interconnect the platform 504 and the LLM 510. The AI model proxy 508, in some implementations, includes distinct modules, such as data interception, inspection, or action execution. In some implementations, containerization methods such as Docker are used within the AI model proxy 508 to ensure uniform deployment across environments and minimize dependencies. LLM 510 analyzes data input by user 502 and data obtained from data provider 506 to identify patterns and generate compliance-related outputs. The AI model proxy 508, in some implementations, enforces access control policies to safeguard sensitive data and functionalities exposed to the LLM 510. For example, the AI model proxy 508 can sanitize the data received from the platform 504 using encryption standards, token-based authentication, and/or role-based access controls (RBAC) to protect sensitive information. The data received can be encrypted to ensure that all sensitive information is transformed into an unreadable format, accessible only through decryption with the appropriate keys. Token-based authentication can be used by generating a unique token for each user session or transaction. The token acts as a digital identifier by verifying the user's identity and granting access to specific data or functions within the system. Additionally, RBACs can restrict data access based on the user's role within the organization. Each role can be assigned specific permissions to ensure that users only access data relevant to the users' responsibilities.

In some implementations, AI model proxy 508 employs content analysis to discern between the sensitive and non-sensitive by identifying specific patterns, keywords, or formats indicative of sensitive information. In some implementations, the list of indicators of sensitive information is generated by an internal generative AI model within the platform 504 (e.g., with a command set that resembles "generate a plurality of examples of PII"). The generative AI model can be trained on a dataset containing examples of sensitive data elements, such as personally identifiable information (PII), financial records, or other confidential information. Once the AI model has been trained, the AI model can generate indicators (e.g., specific patterns, keywords, or formats) of sensitive information based on the model's learned associations. For example, gap data that includes sensitive financial information such as account numbers, transaction details, and personal information of stakeholders can be identified and subsequently removed and/or masked.

Data cache 512 can store data for a period of time to reduce the time required to access frequently used information. Data cache 512 ensures that the system can quickly retrieve necessary data without repeatedly querying the data provider 506, thus improving the overall efficiency of platform 504. In some implementations, a caching strategy is implemented that includes cache eviction policies, such as least recently used (LRU) or time-based expiration, to ensure that the cache remains up-to-date and responsive while optimizing memory usage. LRU allows the data cache 312 to keep track of which data items have been accessed most recently. When the data cache 312 reaches maximum capacity and needs to evict an item (e.g., data packets) to make room for new data, the data cache 312 will remove the least recently used item. Time-based expiration involves setting a specific time duration for which data items are considered valid in the data cache 312. Once this duration expires, the data item is automatically invalidated and removed from the data cache 312 to preserve space in the data cache 312.

Prompt store 514 contains predefined prompts that guide the LLM 510 in processing data and generating outputs. Prompt store 514 is a repository for pre-existing prompts that are stored in a structured and accessible format (e.g., using distributed databases or NoSQL stores), which allows for efficient retrieval and utilization by the AI model. In some implementations, the prompts are preprocessed to remove any irrelevant information, standardize the format, and/or organize the prompts into a structured database schema. In some implementations, prompt store 514 is a vector store where the prompts are vectorized and stored in a vector space model, and each prompt is mapped to a high-dimensional vector representing the prompt's semantic features and relationships with other prompts. In some implementations, the prompts are stored using graph databases such as Neo4j™ or Amazon Neptune™. Graph databases represent data as nodes and edges, allowing for the modeling of relationships between prompts to demonstrate the interdependencies. In some implementations, the prompts are stored in a distributed file system such as Apache Hadoop™ or Google Cloud Storage™. These systems offer scalable storage for large volumes of data and support parallel processing and distributed computing. Prompts stored in a distributed file system can be accessed and processed by multiple nodes simultaneously, which allows for faster retrieval and analysis by the system. For example, the details of a particular gap, such as relevant metrics, severity level, and/or specific publication references, can be used to structure a prompt for the LLM 510 by inserting the details into appropriate places in the predefined prompt.

Execution store log 516 records some or all actions and processes executed by the platform 504. Execution store log 516 can serve as an audit trail, providing a history of compliance activities and decisions made by the platform 504. Each logged entry in execution store log 515 can include details such as timestamps, user identifiers, specific actions performed, and relevant contextual information. Execution store log 516, in some implementations, can be accessed via the platform 504 via an API.

Figure 6:
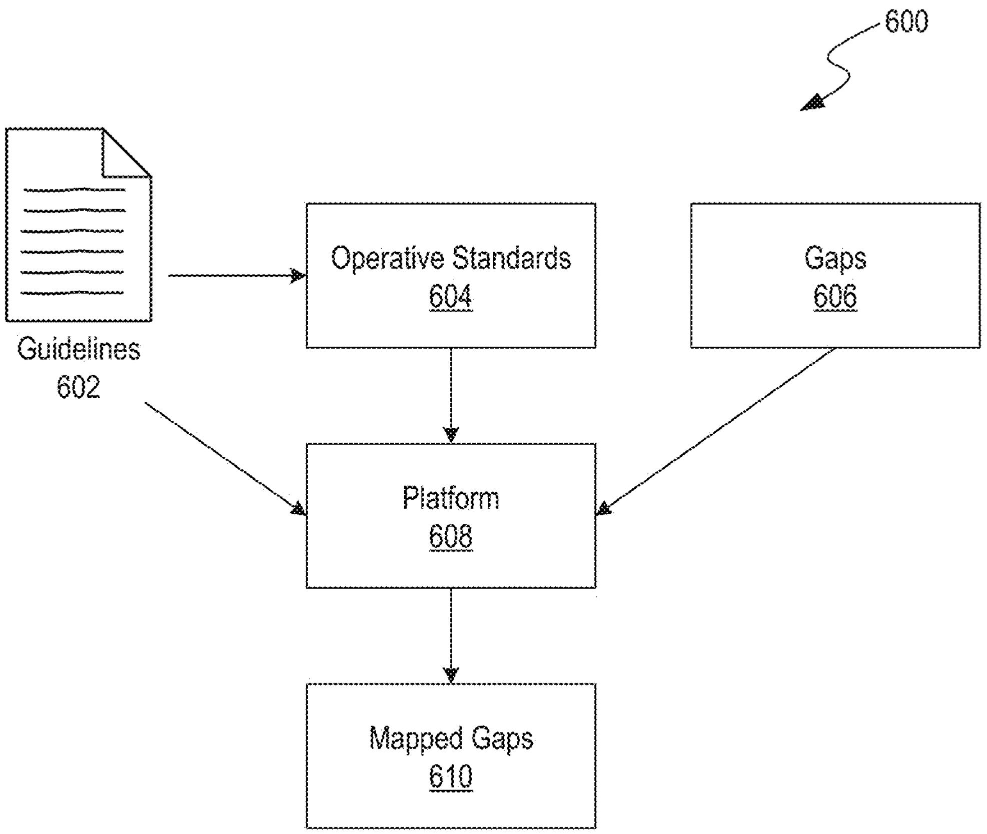
FIG. 6 is an illustrative diagram illustrating an example environment of the platform using guidelines and gaps in controls to generate mapped gaps, in accordance with some implementations of the present technology.

FIG. 6 is an illustrative diagram illustrating an example environment 600 of the platform using guidelines and gaps in controls to generate mapped gaps, in accordance with some implementations of the present technology. Environment 600 includes guidelines 602, operative standards 604, gaps 606, platform 608, and mapped gaps 610. Platform 608 is the same as or similar to platform 504 with reference to FIG. 5. Implementations of example environment 500 can include different and/or additional components or can be connected in different ways.

Guidelines 602 can include publications of regulations, standards, and policies that organizations adhere to. Guidelines 602 serve as the benchmark against which compliance is measured. Guidelines 602 can include publications such as jurisdictional guidelines and organizational guidelines. Jurisdictional guidelines (e.g., governmental regulations) can include guidelines gathered from authoritative sources such as government websites, legislative bodies, and regulatory agencies. Jurisdictional guidelines can be published in legal documents or official publications and cover aspects related to the development, deployment, and use of AI technologies within specific jurisdictions. For example, the California Consumer Privacy Act (CCPA) in the United States mandates cybersecurity measures such as encryption, access controls, and data breach notification requirements to protect personal data. As such, AI developers must implement cybersecurity measures (such as encryption techniques) within the AI models they design and build to ensure the protection of sensitive user data and compliance with the regulations. Organizational guidelines include internal policies, procedures, and guidelines established by organizations to govern activities within the organization's operations. Organizational guidelines can be developed in alignment with industry standards, legal requirements, best practices, and organizational objectives. For example, organizational guidelines can require AI models to include certain access controls to restrict unauthorized access to the model's APIs or data and/or have a certain level of resilience before deployment.

In some implementations, guidelines 602 can any one of text, image, audio, video or other computer-ingestible format. For guidelines 602 that are not text (e.g., image, audio, and/or video), the guidelines 602 can first be transformed into text. Optical character recognition (OCR) can be used for images containing text, and speech-to-text algorithms can be used for audio inputs. For example, an audio recording detailing financial guidelines can be converted into text using a speech-to-text engine that allows the system to parse and integrate the text output into the existing guidelines 602. Similarly, a video demonstrating a particular procedure or protocol can be processed to extract textual information (e.g., extracting captions).

In some implementations, in cases where transforming to text is not feasible or desirable, the system can use vector comparisons to handle non-text inputs directly. For example, images and audio files can be converted into numerical vectors through feature extraction techniques (e.g., by using Convolutional Neural Networks (CNNs) for images and using Mel-Frequency Cepstral Coefficients (MFCCs) for audio files). The vectors represent the corresponding characteristics of the input data (e.g., edges, texture, or shapes of the image, or the spectral features of the audio file).

In some implementations, the guidelines 602 can be stored in a vector store. The vector store stores the guidelines 602 in a structured and accessible format (e.g., using distributed databases or NoSQL stores), which allows for efficient retrieval and utilization by the platform 608. In some implementations, the guidelines 602 are preprocessed to remove any irrelevant information, standardize the format, and/or organize the guidelines 602 into a structured database schema. Once the guidelines 602 are prepared, the guidelines 602 can be stored in a vector store using distributed databases or NoSQL stores. To store the guidelines 602 in the vector store, the guidelines 602 can be encoded into vector representations. The textual data of the guidelines 602 are transformed into numerical vectors that capture the semantic meaning and relationships between words or phrases in the guidelines 602. For example, the text is encoded into vectors using word embeddings and/or TF-IDF encoding. Word embeddings, such as Word2Vec or GloVe, learn vector representations of words based on the word's contextual usage in a large corpus of text data. Each word is represented by a vector in a high-dimensional space, where similar words have similar vector representations. TF-IDF (Term Frequency-Inverse Document Frequency) encoding calculates the importance of a word in a guideline relative to the word's frequency in the entire corpus of guidelines 602. For example, the system can assign higher weights to words that are more unique to a specific document and less common across the entire corpus.

In some implementations, the guidelines 602 are stored using graph databases such as Neo4j™ or Amazon Neptune™. Graph databases represent data as nodes and edges, allowing for the modeling of relationships between guidelines 602 to demonstrate the interdependencies. In some implementations, the guidelines 602 are stored in a distributed file system such as Apache Hadoop™ or Google Cloud Storage™. These systems offer scalable storage for large volumes of data and support parallel processing and distributed computing.

The vector store can be stored in a cloud environment hosted by a cloud provider, or a self-hosted environment. In a cloud environment, the vector store has the scalability of cloud services provided by platforms (e.g., AWS™, Azure™). Storing the vector store in a cloud environment entails selecting the cloud service, provisioning resources dynamically through the provider's interface or APIs, and configuring networking components for secure communication. Cloud environments allow the vector store to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices. Conversely, in a self-hosted environment, the vector store is stored on a private web server. Deploying the vector store in a self-hosted environment entails setting up the server with the necessary hardware or virtual machines, installing an operating system, and storing the vector store. In a self-hosted environment, organizations have full control over the vector store, allowing organizations to implement customized financial measures and compliance policies tailored to the organization's specific needs. For example, organizations in industries with strict data privacy and financial regulations, such as finance institutions, can mitigate security risks by storing the vector store in a self-hosted environment.

Operative standards 604 can be specific obligations derived from the guidelines to comply with the guidelines, and can encompass both specific actionable directives and general principles. In some examples, operative standards 604 can serve as actionable directives that organizations must adhere to in order to meet the requirements laid out in regulatory guidelines or industry best practices (e.g., guidelines 602). For example, an operative standard derived from a data protection guideline might mandate the adoption of a specific framework (e.g., General Data Protection Regulation (GDPR)) for handling personal data, outlining procedures for data access, encryption standards, and breach notification protocols. In another example, an operative standard can include prohibiting a certain action to be taken, such as transmitting confidential information to external sources. In further examples, operative standards 604 encompass the fundamental principles or benchmarks derived from guidelines that guide organizational practices and behaviors towards achieving desired outcomes. For example, in the context of ethical standards within a business, operative standards can include principles such as integrity, transparency, and accountability.

Gaps 606 are instances where the current controls or processes fall short of meeting the operative standards. Gaps 606 can be due to the absence of required controls or the inadequacy of existing controls. For example, in the context of data security, a gap may be identified if a company lacks a comprehensive data encryption policy despite regulatory requirements specifying encryption standards for sensitive information. In another example, though an organization may have implemented access controls for sensitive systems, a gap may be identified when the organization fails to regularly review and update user permissions as required by industry best practices, thereby leaving potential vulnerabilities unaddressed.

Gaps 606 can be managed through a systematic approach that incorporates self-reporting and comprehensive storage of attributes tailored to each scenario associated with the gap 606. A scenario of a gap 606 refers to a specific instance or situation where current controls or processes within an organization do not meet established operative standards 604. Each scenario associated with a gap 606 represents a distinct use case. For instance, a scenario can include a cybersecurity breach due to inadequate data encryption practices, or can include a compliance issue related to incomplete documentation of financial transactions. Each identified gap 606 can be documented with scenario attributes (e.g., metadata, tags) such as a descriptive title, severity level assessment (e.g., graded from 1 to 5, where 1 denotes severe and 5 signifies trivial), and/or tags linking the gap 606 to specific business units or regulatory requirements. The scenario attributes provide a clear understanding of the gap's impact and context. In some implementations, the platform 608 includes a user interface that allows users to input and edit the scenario attributes for each gap of gaps 606.

Platform 608 receives the guidelines, operative standards, and/or identified gaps, and generates mapped gaps 610. The mapped gaps correlate the identified gaps with the specific operative standards the identified gaps fail to meet. Methods of mapping the identified gaps with the specific operative standards are discussed with further reference to FIG. 7.

Figure 7:
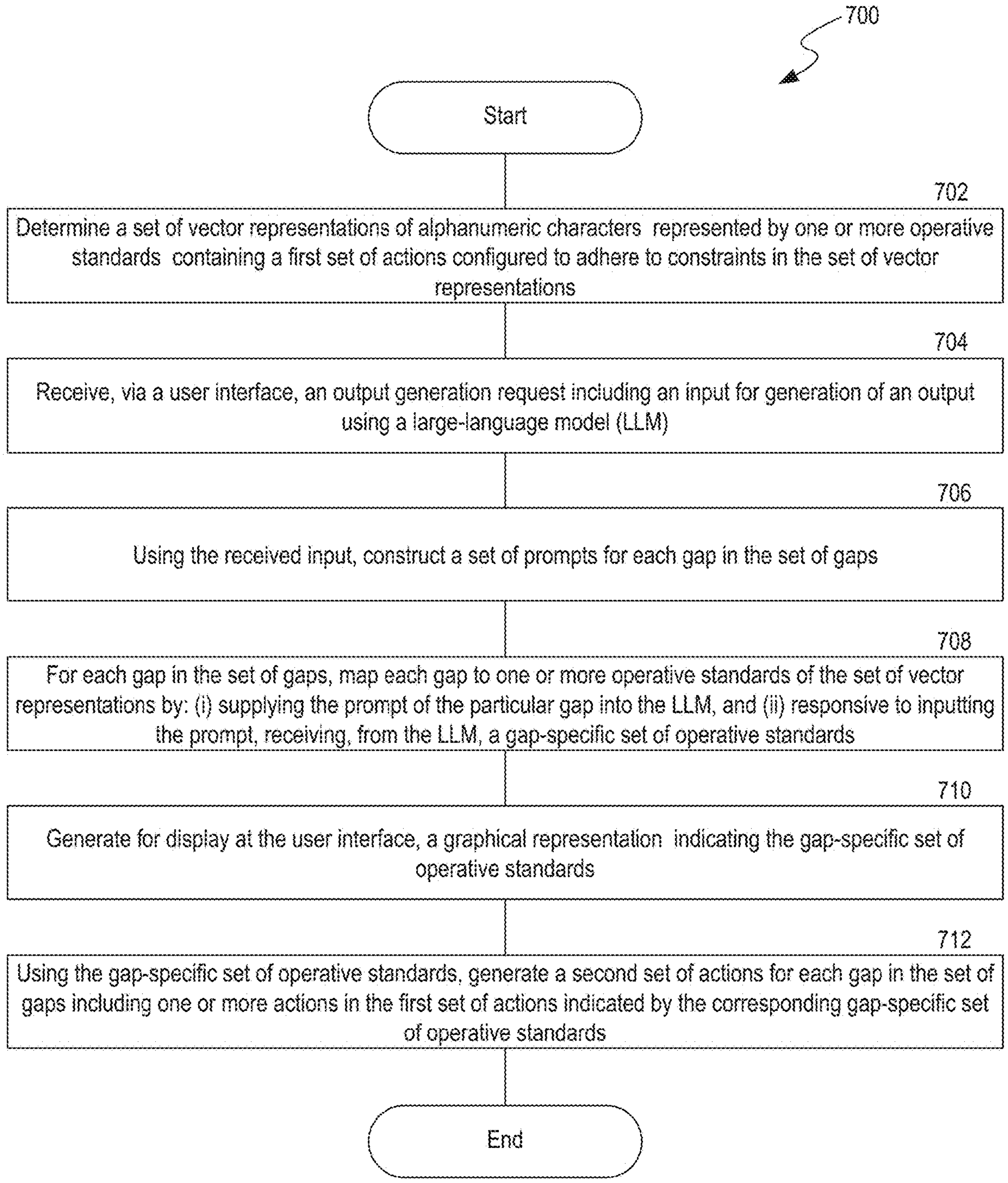
FIG. 7 is a flow diagram illustrating a process of mapping identified gaps in controls to operative standards, in accordance with some implementations of the present technology.

FIG. 7 is a flow diagram illustrating a process 700 of mapping identified gaps in controls to operative standards, in accordance with some implementations of the present technology. In some implementations, the process 700 is performed by components of example devices 200 and computing devices 302 illustrated and described in more detail with reference to FIG. 2 and FIG. 3, respectively. Particular entities, for example, LLM 510, are illustrated and described in more detail with reference to FIG. 5. Likewise, implementations can include different and/or additional operations or can perform the operations in different orders.

In act 702, the system determines a set of vector representations of alphanumeric characters represented by one or more operative standards containing a first set of actions configured to adhere to constraints in the set of vector representations. The set of vector representations of alphanumeric characters is the same as or similar to publications of guidelines 602 discussed with reference to FIG. 6. Methods of transforming different modes (e.g., text, image, audio, video) of guidelines into vector representations are discussed with reference to FIG. 6.

In some implementations, the system receives an indicator of a type of operation associated with the vector representations. The system identifies a relevant set of operative standards associated with the type of the vector representations. The system obtains the relevant set of operative standards, via an Application Programming Interface (API). For example, the system includes input channels or interfaces capable of receiving signals or data tags that denote the type (e.g., nature or purpose) of the vector representations being processed. The system can use an API to retrieve the relevant set of operative standards by implementing API endpoints or integration points that connect the system to a centralized repository or database housing the operative standards that can be tagged with associated metadata related to the type of the vector representation.

In some implementations, the AI model is a first AI model. The system can supply the set of vector representations or the original publications of the guidelines into a second AI model. In response, the system can receive from the second AI model, a set of summaries summarizing the set of vector representations, where at least one prompt in the set of prompts includes one or more summaries in the set of summaries. The set of summaries is a representation of the set of vector representations. The set of summaries, in some implementations, serves as a distilled and coherent representation of the textual content derived from set of vector representations. The set of summaries encapsulates the key themes, sentiments, or pertinent information embedded in the guidelines. The summarization process not only captures the essence of user sentiments but also allows for efficient comprehension and analysis. By condensing voluminous textual content into condensed summaries (e.g., the set of summaries), the system allows users to obtain a comprehensive and accessible understanding of the guidelines. For example, the prompt input into the second AI model can request a summary of the provided text or guidelines by including directives such as "Summarize the following text into key points," or "Provide a concise summary capturing the main themes and most important information." Additionally, the prompt can include context or specific aspects to focus on, such as "Provide the major regulatory requirements and the requirements' implications." The prompt can also include definitions of particular terms, such as operative standards or controls.

In act 704, the system receives, via a user interface, an output generation request including an input for generation of an output using a large-language model (LLM). The input includes a set of gaps associated with one or more scenarios failing to satisfy the one or more operative standards of the set of vector representations. Examples of gaps are discussed with reference to gaps 606 in FIG. 6. Each scenario is associated with a unique identifier and corresponding metrics indicating one or more actions in the first set of actions absent from the scenario. Examples of scenarios are discussed with reference to FIG. 6. Each gap in the set of gaps includes a set of attributes defining the scenario including the unique identifier of the scenario, the corresponding metrics of the scenario, the corresponding vector representations associated with the scenario, a title of the scenario, a summary of the scenario, and/or a severity level of the scenario.

In some implementations, the set of attributes defining the scenario includes a binary indicator of the severity level of the scenario, a category of the severity level of the scenario, and/or a probability associated with the severity level of the scenario. For instance, a binary indicator can be set to '1' for severe (indicating an issue that requires immediate attention)

or '0' for non-severe (where the issue is less urgent but still requires resolution). In another example, categories can range from 'Low' to 'High' severity, helping prioritize remedial actions based on the potential impact and risk associated with each scenario. In a further example, a high probability value can indicate that the compliance gap is highly likely to lead to regulatory fines or data breaches if not addressed promptly.

In act 706, using the received input, the system constructs a set of prompts for each gap in the set of gaps. The set of prompts for a particular gap includes the set of attributes defining the scenario, such as scenario identifiers, severity assessments (e.g., criticality level), summaries outlining the compliance issue, the first set of actions (e.g., actionable directives or general principles of FIG. 6) of the one or more operative standards, and/or the set of vector representations. In some implementations, the set of prompts for each gap in the set of gaps includes a set of pre-loaded query contexts defining one or more sets of alphanumeric characters associated with the set of vector representations. The pre-loaded query contexts include predefined templates, rules, or configurations that specify criteria for mapping gaps to operative standards. For example, the pre-loaded query context can include definitions of terms such as operative standards and/or gaps. The prompts serve as input to a large-language model (LLM), which is designed to process natural language inputs and generate structured outputs based on learned patterns and data.

In act 708, for each gap in the set of gaps, the system maps the gap to one or more operative standards of the set of vector representations. The system supplies the prompt of the particular gap into the LLM. Responsive to inputting the prompt, the system receives, from the LLM, a gap-specific set of operative standards including the one or more operative standards associated with the particular gap. In some implementations, the system can generate, for each gap-specific set of operative standard of the set of gap-specific set of operative standards for each gap, an explanation associated with how the one or more operative standards is mapped. The output of the LLM can be in the form of alphanumeric characters. In some implementations, responsive to inputting the prompt, the system receives, from the AI model, the gap-specific set of operative standards, and the corresponding sets of vector representations.

In some implementations, the prompt into the LLM includes a directive to provide a first explanation of why a particular gap should be mapped to a particular operative standard, and also a second explanation of why a particular gap should not be mapped to a particular operative standard. The prompt can further include a directive to provide why the first explanation or the second explanation is weighted more (e.g., why a certain mapping occurs). In some implementations, a human individual can approve or disapprove the mappings based on the first and/or second explanations. Allowing a human-in-the-loop (HITL) and generating a first and second explanation provides transparency to users of the platform regarding the generated mappings.

In act 710, the system generates for display at the user interface, a graphical representation indicating the gap-specific set of operative standards. The graphical representation includes a first representation of each gap in the set of gaps and a second representation of the corresponding gap-specific set of operative standards. In some implementations, each gap is visually represented to highlight its specific attributes, such as severity level, scenario identifier, and a summary detailing the gap. The graphical representations can use charts, diagrams, or visual frameworks that integrate color coding, icons, or annotations to denote severity levels, compliance progress, or overdue actions. Annotations within the graphical representation can offer additional context or explanations regarding each gap and its alignment with operative standards. Overlays can be used to indicate overdue actions, completed mappings, and/or compliance deadlines.

In act 712, using the gap-specific set of operative standards, the system generates a second set of actions for each gap in the set of gaps including one or more actions in the first set of actions indicated by the corresponding gap-specific set of operative standards. The second set of actions can modify a portion of the scenario in the corresponding gap to satisfy the one or more operative standards of the set of vector representations. For instance, actions may involve updating policies, enhancing security measures, implementing new protocols, and/or conducting training sessions to improve organizational practices and mitigate risks. Each action can be linked directly to the corresponding gap and its associated operative standards.

In some implementations, the set of prompts is a first set of prompts, and the gap-specific set of operative standards is a first set of operative standards. Using the received input, the system constructs a second set of prompts for each gap in the set of gaps. The second set of prompts for a particular gap includes the set of attributes defining the scenario and the set of vector representations. Using the second set of prompts, the system receives, from the LLM, a second set of operative standards for each gap in the set of gaps. Using the second set of operative standards, the system constructs a third set of prompts for each gap in the set of gaps. The third set of prompts for the particular gap includes the set of attributes defining the scenario and the first set of actions of the one or more operative standards. Using the third set of prompts, the system receives, from the LLM, a third set of operative standards for each gap in the set of gaps. The iterative approach of using multiple sets of prompts with the LLM enhances the system's capability to adapt and respond dynamically to previously generated mappings and thus contributes to a continuous improvement process where insights gained from each interaction cycle contribute to more refined strategies for achieving alignment of an organization with the operative standards.

In some implementations, the set of prompts is a first set of prompts. For each vector representation in the received set of vector representations, the system identifies a set of textual content representative of the set of vector representations. The system partitions the set of textual content into a plurality of text subsets of the set of textual content based on predetermined criteria. The predetermined criteria can include a length of each text subset and/or a complexity of each text subset. For example, the predetermined criteria can be token count or character limit to ensure uniformity and coherence in the division process. Chunking the textual content breaks down a large amount of textual content into manageable units. For token-based partitioning, the system calculates the number of linguistic units, or tokens, within the textual content. These tokens, in some implementations, encompass individual words, phrases, or even characters, depending on the specific linguistic analysis employed. The predetermined token count criterion sets a quantitative guideline, dictating the number of linguistic units encompassed within each chunk. In some implementations, when employing a character limit criterion, the system focuses on the total number of characters within the textual content character limit criterion, in some implementations, involves assessing both alphanumeric characters and spaces, providing a more fine-grained measure of the content's structural intricacies. The predetermined character limit establishes an upper threshold, guiding the system to create segments that adhere to the predefined character limit.

The system can receive user feedback related to deviations between the gap-specific set of operative standards and a desired set of operative standards. The system can iteratively adjust the sets of prompts to modify the gap-specific set of operative standards to the desired set of operative standards. The system can generate action plans, updating compliance strategies, and/or refine operational practices to enhance alignment with the set of vector representations. The system can generate a set of actions (e.g., a modification plan) that adjust the current attributes of the scenario to a desired set of attributes of the scenario. The system can identify the root cause of the difference between the attributes of the scenario and the desired set of attributes of the scenario. For example, the desired set of attributes of the scenario can include a certain action not found in the current attributes of the scenario (e.g., an anonymization procedure). The actions (e.g., the anonymization procedure) can be preloaded into the system.

Generating Actionable Items from Guidelines Using the Data Generation Platform

Figure 8:
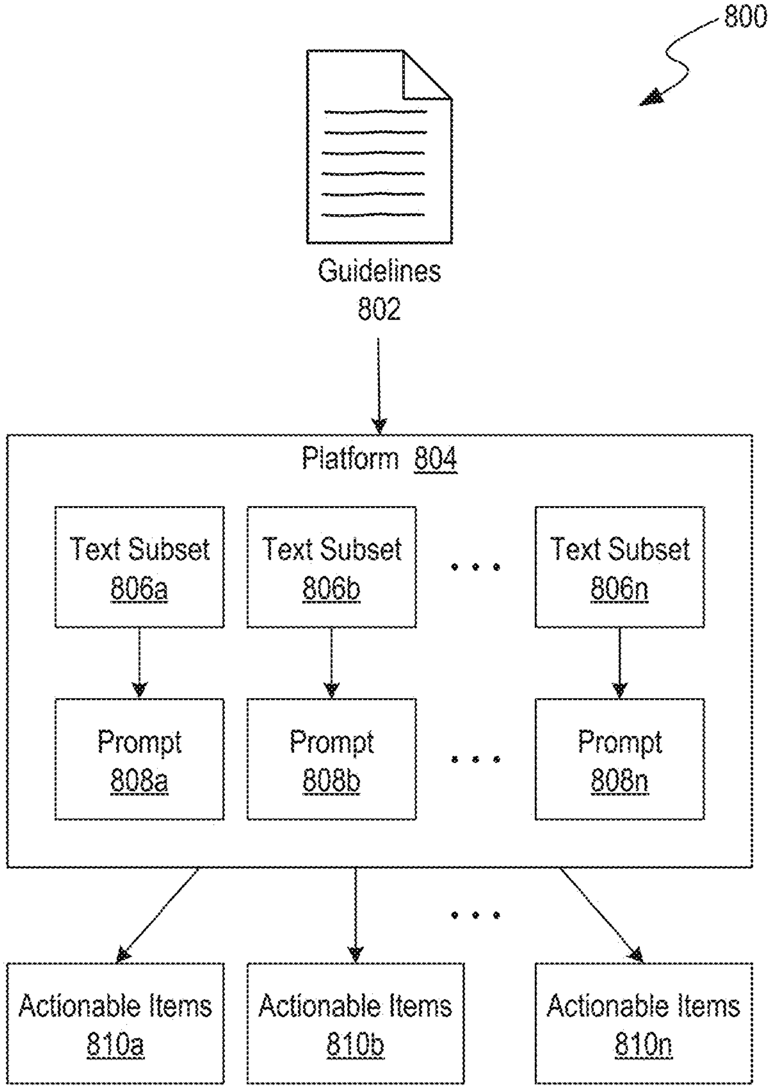
FIG. 8 is an illustrative diagram illustrating an example environment of the platform identifying actionable items from guidelines, in accordance with some implementations of the present technology.

FIG. 8 is an illustrative diagram illustrating an example environment 800 of the platform identifying actionable items 810*a-n* from guidelines 802, in accordance with some implementations of the present technology. Environment 800 includes guidelines 802, platform 804, text subsets 806*a-n*, prompts 808*a-n*, and actionable items 810*a-n*. Guidelines 802 are the same as or similar to guidelines 602 with reference to FIG. 6. Platform 804 is the same as or similar to platform 504 with reference to FIG. 5. Implementations of example environment 800 can include different and/or additional components or can be connected in different ways.

Platform 804 can be a web-based application that hosts various use cases, such as compliance, that allows users to interact via a front-end interface. Inputs to the platform 804 can be guidelines 802 in various formats (e.g., text, Excel). Further examples of platform 804 are discussed with reference to platform 504 in FIG. 5. The backend of platform 804 can chunk (e.g., partition) the guidelines into text subsets 806*a-n* and vectorize the text subsets 806*a-n*. The vectorized representations of the text subsets 806*a-n* can be stored in a database accessible by the platform 804. The platform 804 can use an API call to send prompts to an AI model (such as an LLM), as described further in FIG. 5. The AI model processes the prompts and returns the output of actionable items to the backend of platform 804, which can format the output into a user-friendly structure.

Text subsets 806*a-n* refer to portions of the guidelines 802 that have been extracted or divided (e.g., based on specific criteria) into smaller segments. Each text subsets 806*a-n* can be categorized by topic, section, or other relevant factors. By breaking down large volumes of text into subsets, the platform can focus on specific parts of the guidelines. The structured approach additionally allows the platform to handle large volumes of regulatory text efficiently.

Prompts 808*a-n* are specific queries or instructions generated from the text subsets 806*a-n* that are formulated to direct the behavior and output of an AI model, such as identifying actionable items from the text subsets 806*a-n* of regulatory guidelines 802. For example, for text subset 806*a*, a corresponding prompt 808*a* is constructed. In some implementations, a prompt can include multiple text subsets. In some implementations, a single text subset can be associated with multiple prompts. Prompts 808*a-n* causes the AI model to identify particular attributes of the text subsets 806*a-n*, such as regulatory obligations or compliance requirements to dynamically generate meaningful outputs (e.g., actionable items). In some implementations, the prompts 808*a-n* can be generated using a second AI model. The second AI model can analyze the text subsets 806*a-n* or the guidelines 802 directly to identify features of the text subset such as context, entities, and the relationships between the features by, for example, breaking down the input into smaller components and/or tagging predefined keywords. The second AI model can construct prompts that are contextually relevant using the identified features. For instance, if the input pertains to compliance guidelines, the second AI model can identify sections within the guidelines and frame prompts that highlight the most relevant information (e.g., information directed towards compliance guidelines). The prompts can include specific questions or statements that direct the first AI model to focus on particular aspects, such as "What are the key compliance requirements for data protection in this guideline?"

The second AI model can, in some implementations, employ query expansion. Query expansion is a process that enhances the original query by including synonyms, related concepts, and/or additional contextually relevant terms to improve the comprehensiveness of the response. For example, if the initial prompt is "Identify key actionable items for data protection," the second AI model can expand the query by including keywords such as "privacy regulations," "data security measures," and "information governance." In some implementations, the second AI model can reference domain-specific thesauruses and/or pre-trained word embeddings to find synonyms and related terms to the identified elements.

Prompts 808*a-n* can include definitions, keywords, and instructions that guide the AI model in identifying relevant actionable items. For instance, definitions can clarify what constitutes an "actionable item" or "obligation." Further, prompts 808*a-n* can specify keywords like "must," "shall," or "required." The keywords may indicate mandatory actions or prohibitions that need to be identified as actionable items. For example, a prompt can instruct the AI model to flag any sentence containing the word "must" as it likely denotes a regulatory requirement. In another example, prompts 808*a-n* can direct the AI model to extract all instances of deadlines for compliance actions, descriptions of required documentation, or procedures for reporting to regulatory bodies. Instructions can also include formatting guidelines, ensuring that the extracted actionable items are presented in a consistent and usable format.

Actionable items 810*a-n* (e.g., directives, actions) are the specific tasks or requirements identified by the AI model from the guidelines, based on the analysis of text subsets 806*a-n* and prompts 808*a-n*. In some implementations, rather than being mere excerpts from the text subsets 806*a-n*, actionable items 810*a-n* can be distilled, comprehensive instructions that define specific measures or procedures to implement. For instance, an actionable item might outline the frequency and format of compliance reports required, specify the data to be included, and designate the department responsible for submission. Actionable items 810*a-n* are designed to translate regulatory text into actionable operations that organizations can directly operationalize. Actionable items 810*a-n* can include tasks such as reporting, record-keeping, compliance checks, and other regulatory actions.

Each actionable item can include metadata such as the responsible party within the organization, the type of customer or stakeholder affected, and/or other relevant identifiers. An AI model can use natural language processing (NLP) algorithms to parse through text subsets 806*a-n* to identify relevant phrases, keywords, and semantic structures (e.g., as instructed by the prompts 808*a-n*) that indicate actionable items 810*a-n* within the guidelines 802. Prompts 808*a-n* can direct the AI model by providing contextual cues and specific queries that direct the AI model to focus on particular guidelines or aspects of guidelines within guidelines 802.

Example Implementations of a Validation Engine of the Data Generation Platform

Figure 9:
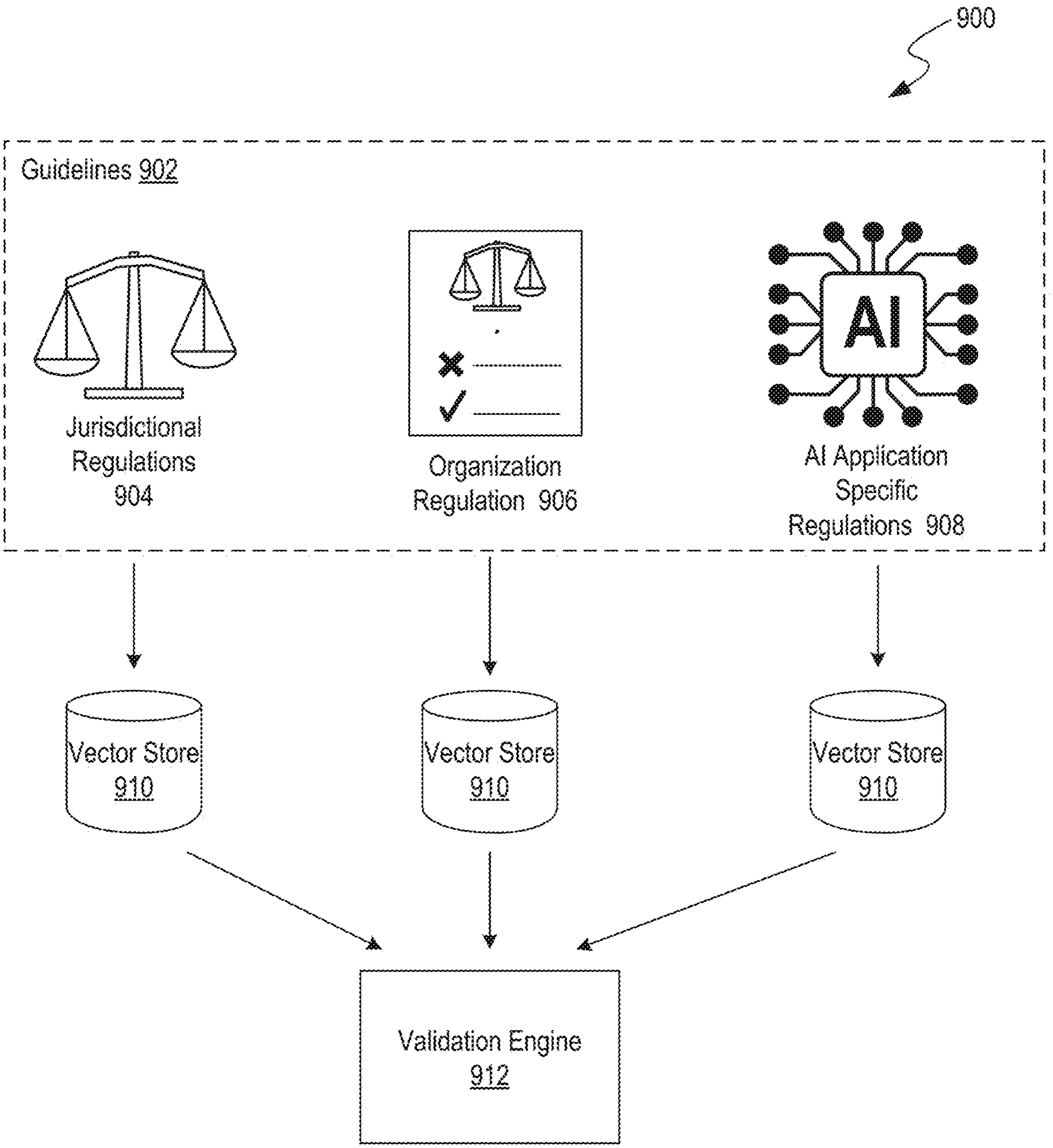
FIG. 9 is a block diagram illustrating an example environment for using the guidelines input into the validation engine for determining AI compliance, in accordance with some implementations of the present technology.

FIG. 9 is a block diagram illustrating an example environment 900 for using the guidelines input into the validation engine for determining AI compliance, in accordance with some implementations of the present technology. Environment 900 includes guidelines 902 (e.g., jurisdictional regulations 904, organization regulation 906, AI application-specific regulations 908), vector store 910, and validation engine 912. Validation engine can be the same as or similar to generative model engine 120 in data generation platform 102 discussed with reference to FIG. 1. Vector store 910 and validation engine 912 are implemented using components of example devices 200 and computing devices 302 illustrated and described in more detail with reference to FIG. 2 and FIG. 3, respectively. Likewise, implementations of example environment 900 can include different and/or additional components or can be connected in different ways.

Guidelines 902 can include various elements such as jurisdictional regulations 904, organizational regulations 906, and AI applications-specific regulations 908 (e.g., unsupervised learning, natural language processing (NLP), generative AI). Jurisdictional regulations 904 (e.g., governmental regulations) can include regulations gathered from authoritative sources such as government websites, legislative bodies, and regulatory agencies. Jurisdictional regulations 904 can be published in legal documents or official publications and cover aspects related to the development, deployment, and use of AI technologies within specific jurisdictions. Organizational regulations 906 includes internal policies, procedures, and guidelines established by organizations to govern AI-related activities within the organization's operations. Organizational regulations 906 can be developed in alignment with industry standards, legal requirements, and organizational objectives. AI application-specific regulations 908 include regulations that pertain to specific types of AI applications, such as unsupervised learning, natural language processing (NLP), and generative AI. Each type of AI application presents unique challenges and considerations in terms of compliance, ethical use, and/or regulatory adherence. For example, unsupervised learning algorithms, where the model learns from input data without labeled responses, may be subject to regulations that prevent bias and discrimination in unsupervised learning models. Natural language processing (NLP) technologies, which enable computers to understand, interpret, and generate human language, may be subject to specific regulations aimed at safeguarding user privacy. Generative AI, which autonomously creates new content, may focus on intellectual property rights, content moderation, and ethical use cases. AI developers may need to incorporate additional mechanisms for copyright protection, content filtering, and/or user consent management to comply with regulations related to generative AI technologies.

The guidelines 902 are stored in a vector store 910. The vector store 910 stores the guidelines 902 in a structured and accessible format (e.g., using distributed databases or NoSQL stores), which allows for efficient retrieval and utilization by the validation engine 912. In some implementations, the guidelines 902 are preprocessed to remove any irrelevant information, standardize the format, and/or organize the guidelines 902 into a structured database schema. Once the guidelines 902 are prepared, the guidelines 902 can be stored in a vector store 910 using distributed databases or NoSQL stores.

To store the guidelines 902 in the vector store 910, the guidelines 902 can be encoded into vector representations for subsequent retrieval by the validation engine 912. The textual data of the guidelines 902 are transformed into numerical vectors that capture the semantic meaning and relationships between words or phrases in the guidelines 902. For example, the text is encoded into vectors using word embeddings and/or TF-IDF encoding. Word embeddings, such as Word2Vec or GloVe, learn vector representations of words based on the word's contextual usage in a large corpus of text data. Each word is represented by a vector in a high-dimensional space, where similar words have similar vector representations. TF-IDF (Term Frequency-Inverse Document Frequency) encoding calculates the importance of a word in a guideline relative to the word's frequency in the entire corpus of guidelines 902. For example, the system can assign higher weights to words that are more unique to a specific document and less common across the entire corpus.

In some implementations, the guidelines 902 are stored using graph databases such as Neo4j™ or Amazon Neptune™. Graph databases represent data as nodes and edges, allowing for the modeling of relationships between guidelines 902 to demonstrate the interdependencies. In some implementations, the guidelines 902 are stored in a distributed file system such as Apache Hadoop™ or Google Cloud Storage™. These systems offer scalable storage for large volumes of data and support parallel processing and distributed computing. Guidelines 902 stored in a distributed file system can be accessed and processed by multiple nodes simultaneously, which allows for faster retrieval and analysis by the validation engine.

The vector store 910 can be stored in a cloud environment hosted by a cloud provider, or a self-hosted environment. In a cloud environment, the vector store 910 has the scalability of cloud services provided by platforms (e.g., AWS™, Azure™). Storing the vector store 910 in a cloud environment entails selecting the cloud service, provisioning resources dynamically through the provider's interface or APIs, and configuring networking components for secure communication. Cloud environments allow the vector store 910 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 910 is stored on a private web server. Deploying the vector store 910 in a self-hosted environment entails setting up the server with the necessary hardware or virtual machines, installing an operating system, and storing the vector store 910. In a self-hosted environment, organizations have full control over the vector store 910, allowing organizations to implement customized security measures and compliance policies tailored to the organization's specific needs. For example, organizations in industries with strict data privacy and security regulations, such as finance institutions, can mitigate security risks by storing the vector store 910 in a self-hosted environment.

The validation engine 912 accesses the guidelines 902 from the vector store 910 to initiate the compliance assessment. The validation engine 912 can establish a connection to the vector store 910 using appropriate APIs or database drivers. The connection allows the validation engine 912 to query the vector store 910 and retrieve the relevant guidelines for the AI application under evaluation. Frequently accessed guidelines 902 are stored in memory, which allows the validation engine 912 to reduce latency and improve response times for compliance assessment tasks. In some implementations, only the relevant guidelines are retrieved based on the specific AI application under evaluation. For example, metadata tags, categories, or keywords associated with the AI application can be used to filter the guidelines 902.

The validation engine 912 evaluates the AI application's compliance with the retrieved guidelines 902, (e.g., using semantic search, pattern recognition, and machine learning techniques). For example, the validation engine 912 compares the vector representations of the different explanations and outcomes by calculating the cosine of the angle between the two vectors indicating the vectors' directional similarity. Similarly, for comparing explanations, the validation engine 912 can measure the intersection over the union of the sets of words in the expected and case-specific explanations.

Figure 10:
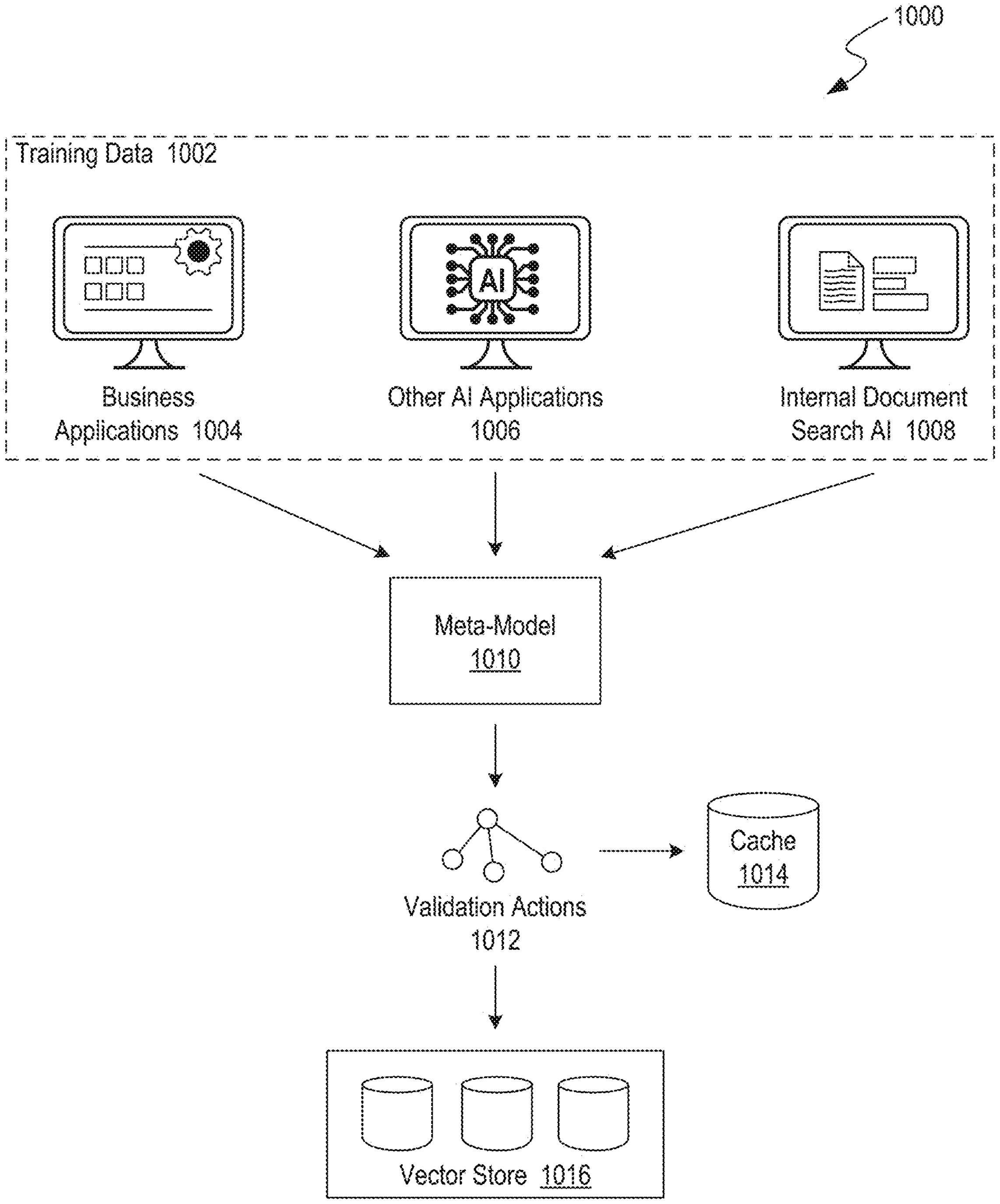
FIG. 10 is a block diagram illustrating an example environment for generating validation actions to determine AI model compliance, in accordance with some implementations of the present technology.

FIG. 10 is a block diagram illustrating an example environment 1000 for generating validation actions to determine AI model compliance, in accordance with some implementations of the present technology. Environment 1000 includes training data 1002, meta-model 1010, validation actions 1012, cache 1014, and vector store 1016. Meta-model 1010 is implemented using components of example devices 200 and computing devices 302 illustrated and described in more detail with reference to FIG. 2 and FIG. 3, respectively. Likewise, implementations of example environment 1000 can include different and/or additional components or can be connected in different ways.

The training data includes data from sources such as business applications 1004, other AI applications 1006, and/or an internal document search AI 1008. Business applications 1004 refer to software tools or systems used to facilitate various aspects of business operations and can include data related to, for example, loan transaction history, customer financial profiles, credit scores, and income verification documents. For example, data from a banking application can provide insights into an applicant's banking behavior, such as average account balance, transaction frequency, and bill payment history. Other AI applications 1006 can include, for example, credit scoring models, fraud detection algorithms, and risk assessment systems that can be used by lenders to evaluate loan applications. Data from AI applications 1006 refer to various software systems that utilize artificial intelligence (AI) techniques to perform specific tasks or functions. The data can include credit risk scores and fraud risk indicators. For example, an AI-powered credit scoring model can provide a risk assessment score based on an applicant's credit history, debt-to-income ratio, and other financial factors. The internal document search AI 1008 is an AI system tailored for searching and retrieving information from internal documents within an organization. For example, the internal document search AI 1008 can be used to retrieve and analyze relevant documents such as loan agreements, regulatory compliance documents, and internal policies. Data from internal documents can include, for example, legal disclosures, loan terms and conditions, and compliance guidelines. For example, the AI system can flag loan applications that contain discrepancies or inconsistencies with regulatory guidelines or internal policies.

The training data 1002 is fed into the meta-model 1010 to train the meta-model 1010, enabling the meta-model 1010 to learn patterns and characteristics associated with compliant and non-compliant AI behavior. Further discussion of Artificial Intelligence and training methods are discussed in FIG. 7. The meta-model 1010 leverages the learned patterns and characteristics to generate validation actions 1012, which serve as potential use-cases designed to evaluate AI model compliance. The validation actions 1012 can encompass various scenarios and use cases relevant to the specific application domain of the AI model under assessment. Further methods of creating validation actions are discussed in FIGS. 12-14.

In some implementations, the generated validation actions 1012 can be stored in a cache 1014 and/or a vector store 1016. The cache 1014 is a temporary storage mechanism for storing recently accessed or frequently used validation actions, and facilitates efficient retrieval when needed. On the other hand, the vector store 1016 provides a structured repository for storing vector representations of validation actions, enabling efficient storage and retrieval based on similarity or other criteria. The vector store 1016 stores the generated validation actions 1012 in a structured and accessible format (e.g., using distributed databases or NoSQL stores), which allows for efficient retrieval and utilization by the meta-model 1010. The generated validation actions 1012 can be preprocessed to remove any irrelevant information, standardize the format, and/or organize the generated validation actions 1012 into a structured database schema. Once the generated validation actions 1012 are prepared, the generated validation actions 1012 can be stored in a vector store 1016 using distributed databases or NoSQL stores.

In some implementations, the generated validation actions 1012 are stored using graph databases such as Neo4j™ or Amazon Neptune™. Graph databases represent data as nodes and edges, allowing for the modeling of relationships between generated validation actions 1012 to demonstrate the interdependencies. In some implementations, the generated validation actions 1012 are stored in a distributed file system such as Apache Hadoop™ or Google Cloud Storage™. The systems offer scalable storage for large volumes of data and support parallel processing and distributed computing. Generated validation actions 1012 stored in a distributed file system can be accessed and processed by multiple nodes simultaneously, which allows for faster retrieval and analysis by the meta-model 1010.

The vector store 1016 can be stored in a cloud environment hosted by a cloud provider, or a self-hosted environment. In a cloud environment, the vector store 1016 has the scalability of cloud services provided by platforms (e.g., AWS™, Azure™). Storing the vector store 1016 in a cloud environment entails selecting the cloud service, provisioning resources dynamically through the provider's interface or APIs, and configuring networking components for secure communication. Cloud environments allow the vector store 1016 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 1016 is stored on a private web server. Deploying the vector store 1016 in a self-hosted environment entails setting up the server with the necessary hardware or virtual machines, installing an operating system, and storing the vector store 1016. In a self-hosted environment, organizations have full control over the vector store 1016, allowing organizations to implement customized security measures and compliance policies tailored to the organization's specific needs. For example, organizations in industries with strict data privacy and security regulations, such as finance institutions, can mitigate security risks by storing the vector store 1016 in a self-hosted environment.

The meta-model 1010 accesses the generated validation actions 1012 from the vector store 1016 to initiate the compliance assessment. The system can establish a connection to the vector store 1016 using appropriate APIs or database drivers. The connection allows the meta-model 1010 to query the vector store 1016 and retrieve the relevant vector constraints for the AI application under evaluation. Frequently accessed validation actions 1012 are stored in memory, which allows the system to reduce latency and improve response times for compliance assessment tasks.

In some implementations, only the relevant validation actions are retrieved based on the specific AI application under evaluation. For example, metadata tags, categories, or keywords associated with the AI application can be used to filter the validation actions 1012. The relevant validation actions can be specifically selected based on the specific context and requirements of the AI application being evaluated. For example, the system analyzes metadata tags, keywords, or categories associated with the validation actions 1012 stored in the system's database. Using the specific context and requirements of the AI application, the system filters and retrieves the relevant validation actions from the database.

Various filters can be used to select relevant validation actions. In some implementations, the system uses natural language processing (NLP) to parse through the text of the validation action 1012 and identify key terms, phrases, and clauses that denote regulatory obligations relevant to the AI application's domain. The specific terms related to the AI application's domain can be predefined and include, for example, "patient privacy" for healthcare sector applications. Using the specific terms related to the AI application's domain as a filter, the system can filter out the non-relevant validation actions. To identify the relevant validation actions from the validation actions 1012, the system can determine the specific terms to use as filters by calculating the similarity between vectors representing domain-specific terms (e.g., "healthcare") and vectors representing other terms related to the domain (e.g., "patient privacy"), domain-specific terms can be identified based on the proximity of the other terms to known terms of interest. A similarity threshold can be applied to filter out terms that are not sufficiently similar to known domain-specific terms.

In some implementations, the system can tag relevant validation actions with attributes that help contextualize the relevant validation actions. The tags serve as markers that categorize and organize the validation actions 1012 based on predefined criteria, such as regulatory topics (e.g., data privacy, fairness, transparency) or jurisdictional relevance (e.g., regional regulations, industry standards). The tags provide a structured representation of the validation actions 1012 and allow for easier retrieval, manipulation, and analysis of regulatory content. The tags and associated metadata can be stored in a structured format, such as a database, where each validation action 1012 is linked to the validation action's 1012 corresponding tags and/or regulatory provisions.

The meta-model 1010 evaluates the AI application's compliance with the vector constraints through the use of validation actions 1012 (e.g., using semantic search, pattern recognition, and machine learning techniques). Further evaluation methods in determining compliance of AI applications are discussed with reference to FIGS. 12-14.

Figure 11:
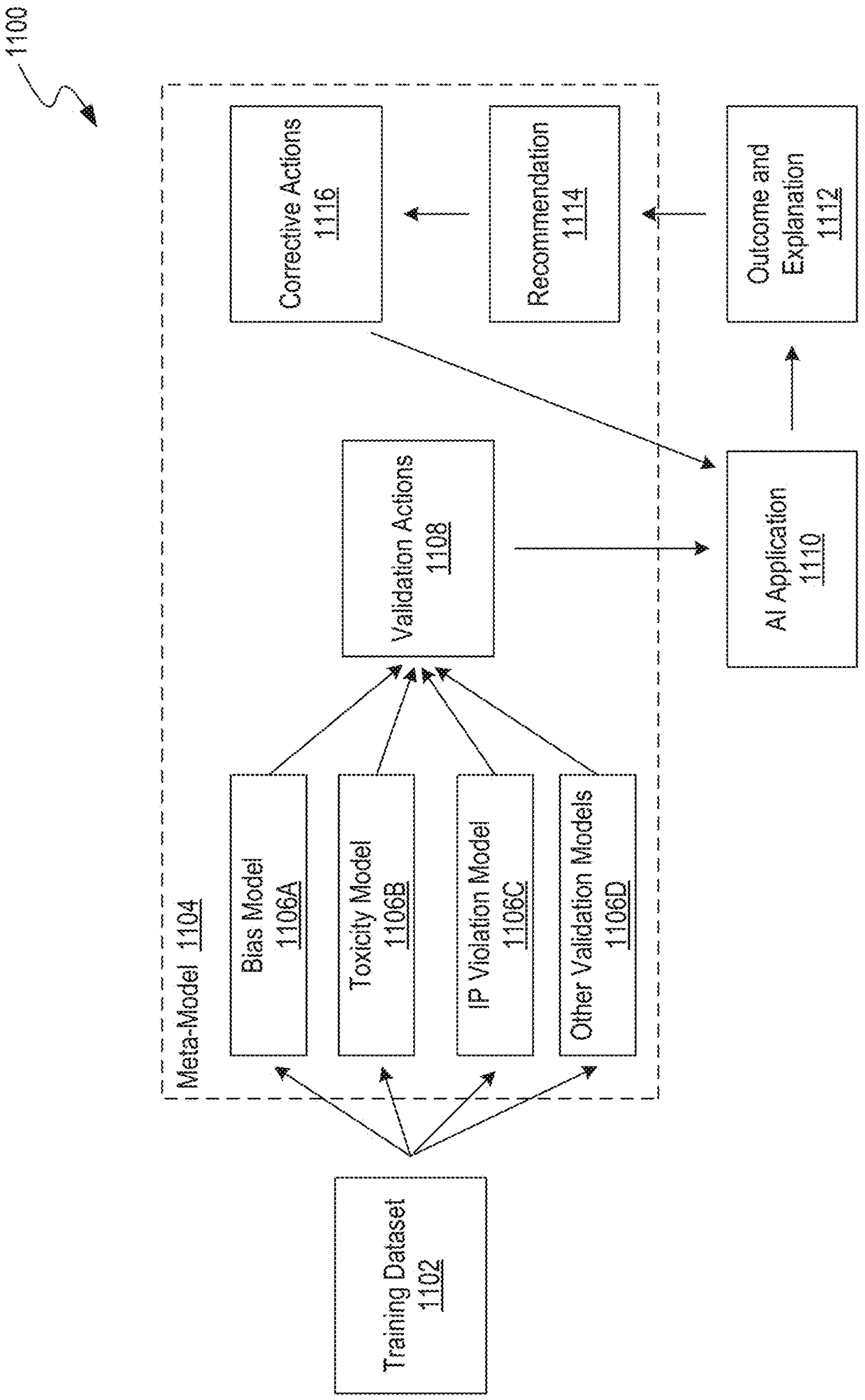
FIG. 11 is a block diagram illustrating an example environment for automatically implementing corrective actions on the AI model, in accordance with some implementations of the present technology.

FIG. 11 is a block diagram illustrating an example environment 1100 for automatically implementing corrective actions on the AI model, in accordance with some implementations of the present technology. Environment 1100 includes training dataset 1102, meta-model 1104 (which includes validation models 1106A-D, validation actions 1108, AI application 1110), outcome and explanation 1112, recommendation 1114, and corrective actions 1116. Meta-model 1104 is the same as or similar to meta-model 1010 illustrated and described in more detail with reference to FIG. 10. Meta-model 1104 and AI application 1110 are implemented using components of example devices 200 and computing devices 302 illustrated and described in more detail with reference to FIG. 2 and FIG. 3, respectively. Likewise, implementations of example environment 1100 can include different and/or additional components or can be connected in different ways.

A training dataset 1102, which includes a collection of data used to train machine learning models, is input into the meta-model 1104. The meta-model 1104 is a comprehensive model that encompasses multiple sub-models tailored to address specific aspects of AI compliance. Within the meta-model 1104, various specialized models are included, such as a bias model 1106A (described in further detail with reference to FIG. 5), a toxicity model 1106B (described in further detail with reference to FIG. 6), an IP violation model 1106C (described in further detail with reference to FIG. 7), and other validation models 1106D. Each of the models is responsible for detecting and assessing specific types of non-compliant content within AI models. Upon processing the training dataset 1102, each model generates validation actions tailored to evaluate the presence or absence of specific types of non-compliant content. Further evaluation techniques in generating validation actions using the meta-model 1104 are discussed with reference to FIGS. 12-14.

The set of generated validation actions 1108 is provided as input to an AI application 1110 in the form of a prompt. The AI application 1110 processes the validation actions 1108 and produces an outcome along with an explanation 1112 detailing how the outcome was determined. Subsequently, based on the outcome and explanation 1112 provided by the AI application 1110, the system can generate recommendations 1114 for corrective actions. The recommendations are derived from the analysis of the validation action outcomes and aim to address any identified issues or deficiencies. For example, if certain validation actions fail to meet the desired criteria due to specific attribute values or patterns, the recommendations can suggest adjustments to those attributes or modifications to the underlying processes.

For a bias detection model, such as the ML model discussed in FIG. 5, if certain attributes exhibit unexpected associations or distributions, the system can retrain the tested AI model with revised weighting schemes to better align with the desired vector constraints. In a toxicity model, such as the ML model discussed in FIG. 6, the corrective actions can include implementing post-processing techniques in the tested AI model to filter out responses that violate the vector constraints (e.g., filtering out responses that include the identified vector representations of the alphanumeric characters). Similarly, in an IP rights violation model, such as the ML model discussed in FIG. 7, the corrective actions can include implementing post-processing techniques in the tested AI model to filter out responses that violate the IP rights (e.g., filtering out responses including the predetermined alphanumeric characters).

In some implementations, based on the outcomes and explanations, the system applies predefined rules or logic to determine appropriate corrective actions. The rules can be established by users and can consider factors such as regulatory compliance, risk assessment, and business objectives. For example, if an application is rejected due to insufficient income, the system can recommend requesting additional financial documentation from the applicant.

In some implementations, the system can use machine learning models to generate recommendations. The models learn from historical data and past decisions to identify patterns and trends that indicate a set of actions the AI model can take to comply with the vector constraints. By training on a dataset of past corrective actions and the outcomes, the machine learning models can predict the most effective recommendations for new cases. Further discussion of Artificial Intelligence and training methods are discussed in FIG. 7. The recommendations 1114 can be automatically implemented as corrective actions 1116 by the system. The automated approach streamlines the process of addressing identified issues and ensures swift remediation of non-compliant content within AI models, enhancing overall compliance and reliability.

FIG. 11 is a block diagram illustrating an example environment 1100 for automatically implementing corrective actions on the AI model, in accordance with some implementations of the present technology. Environment 1100 includes training dataset 1102, meta-model 1104 (which includes validation models 1106A-D, validation actions 1108, AI application 1110), outcome and explanation 1112, recommendation 1114, and corrective actions 1116. Meta-model 1104 is the same as or similar to meta-model 1010 illustrated and described in more detail with reference to FIG. 10. Meta-model 1104 and AI application 1110 are implemented using components of example devices 200 and computing devices 302 illustrated and described in more detail with reference to FIG. 2 and FIG. 3, respectively. Likewise, implementations of example environment 1100 can include different and/or additional components or can be connected in different ways.

A training dataset 1102, which includes a collection of data used to train machine learning models, is input into the meta-model 1104. The meta-model 1104 is a comprehensive model that encompasses multiple sub-models tailored to address specific aspects of AI compliance. Within the meta-model 1104, various specialized models are included, such as a bias model 1106A (described in further detail with reference to FIG. 5), a toxicity model 1106B (described in further detail with reference to FIG. 6), an IP violation model 1106C (described in further detail with reference to FIG. 7), and other validation models 1106D. Each of the models is responsible for detecting and assessing specific types of non-compliant content within AI models. Upon processing the training dataset 1102, each model generates validation actions tailored to evaluate the presence or absence of specific types of non-compliant content. Further evaluation techniques in generating validation actions using the meta-model 1104 are discussed with reference to FIGS. 12-14.

The set of generated validation actions 1108 is provided as input to an AI application 1110 in the form of a prompt. The AI application 1110 processes the validation actions 1108 and produces an outcome along with an explanation 1112 detailing how the outcome was determined. Subsequently, based on the outcome and explanation 1112 provided by the AI application 1110, the system can generate recommendations 1114 for corrective actions. The recommendations are derived from the analysis of the validation action outcomes and aim to address any identified issues or deficiencies. For example, if certain validation actions fail to meet the desired criteria due to specific attribute values or patterns, the recommendations can suggest adjustments to those attributes or modifications to the underlying processes.

For a bias detection model, such as the ML model discussed in FIG. 5, if certain attributes exhibit unexpected associations or distributions, the system can retrain the tested AI model with revised weighting schemes to better align with the desired vector constraints. In a toxicity model, such as the ML model discussed in FIG. 6, the corrective actions can include implementing post-processing techniques in the tested AI model to filter out responses that violate the vector constraints (e.g., filtering out responses that include the identified vector representations of the alphanumeric characters). Similarly, in an IP rights violation model, such as the ML model discussed in FIG. 7, the corrective actions can include implementing post-processing techniques in the tested AI model to filter out responses that violate the IP rights (e.g., filtering out responses including the predetermined alphanumeric characters).

In some implementations, based on the outcomes and explanations, the system applies predefined rules or logic to determine appropriate corrective actions. The rules can be established by users and can consider factors such as regulatory compliance, risk assessment, and business objectives. For example, if an application is rejected due to insufficient income, the system can recommend requesting additional financial documentation from the applicant.

In some implementations, the system can use machine learning models to generate recommendations. The models learn from historical data and past decisions to identify patterns and trends that indicate a set of actions the AI model can take to comply with the vector constraints. By training on a dataset of past corrective actions and the outcomes, the machine learning models can predict the most effective recommendations for new cases. Further discussion of Artificial Intelligence and training methods are discussed in FIG. 7. The recommendations 1114 can be automatically implemented as corrective actions 1116 by the system. The automated approach streamlines the process of addressing identified issues and ensures swift remediation of non-compliant content within AI models, enhancing overall compliance and reliability.

Certifying and Benchmarking Artifacts Using the Data Generation Platform

Figure 12:
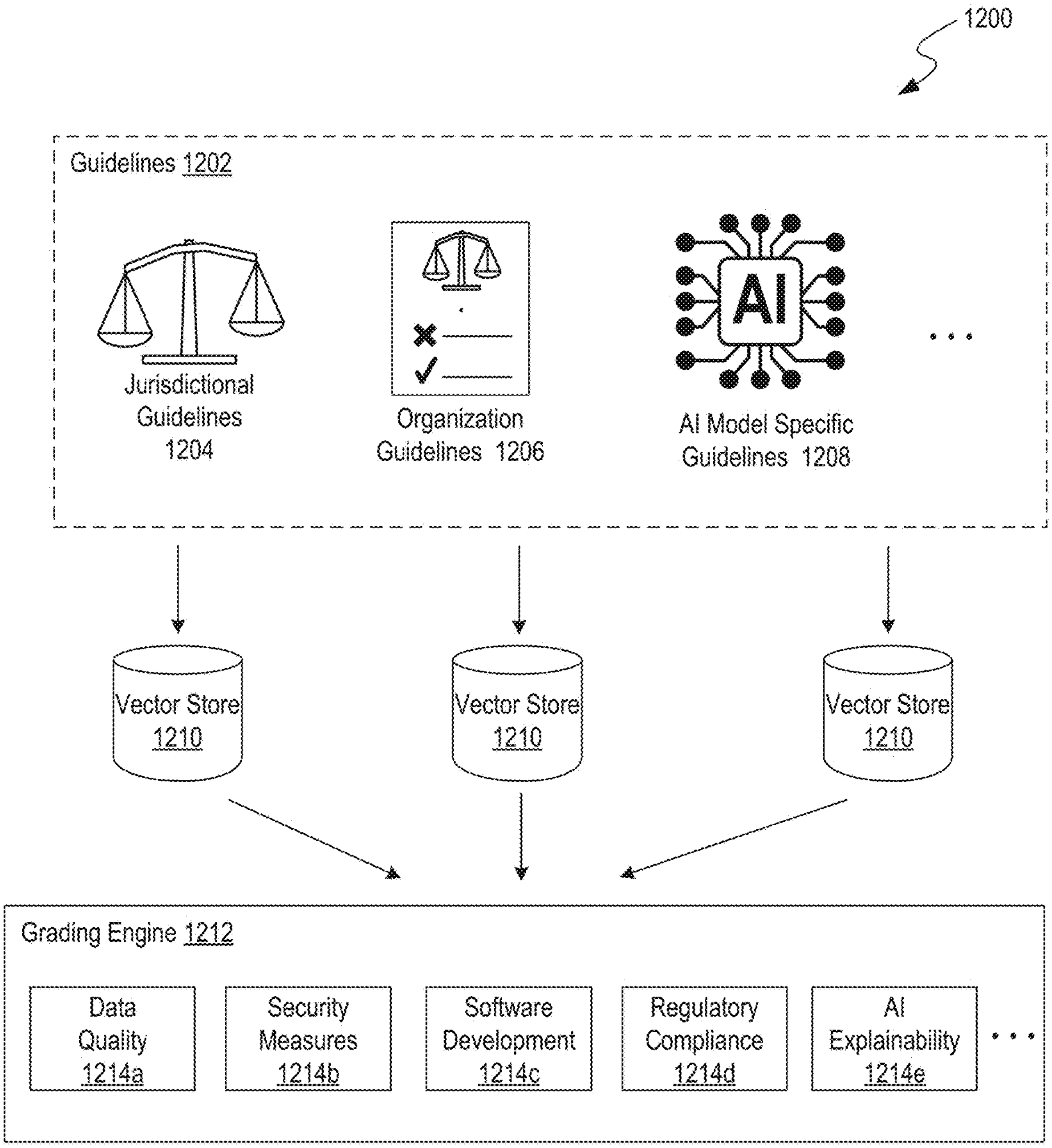
FIG. 12 is an illustrative diagram illustrating an example environment for grading an AI model using guidelines stored in a vector store.

FIG. 12 is an illustrative diagram illustrating an example environment 1200 for grading an AI model using guidelines stored in a vector store. Environment 1200 includes guidelines 1202, vector store 1210, and grading engine 1212, which includes test categories 1214*a-e*. Guidelines 1202 is the same as or similar to guidelines 902 illustrated and described in more detail with reference to FIG. 9. Grading engine 1212 is implemented using components of example devices 200 and computing devices 302 illustrated and described in more detail with reference to FIG. 2 and FIG. 3, respectively. Likewise, implementations of example environment 1200 can include different and/or additional components or can be connected in different ways.

The guidelines 1202 can be determined using obtained application domains (e.g., domain contexts) of the AI model. Guidelines 1202 can include various elements such as jurisdictional guidelines 1204, organizational guidelines 1206, and AI applications-specific guidelines 1208 (e.g., unsupervised learning, natural language processing (NLP), generative AI). Jurisdictional guidelines 1204 (e.g., governmental regulations) can include guidelines gathered from authoritative sources such as government websites, legislative bodies, and regulatory agencies. Jurisdictional guidelines 1204 can be published in legal documents or official publications and cover aspects related to the development, deployment, and use of AI technologies within specific jurisdictions. For example, the California Consumer Privacy Act (CCPA) in the United States mandates cybersecurity measures such as encryption, access controls, and data breach notification requirements to protect personal data. As such, AI developers must implement cybersecurity measures (such as encryption techniques) within the AI models they design and build to ensure the protection of sensitive user data and compliance with the regulations.

Organizational guidelines 1206 include internal policies, procedures, and guidelines established by organizations to govern software- and/or AI-related activities within the organization's operations. Organizational guidelines 1206 can be developed in alignment with industry standards, legal requirements, best practices, and organizational objectives. For example, organizational guidelines can require AI models to include certain access controls to restrict unauthorized access to the model's APIs or data and/or have a certain level of resilience before deployment.

In some implementations, guidelines 1202 can any one of text, image, audio, video or other computer-ingestible format. For guidelines 1202 that are not text (e.g., image, audio, and/or video), the guidelines 1202 can first be transformed into text. Optical character recognition (OCR) can be used for images containing text, and speech-to-text algorithms can be used for audio inputs. For example, an audio recording detailing security guidelines can be converted into text using a speech-to-text engine that allows the system to parse and integrate the text output into the existing guidelines 1202. Similarly, a video demonstrating a particular procedure or protocol can be processed to extract textual information (e.g., extracting captions).

In some implementations, in cases where transforming to text is not feasible or desirable, the system can use vector comparisons to handle non-text inputs directly. For example, images and audio files can be converted into numerical vectors through feature extraction techniques (e.g., by using Convolutional Neural Networks (CNNs) for images and using Mel-Frequency Cepstral Coefficients (MFCCs) for audio files). The vectors represent the corresponding characteristics of the input data (e.g., edges, texture, or shapes of the image, or the spectral features of the audio file). The system can then perform vector comparisons between the inputs and the outputs of the AI model to determine the satisfaction of the AI model with guidelines 1202. For example, an image depicting a secure login process can be compared against a library of vectors representing various secure and insecure login methods. If the image vector closely aligns with vectors in the secure category, it can be positively assessed; otherwise, the AI model can be flagged for review.

AI application-specific guidelines 1208 include guidelines that pertain to specific types of AI applications, such as unsupervised learning, natural language processing (NLP), and generative AI. Each type of AI application presents unique challenges and considerations in terms of best practices, compliance, ethical use, and/or regulatory adherence. For example, unsupervised learning algorithms, where the model learns from input data without labeled responses, may be subject to regulations that prevent bias and discrimination in unsupervised learning models. Natural language processing (NLP) technologies, which enable computers to understand, interpret, and generate human language, may be subject to specific regulations aimed at safeguarding user privacy. Generative AI, which autonomously creates new content, may focus on intellectual property rights, content moderation, and ethical use cases. AI developers may need to incorporate additional mechanisms for copyright protection, content filtering, and/or user consent management to comply with regulations related to generative AI technologies.

Best practices in the guidelines 1202 can include the resilience of the AI model or the data quality the AI model is trained on. For example, best practices for AI model resilience involve ensuring the AI model's ability to withstand cyber threats and adversarial attacks. The AI model is expected to implement security measures within the model architecture, such as encryption, access controls, and anomaly detection algorithms, to detect and mitigate potential security breaches or attacks. Further, ensuring the quality of training data can include thorough data quality assessments to identify and mitigate biases, anomalies, and inaccuracies in the training dataset. Data pre-processing techniques, such as data normalization and outlier detection, can be expected to be applied to enhance the quality and integrity of the training data, reducing the risk of security incidents.

The guidelines 1202 can be stored in a vector store 1210. The vector store 1210 stores the guidelines 1202 in a structured and accessible format (e.g., using distributed databases or NoSQL stores), which allows for efficient retrieval and utilization by the grading engine 1212. In some implementations, the guidelines 1202 are preprocessed to remove any irrelevant information, standardize the format, and/or organize the guidelines 1202 into a structured database schema. Once the guidelines 1202 are prepared, the guidelines 1202 can be stored in a vector store 1210 using distributed databases or NoSQL stores.

To store the guidelines 1202 in the vector store 1210, the guidelines 1202 can be encoded into vector representations for subsequent retrieval by the grading engine 1212. The textual data of the guidelines 1202 are transformed into numerical vectors that capture the semantic meaning and relationships between words or phrases in the guidelines 1202. For example, the text is encoded into vectors using word embeddings and/or TF-IDF encoding. Word embeddings, such as Word2Vec or GloVe, learn vector representations of words based on the word's contextual usage in a large corpus of text data. Each word is represented by a vector in a high-dimensional space, where similar words have similar vector representations. TF-IDF (Term Frequency-Inverse Document Frequency) encoding calculates the importance of a word in a guideline relative to the word's frequency in the entire corpus of guidelines 1202. For example, the system can assign higher weights to words that are more unique to a specific document and less common across the entire corpus.

In some implementations, the guidelines 1202 are stored using graph databases such as Neo4j™ or Amazon Neptune™. Graph databases represent data as nodes and edges, allowing for the modeling of relationships between guidelines 1202 to demonstrate the interdependencies. In some implementations, the guidelines 1202 are stored in a distributed file system such as Apache Hadoop™ or Google Cloud Storage™. These systems offer scalable storage for large volumes of data and support parallel processing and distributed computing. Guidelines 1202 stored in a distributed file system can be accessed and processed by multiple nodes simultaneously, which allows for faster retrieval and analysis by the grading engine 1212.

The vector store 1210 can be stored in a cloud environment hosted by a cloud provider, or a self-hosted environment. In a cloud environment, the vector store 1210 has the scalability of cloud services provided by platforms (e.g., AWS™, Azure™). Storing the vector store 1210 in a cloud environment entails selecting the cloud service, provisioning resources dynamically through the provider's interface or APIs, and configuring networking components for secure communication. Cloud environments allow the vector store 1210 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 1210 is stored on a private web server. Deploying the vector store 1210 in a self-hosted environment entails setting up the server with the necessary hardware or virtual machines, installing an operating system, and storing the vector store 1210. In a self-hosted environment, organizations have full control over the vector store 1210, allowing organizations to implement customized security measures and compliance policies tailored to the organization's specific needs. For example, organizations in industries with strict data privacy and security regulations, such as finance institutions, can mitigate security risks by storing the vector store 1210 in a self-hosted environment.

The grading engine 1212 accesses the guidelines 1202 from the vector store 1210 to initiate grading the AI model. The grading engine 1212 can establish a connection to the vector store 1210 using appropriate APIs or database drivers. The connection allows the grading engine 1212 to query the vector store 1210 and retrieve the relevant guidelines for the AI application under evaluation. Frequently accessed guidelines 1202 can be stored in memory, which allows the grading engine 1212 to reduce latency and improve response times for compliance assessment tasks.

In some implementations, only the relevant guidelines are retrieved based on the specific AI application under evaluation. For example, metadata tags, categories, or keywords associated with the AI application can be used to filter the guidelines 202. The grading engine 1212 evaluates the AI application against the retrieved guidelines 1202.

Assessment domains, such as test categories 1214*a-e*, encompass various aspects of evaluating the AI model's performance and adherence to predefined guidelines. Each assessment domain is designed to assess a specific context, such as data quality 1214*a*, security measures 1214*b*, software development 1214*c*, regulatory compliance 1214*d*, and/or AI explainability 1214*e*. The test categories 1214*a-e* can overlap in the corresponding contexts.

Data quality 1214*a* evaluates the quality, accuracy, and integrity of the data used to train and operate the AI model. The test category includes tests to identify biases, anomalies, and inconsistencies in the training data. Security measures 1214*b* assesses the AI model's resilience against cyber threats and vulnerabilities. The test category includes tests for data encryption, access controls, vulnerability management, threat detection, and remediation capabilities to protect against cyberattacks and unauthorized access to sensitive information. Software development 1214*c* evaluates the robustness and reliability of the software development practices used to build and deploy the AI model. For example, software development 1214*c* includes tests for code quality, version control, testing methodologies, and deployment procedures to ensure the integrity and stability of the AI model throughout its lifecycle. The regulatory compliance 1214*d* test category assesses the AI model's adherence to relevant legal and regulatory requirements governing its use and deployment. Regulatory compliance 1214*d* includes tests to verify compliance with data protection laws, industry regulations, and ethical guidelines, ensuring that the AI model operates within the boundaries of applicable regulations. The AI explainability test category focuses on the AI model's ability to provide transparent and interpretable explanations for its decisions and predictions. For example, the test category includes tests to evaluate the model's reasoning behind the model's outputs and ensure that the reasoning does not violate other guidelines. Additional test categories 1214*a-e* can include any context of the AI model that the user desires to evaluate. For example, the grading engine 1212 can evaluate performance efficiency by assessing the efficiency and optimization of the AI model's performance, and include tests for resource utilization, latency, and scalability. Additionally, the test categories 1214*a-e* can include testing an AI model's resilience against adversarial attacks and attempts to manipulate its outputs.

Figure 13:
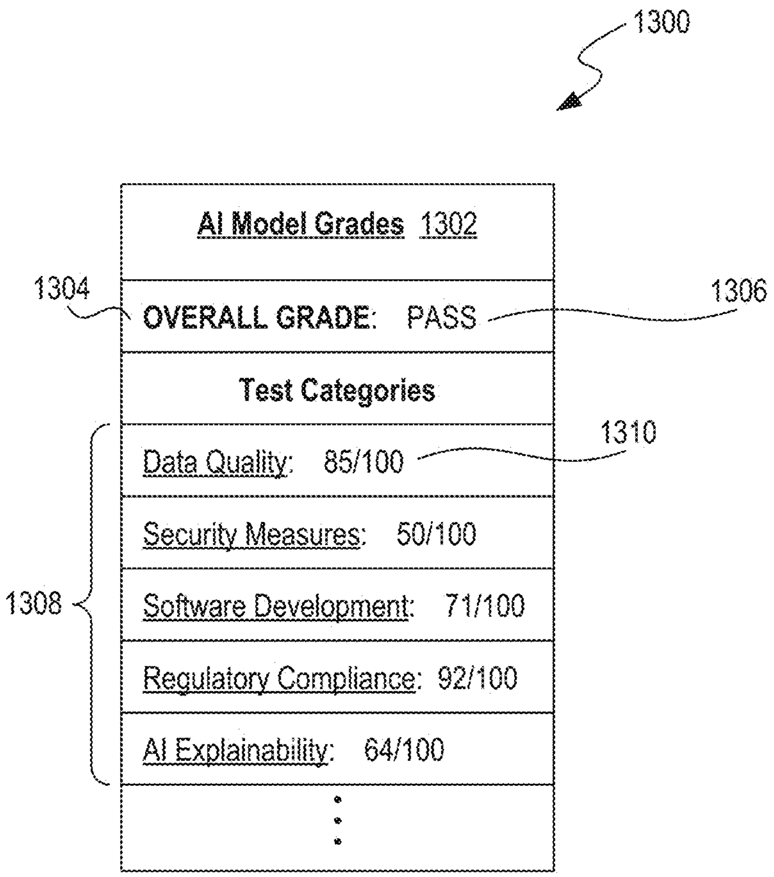
FIG. 13 is an illustrative diagram illustrating an example environment presenting application-domain-specific grades generated for an AI model.

FIG. 13 is an illustrative diagram illustrating an example environment 1300 presenting application-domain-specific grades generated for an AI model. Environment 1300 includes an overall set of grades 1302, an overall grade 1304, a binary indicator 1306, test categories 1308, and individual grades 1310. Test categories 1308 is the same as or similar to test categories 1214*a-e* illustrated and described in more detail with reference to FIG. 12. Likewise, implementations of example environment 1300 can include different and/or additional components or can be connected in different ways.

The overall set of grades 1302 presents a cumulative view of the AI model's grading evaluation. The overall set of grades 1302 is a holistic assessment of the AI model's capabilities, reliability, and adherence to predefined guidelines (e.g., guidelines 1202 in FIG. 12). In some implementations, the overall set of grades 1302 includes an approximation of the weights, biases, and/or activation functions that the AI model should follow to satisfy the guidelines. The overall set of grades can indicate what the AI model currently follows. A comparison between the weights, biases, and/or activation functions of what the AI model should follow and what the AI model currently follows can be used to identify discrepancies between the desired performance and the actual performance of the AI model. Weights in an AI model can be defined as the parameters within the model that transform input data used by the AI model to produce the output. Biases are additional parameters that allow the model to adjust the output along with the weighted sum of the inputs to the neuron, and activation functions determine the output of a neural network node.

Using the assessments that test the AI model against the guidelines, the system can identify the variations and, in some implementations, suggest adjustments in the weights and biases or recommend different activation functions that would potentially enhance the model's performance. For instance, if an AI model uses a ReLU (Rectified Linear Unit) activation function but performs poorly in specific scenarios, the system can suggest experimenting with a different function like Leaky ReLU or SELU (Scaled Exponential Linear Unit). By adjusting the weights, biases, and/or activation functions, developers can refine the AI model to align more closely with the desired level of satisfaction with the guidelines. For example, suggestions can include using a universal data format, tagging metadata, or implementing more security measures in storing data.

Overall grade 1304 is an aggregated representation of the individual grades 1310 assigned to the AI model based on its performance in different test categories. Overall grade 1304 provides a single, summarized rating of the AI model's performance. This overarching grade offers users a concise representation of the AI model's overall quality, allowing for quick assessments and decision-making. In some implementations, a binary indicator 1306 can be included to signify whether the AI model meets specific criteria or thresholds, such as regulatory compliance or certification requirements (e.g., "PASS," "FAILED").

Test categories 1308 includes the areas evaluated by the grading engine, which can include assessment domains such as data quality, security measures, software development practices, regulatory compliance, and AI explainability. Further examples of test categories 1214*a-e* and test category 1402 are described in further detail with reference to FIG. 12 and FIG. 14, respectively. Each test category of the test categories 1308 provides users with insights into the AI model's performance in key areas, helping them identify strengths, weaknesses, and areas for improvement. The assessment-domain-specific grades, or individual grades 1310, received from each test category 1308 are described in further detail with reference to assessment-domain-specific grade 1408 in FIG. 14.

In some implementations, tiered indicators may be included to categorize the AI model into different tiers or levels based on its performance. These tiered indicators offer a structured framework for classifying AI models according to predefined criteria, such as performance thresholds for each tier or tiers based on compliance standards. By categorizing AI models into tiers, users can identify differences in performance and make informed decisions about their suitability for specific applications or use cases (e.g., filtering AI models by tier). The benchmarking process provides context for the overall set of grades and helps organizations assess the model's performance relative to other models.

Figure 14:
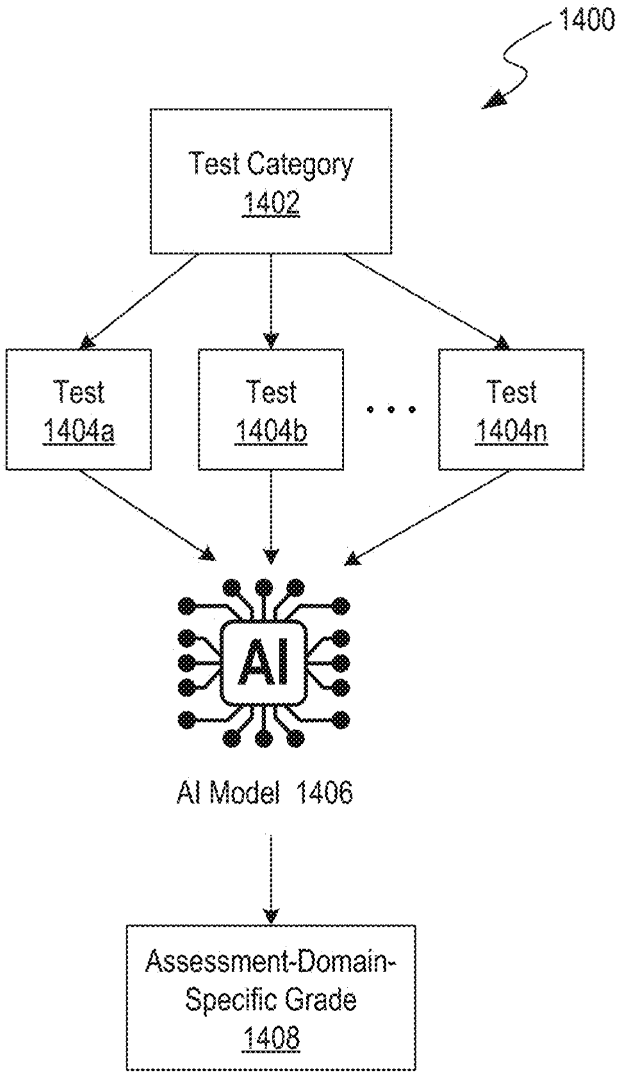
FIG. 14 is an illustrative diagram illustrating an example environment for assigning a grade to an AI model for a test category.

FIG. 14 is an illustrative diagram illustrating an example environment 1400 for assigning a grade to an AI model for a test category. Environment 1400 includes a test category 1402, tests 1404*a-n*, AI model 1406, and assessment-domain-specific grade 1408. Test categories 1402 is the same as or similar to one or more test categories 1214*a-e* and test categories 1308 illustrated and described in more detail with reference to FIG. 12 and FIG. 13. Assessment-domain-specific grade 1408 is the same as or similar to one or more individual grades 1310 illustrated and described in more detail with reference to FIG. 13. Implementations of example environment 1400 can include different and/or additional components or can be connected in different ways.

Test category 1402 defines the specific criteria against which the AI model's performance will be evaluated. Test categories such as data quality, security measures, software development practices, regulatory compliance, or AI explainability may be included, depending on the objectives and requirements of the evaluation. Further examples of test categories 1214*a-e* are described with reference to FIG. 12.

Within each test category, a series of tests 1404*a-n* are conducted to assess the AI model's adherence to and/or satisfaction with the corresponding predefined guidelines of the test category. The series of tests 1404*a-n* evaluate different aspects or sub-components of the test category 1402 and can provide a multi-prompt assessment of the AI model's performance across various dimensions. For example, in a data quality test category, individual tests may focus on aspects such as bias detection, data completeness, or outlier detection. The bias test examines the AI model's training data for any biases that may lead to discriminatory or unfair outcomes. The bias test analyzes the distribution of data across different demographic groups and identifies any patterns of bias that may exist. The data completeness test evaluates the completeness of the AI model's training data by assessing whether the metadata of the training data has missing values, incomplete records, and/or other gaps in the data that could affect the AI model's performance. To test for outliers, the AI model's training data is evaluated for anomalies that deviate significantly from the norm. For example, one or more of the tests testing for outliers can aim to identify data points that are unusually large, small, or different from the majority of the dataset, which could potentially skew the AI model's predictions.

The system can assess the data quality by evaluating the AI model's performance metrics such as accuracy, precision, recall, and F1 score. For example, if an AI model consistently misclassifies certain types of data or shows a significant drop in performance in specific scenarios, this could indicate underlying data quality issues. Additionally, the system can identify out-of-distribution data, regime changes, or shifts in data distribution that could affect model performance. Further, the system can identify the AI model's use case limitations. For example, a model trained extensively on financial data from a specific region may not perform well when applied to data from a different region due to differences in regulatory environments. Analyzing the AI model's limitations helps in setting realistic expectations for the AI model's performance and identifying areas where additional data or retraining might be necessary.

In some implementations, for prompt-based AI models such as large language models (LLMs), prompts are input into the AI model 1406 to initiate the tests 1404*a-n* within each category. The prompts can take various forms depending on the nature of the test. For example, the prompt can be a simulated scenario of particular security incidents, or specific queries about the AI model's model architecture. For example, in a test category focusing on threat detection, prompts may simulate suspicious network activity or attempt to breach system security. The AI model 1406 receives the prompts of the tests 1404*a-n* defined by the test category 1402 and generates responses or outcomes based on the AI model's 1406 algorithms. For instance, in response to a prompt about identifying potential malware in network traffic, the AI model 1406 may analyze packet headers, payload contents, and behavioral patterns to make a determination, and output whether or not there is malware and why the AI model came to that conclusion (e.g., abnormal behavior patterns). The responses are then compared against predefined expectations or benchmarks to determine the AI model's 1406 performance in each test. The comparison process assesses how closely the AI model's 1406 responses align with expected responses.

Based on the results of the tests conducted within the test category 1402, an assessment-domain-specific grade 1408 is assigned to the AI model. This grade reflects the AI model's overall performance in meeting the criteria outlined by the test category, providing users with valuable insights into its strengths, weaknesses, and areas for improvement within that specific dimension. For example, a high grade can indicate that the AI model 1406 demonstrates strong capabilities in detecting and mitigating security threats, while a lower grade can signal areas of improvement or potential vulnerabilities that need to be addressed.

Dynamic Multi-Model Monitoring of Artifacts Using the Data Generation Platform

Figure 15:
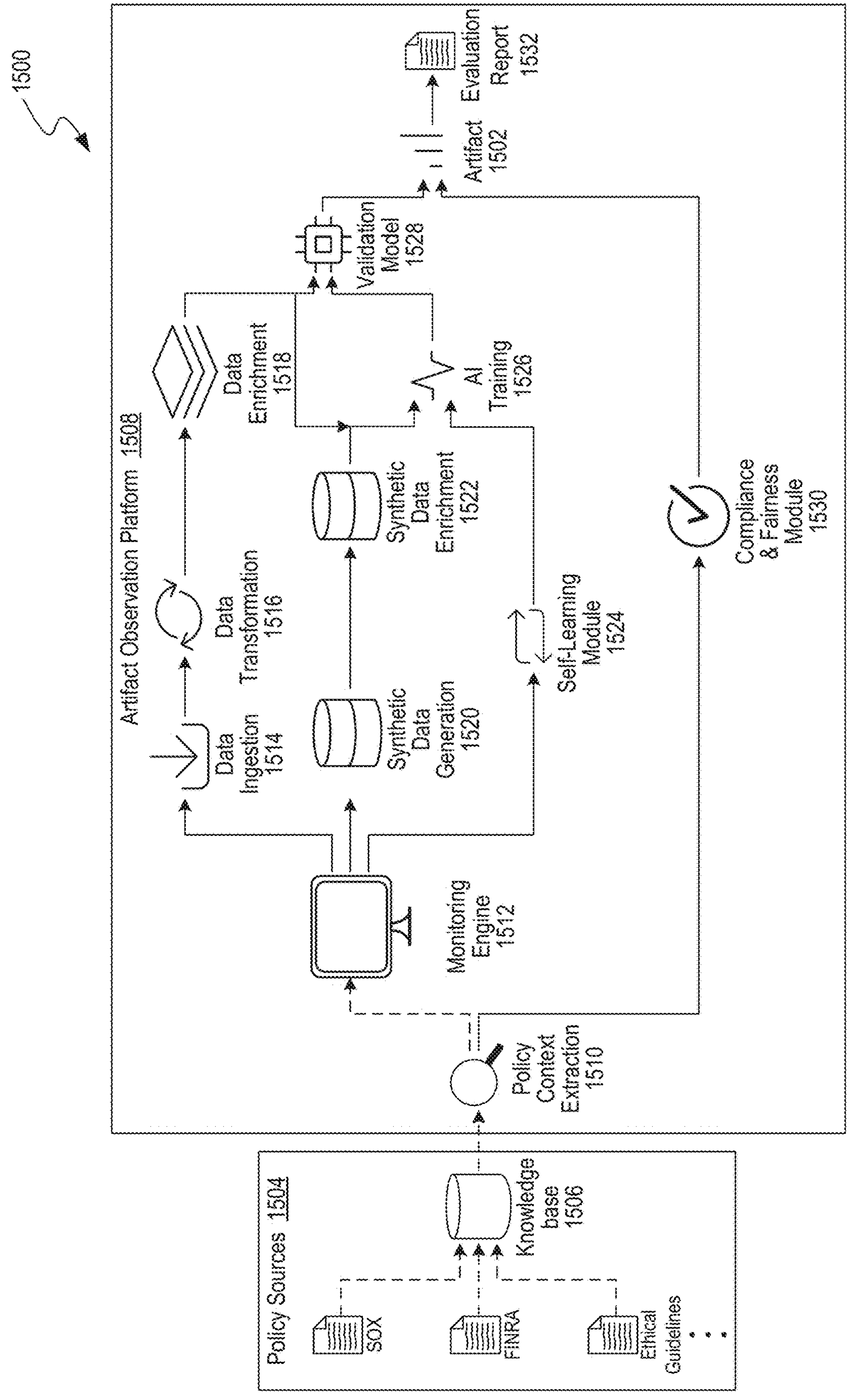
FIG. 15 is a block diagram illustrating an example environment for dynamic multi-model monitoring and validation of a generative artificial intelligence model.

FIG. 15 is a block diagram illustrating an example environment 1500 for dynamic multi-model monitoring and validation of a generative artificial intelligence model. Environment 1500 includes artifact 1502, policy sources 1504 (which can include knowledge base 1506), and artifact observation platform 1508. Artifact observation platform 1508 can include policy context extraction module 1510, monitoring engine 1512, data ingestion module 1514, data transformation module 1516, data enrichment module 1518, synthetic data generation module 1520, synthetic data enrichment module 1522, self-learning module 1524, AI training module 1526, validation model 1528, compliance and fairness module 1530, and evaluation report 1532. Implementations of example environment 1500 can include different and/or additional components or can be connected in different ways.

The artifact 1502 can be thought of as the subject to be monitored and validated, such as an output generated by the generative AI model. For example, the artifact 1502 can be any form of data, such as text, images, or other multimedia content, produced by the AI model. In some implementations, artifact 1502 can include structured data outputs, such as tables or graphs. For example, an artifact can be a text summary of a legal document, an image generated from a text description, and/or a graph representing data trends. The artifact 1502 is evaluated against various compliance and performance metrics by the artifact observation platform 1508 using methods discussed with reference to FIG. 18.

The artifact 1502 can be evaluated for compliance against the criteria within the policy sources 1504. The policy sources 1504 encompass a range of regulatory and policy documents that provide guidelines and standards for AI model compliance. The policy sources can be the same as or similar to guidelines 902 discussed in further detail with reference to FIG. 9. The policy sources 1504 can include internal company policies, industry standards, legal regulations, and/or other guidelines. For example, policy sources 1504 can include ethical guidelines that ensure AI models operate within moral boundaries, such as avoiding bias and ensuring fairness. Additionally, policy sources 1504 can include regulations from financial regulatory bodies like the Financial Industry Regulatory Authority (FINRA). Compliance with FINRA regulations can include adhering to standards for transparency, accuracy, and/or investor protection. Policy sources can further include regulations such as the Sarbanes-Oxley Act (SOX), which sets requirements for financial reporting and corporate governance. For example, AI models used in financial reporting are required to comply with SOX standards relating to the accuracy and integrity of financial data. In some implementations, policy sources 1504 can integrate real-time updates from regulatory bodies to ensure the AI model remains compliant with the latest standards using methods discussed with reference to FIG. 18. The knowledge base 1506 within policy sources 1504 stores structured and unstructured data related to the policies. For example, structured data can be structured databases of regulations, while unstructured data can be text documents or emails.

The artifact 1502 can be evaluated for compliance against the criteria within the policy sources 1504 using the artifact observation platform 1508. The artifact observation platform 1508 can be the same as or similar to data generation platform 102 discussed with reference to FIG. 1. The artifact observation platform 1508 can be implemented using components of example devices 200 and computing devices 302 illustrated and described in more detail with reference to FIG. 2 and FIG. 3, respectively. In some implementations, the artifact observation platform 1508 can be distributed across multiple servers. For example, the artifact observation platform 1508 can be a multi-model superstructure within the data generation platform 102 that monitors and validates artifact 1502 against the criteria in policy sources 1504. In some implementations, the artifact 1502 can be a model output of a model within the artifact observation platform 1508 itself.

To enable the artifact observation platform 1508 to evaluate the artifact 1502, the policy context extraction module 1510 identifies the criteria within the policy sources 1504. In particular, the policy context extraction module 1510 within the artifact observation platform 1508 extracts criteria and/or context within the knowledge base 1506 containing the policy sources 1504 to provide assessment metrics and threshold values of the assessment metrics in which to use to evaluate artifact 1502. The policy context extraction module 1510 can extract criteria and/or context by using methods discussed with reference to FIG. 18. The extracted information can be used by the monitoring engine 1512 to continuously observe the artifact 1502 and detect deviations from expected behavior. For example, the monitoring engine 1512 can task one or more validation model(s) 1528 to detect bias, inaccuracies, and non-compliance with guidelines of the artifact 1502. Methods of determining which validation model(s) 1528 to evaluate artifact 1502 is discussed in further detail with reference to FIG. 18.

The data ingestion module 1514 collects data from various sources, including for example historical AI model outputs, external dataset (e.g., publicly available data, industry benchmarks), the criteria extracted from the policy context extraction module 1510, user interaction data, system logs of the model generating the artifact 1502 and/or the validation model 1528, and so forth. The ingested data can be processed by the data transformation module 1516 to transform the ingested data using techniques such as normalization (e.g., scaling numerical data to a standard range, such as 0 to 1), aggregation (e.g., summarizing/averaging data points), and/or other preprocessing techniques. In some implementations, the data transformation module 1516 can include data anonymization (e.g., replacing personally identifiable information (PII) such as names and social security numbers with pseudonyms or hashed values) to protect sensitive information. The data enrichment module 1518 can supplement the transformed data by adding additional context or metadata, such as appending geolocation data to provide geographical context (e.g., a guideline only affects artifacts within a certain region), or adding timestamps to provide temporal context for particular guidelines (e.g., a guideline only affects artifacts within a certain range of timestamps). For example, the additional context/metadata can be appended as a new field in the dataset.

The synthetic data generation module 1520 creates new data samples to test the AI model that generated the artifact 1502 under various scenarios. The synthetic data generation module 1520 can produce artificial data that mimics real-world conditions, allowing the data generation platform 102 to evaluate the model's performance in different situations. In some implementations, the synthetic data generation module 1520 can use generative adversarial networks (GANs) to create realistic synthetic data. To generate synthetic data for various types of ingested data, the synthetic data generation module 1520 can use GANs to create synthetic outputs that mimic the patterns and distributions observed in the ingested data by training the generator on historical data to produce statistically similar samples. Further, the synthetic data generation module 1520 can create synthetic data that adheres to the specified policies and guidelines using information identified in the policy context extraction module 1510. The synthetic data enrichment module 1522 can further refine the synthetic data, ensuring that the synthetic data accurately represents the conditions it is meant to simulate. For example, the synthetic data enrichment module 1522 can add noise to the synthetic data to simulate real-world variability or integrate contextual metadata, such as geolocation information or temporal markers.

The self-learning module 1524 enables the data generation platform to learn from past monitoring results and continuously refine its ability to detect and address issues by training the monitoring model (e.g., the validation model 1528) on data that becomes available over time. In some implementations, the self-learning module 1524 can incorporate reinforcement learning algorithms (e.g., Q-learning or policy gradient methods) to improve the accuracy and consistency of its decision-making process. The AI training module 1526 module trains the validation model 1528 using the enriched data of the data enrichment module 1518, the synthetic data from the synthetic data enrichment module 1522, and updated adjustments from the self-learning module 1524.

The trained validation model 1528 and the compliance and fairness module 1530 can be thought of as a part of the suite of monitoring models used to evaluate the artifact 1502. In some implementations, the compliance and fairness module 1530 contains pre-trained models to evaluate the artifact 1502 for compliance with the guidelines (e.g., policy sources 1504). For example, the monitoring models can evaluate the artifact 1502 (e.g., an AI model's outputs) against predefined metrics. For example, the monitoring models can assess the quality, accuracy, and compliance of the generated artifacts 1502 using methods discussed with reference to FIG. 18. The compliance and fairness module 1530 can be the same as the validation model 1528, or a separate model to ensure that the AI model adheres to ethical guidelines and regulatory standards within the policy context extraction module 1510 and knowledge base 1506. In some implementations, the suite of models including the compliance and fairness module 1530 and the validation model 1528 can monitor the artifact 1502 using a changed architecture discussed with reference to FIG. 18. The evaluation report 1532 can be thought of as the compliance indicator of the artifact 1502. In some implementations, the evaluation report 1532 can include confidence scores or other metrics to indicate the reliability of the output. The evaluation report 1532 can provide a summary of the monitoring and validation process, including any issues detected and the corrective actions suggested or taken.

Figure 16:
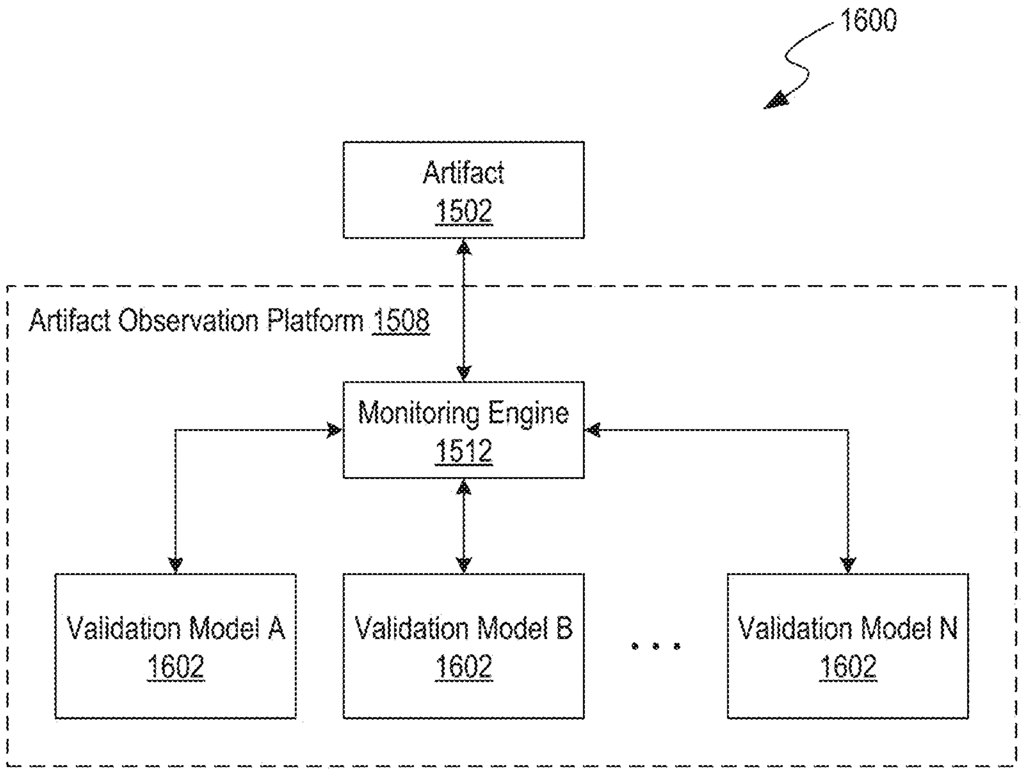
FIG. 16 is a block diagram illustrating an example architecture of the artifact observation platform of FIG. 15.

FIG. 16 is a block diagram illustrating an example architecture 1600 of the artifact observation platform 1508 of FIG. 15. Architecture 1600 can ingest artifact 1502 via artifact observation platform 1508, which can include monitoring engine 1512 and validation models 1602. Implementations of example architecture 1600 can include different and/or additional components or can be connected in different ways.

The monitoring engine 1512 can assess the artifact 1502 using a suite of validation models 1602, which include one or more types of AI models. Validation models 1602 can be the same as or similar to validation model 1528 or model(s) within the compliance and fairness module 1530. The validation models 1602 can be domain-specific and/or generic. Generic validation models 1602 can be used to evaluate the artifact 1502 against a series of common assessment metrics and standards, while domain-specific validation models can be tailored to specific types of artifacts 1502 or industries (e.g., trained on domain-specific data). For example, a generic validation model can assess the readability of text outputs or the accuracy of numerical data. Domain-specific validation models for the financial industry, for example, can evaluate the compliance of financial reports with regulations such as the SOX and/or FINRA guidelines. The monitoring engine 1512 continuously observes the AI model's outputs (e.g., artifacts 1502) and uses the validation models 1602 to assess the artifact against various compliance and performance metrics. For example, the monitoring engine 1512 can use a generic validation model to assess the readability of a text output and a domain-specific validation model to evaluate the compliance of a financial report with SOX regulations. Within the monitoring engine 1512, there can be a suite of monitoring models, each determining the validation models 1602 to be used using different methods discussed with reference to FIG. 18 (e.g., random, predefined intervals).

Figure 17:
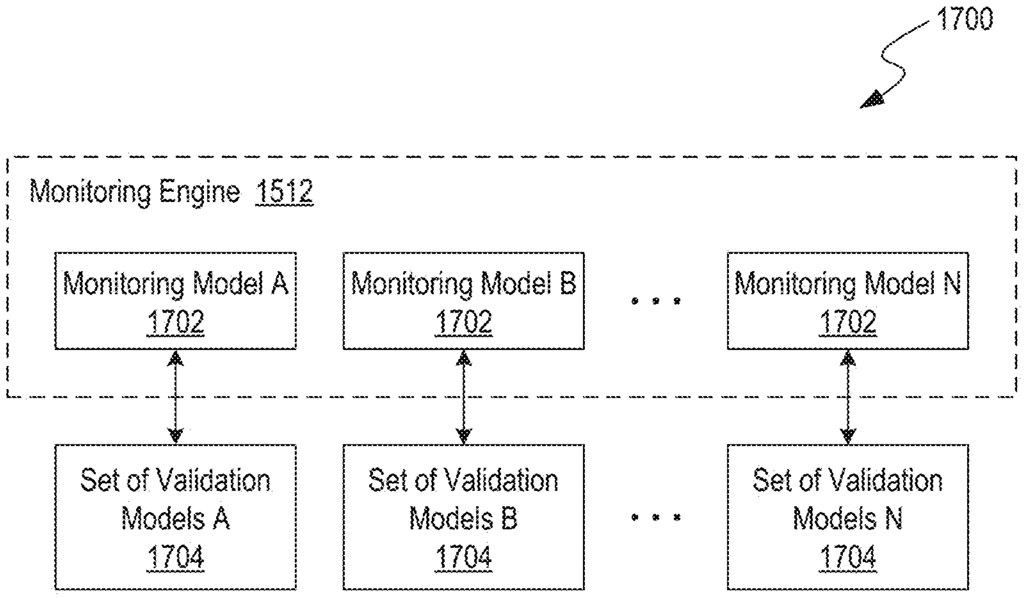
FIG. 17 is a block diagram illustrating an example architecture of a suite of monitoring models in the monitoring engine of FIG. 15.

FIG. 17 is a block diagram illustrating an example architecture 1700 of a suite of monitoring models 1702 in the monitoring engine 1512 of FIG. 15. Architecture 1700 includes monitoring engine 1512, monitoring models 1702, and validation models 1704. Implementations of example architecture 1700 can include different and/or additional components or can be connected in different ways.

Each monitoring model 1702 in the suite can have its own set of validation models 1704 (e.g., validation model 1528) or share a single set of validation models 1704 with other monitoring models 1702. The particular monitoring model (s) 1702 can be assigned to validate artifact 1502 either randomly, based on predefined criteria, through a rotating schedule, and so forth. In some implementations, the assignment of monitoring models can be dynamic, adapting to the specific needs of the artifact 1502 being evaluated. For example, an artifact 1502 that is image based can automatically be assigned a monitoring model 1702 specialized in image artifacts. Each monitoring model 1702 can validate the artifact 1502 using different methods. For example, one monitoring model 1702 can validate the artifact 1502 using a majority vote between the validation models 1704, whereas another monitoring model 1702 can use a singular validation model 1704 to validate the artifact 1502. In some implementations, similarly to that of the validation models 1704, the monitoring models 1702 can also be generic or domain-specific. The monitoring models 1702 and/or validation models 1704 can operate either in parallel or sequentially. When running in parallel, multiple models-whether identical or different-simultaneously analyze the same input data. In some implementations, different portions of the input data can be assigned to different models. On the other hand, when running sequentially, the models can operate individually or be arranged in an end-to-end pipeline where the output of one model serves as the input for the next.

In a random assignment, the monitoring engine 1512 can select a monitoring model 1702 (or multiple) from the suite of monitoring models 1702 at random to evaluate the artifact to ensure that the artifact is evaluated from different perspectives, reducing the risk of bias or overfitting. In a predefined assignment, the monitoring engine 1512 can select a monitoring model 1702 based on specific criteria, such as the type of artifact 1502 and/or particular policy sources (e.g., policy sources 1504 in FIG. 15). For example, a financial report artifact can be evaluated by a monitoring model specialized in financial compliance, while a medical record artifact can be evaluated by a monitoring model focused on healthcare regulations. In a rotating assignment, the monitoring engine 1512 can cycle through the suite of monitoring models 1702 to prevent any single monitoring model from being overfitted. In some implementations, the monitoring engine 1512 can dynamically adapt the assignment of monitoring models 1702 based on the specific needs of the artifact 1502 using methods discussed with reference to FIG. 18. For example, if the artifact 1502 is a complex document with multiple sections, the monitoring engine 1512 can assign different monitoring models to evaluate each section. Further, in some implementations, the system reduces overfitting by using k-fold cross-validation (i.e., dividing the dataset into k subsets and trains the model k times, each time using a different subset as the validation set), regularization techniques (i.e., L1 and L2 regularization to penalize large coefficients to prevent fitting noise, data augmentation (i.e., artificially expanding the training data by creating modified versions of existing data, feature selection (i.e., identifying and retaining only the most relevant features to reduce model complexity, dropout (i.e., randomly deactivating a fraction of neurons during training to prevent over-reliance on specific neurons, and/or ensembling techniques (e.g., such as bagging, stacking, and boosting to combine predictions from multiple models).

Figure 18:
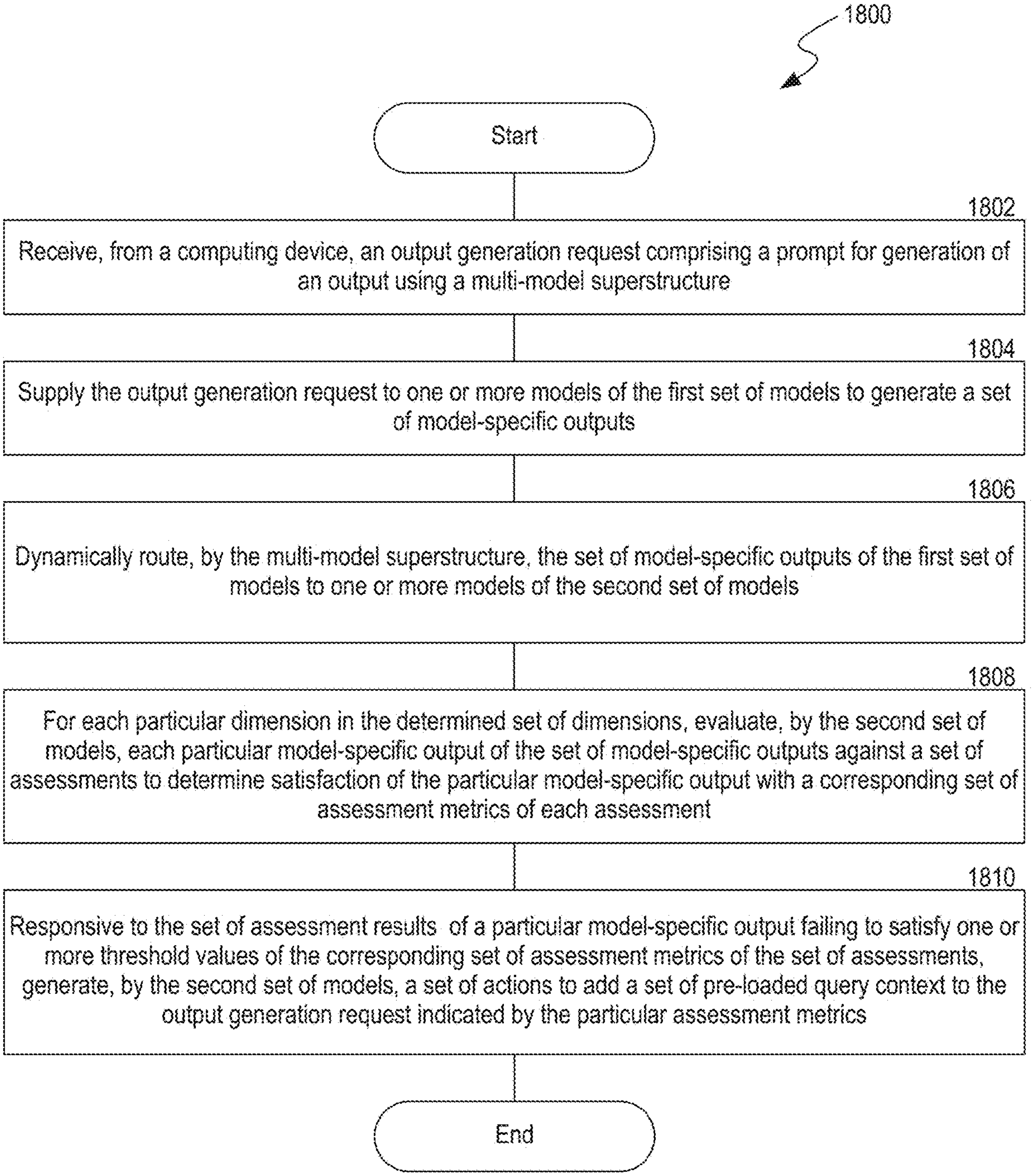
FIG. 18 is a flow diagram illustrating a process of dynamic multi-model monitoring and validation of a generative artificial intelligence model.

FIG. 18 is a flow diagram illustrating a process 1800 of dynamic multi-model monitoring and validation of a generative AI model. In some implementations, the process 1800 is performed by components of example devices 200 and computing devices 302 illustrated and described in more detail with reference to FIG. 2 and FIG. 3, respectively. The process 1800 can be performed using one or more components or methods described in FIGS. 1-17. Specific models enumerated in the process 1800, such as the first, second, and third set of models, can be the same as or different from each other (e.g., the first and second can be same, the first and second can be different, and so forth). Implementations of process 1800 can include different and/or additional operations or can perform the operations in different orders.

In operation 1802, a multi-model superstructure can receive, from a computing device, an output generation request comprising a prompt for generation of an output using the multi-model superstructure. The multi-model superstructure can include a first set of models and a second set of models. The first set of models can be thought of as the monitored model(s) generating the artifact (e.g., an output based on the prompt or other output generation request such as artifact 1502). The models in the multi-model superstructure can include various types of generative models (e.g., language models, image generation models, data synthesis models). The second set of models can be thought of as the monitoring model(s) evaluating and validating the artifact generated by the first set of models (e.g., checking accuracy, detecting biases, ensuring compliance with regulations such as the validation model 1528 and validating models 1704). In some implementations, the multi-model superstructure can use a modular architecture to enable easy integration and replacement of models within the multi-model superstructure. Each model can be encapsulated within a microservice, which communicates with other microservices via APIs. Additionally, the multi-model superstructure can use containerization technologies, such as Docker, to package and deploy the models.

In operation 1804, the multi-model superstructure can supply the output generation request to one or more models of the first set of models to generate a set of model-specific outputs. The multi-model superstructure can determine which models of the first set to use based on the nature of the prompt, the desired output type, and/or the specific capabilities of each model. In some implementations, the multi-model superstructure can determine the most appropriate models from the first set of models to handle the output generation request using factors such as the complexity of the prompt, the historical performance of the models, and/or the specific requirements of the task. For example, if the prompt includes creating a visual representation, the multi-model superstructure can select an image generation model.

In some implementations, the multi-model superstructure can use a load balancer to distribute the output generation request across multiple models in the first set of models. The load balancer can dynamically allocate resources based on the current workload of each model to prevent any single model from becoming a bottleneck. In some implementations, the multi-model superstructure can use a parallel processing framework to supply the output generation request to multiple models simultaneously. The multi-model superstructure can aggregate the model-specific outputs into a single output. For example, if the prompt involves generating a multi-faceted report, different sections of the report can be generated by different models in parallel, and the multi-model superstructure can combine these sections into a final document. In some implementations, the multi-model superstructure can use a cascading model architecture, where the output of one model in the first set of models is used as the input for another model. For example, an initial language model can generate a rough draft of a document, and a subsequent model can refine the language and improve the coherence of the text.

In operation 1806, the multi-model superstructure can dynamically route, by the multi-model superstructure, a set of artifacts (e.g., the model-specific outputs) of the first set of models to one or more models of the second set of models. For example, the multi-model superstructure can determine a set of dimensions (e.g., test category 1308 in FIG. 13) of the set of model-specific outputs in which the set of model-specific outputs will be evaluated against. Dimensions can be thought of as the specific aspects or attributes of the artifact that need to be evaluated. For example, in the case of a text document, dimensions can include grammar, style, factual accuracy, coherence, and/or relevance. In the case of a financial report, dimensions can include compliance with financial regulations and/or accuracy of numerical data. In some implementations, the multi-model superstructure can use a predefined set of dimensions based on the type of artifact. For example, a legal document can have predefined dimensions such as legal compliance, clarity of language, and/or logical consistency. In some implementations, the multi-model superstructure can enable users to specify the dimensions that need to be evaluated. Users can provide a list of dimensions and/or the specific criteria for each dimension.

To dynamically determine a dimension from an artifact, the multi-model superstructure can parse the artifact using tokenization and part-of-speech tagging to break down the text into smaller components. For text-based artifacts, the multi-model superstructure can use NLP models that use word embeddings, which are dense vector representations of words that capture semantic and syntactic meanings based on context. For example, the word "bank" can have different embeddings in the contexts of "river bank" and "financial bank." The multi-model superstructure can apply clustering algorithms, such as k-means or hierarchical clustering, to group similar features and identify common themes or dimensions. Additionally, supervised ML models, trained on labeled datasets, can predict relevant dimensions based on the artifact's characteristics and historical data. For instance, a labeled dataset for text classification can include particular words or phrases and their corresponding guidelines. The multi-model superstructure can use the labeled datasets to train models to recognize and predict dimensions such as criteria within relevant guidelines. In some implementations, the multi-model superstructure can use a hierarchical approach to determine the dimensions of the artifact. The multi-model superstructure can start with high-level dimensions and progressively refine the dimensions into more specific sub-dimensions. For example, a high-level dimension for a text document can be compliance with a broader guideline which can be further refined into sub-dimensions such as narrower organizational-specific guidelines.

In some implementations, criteria from relevant guidelines are used to determine the dimensions of the artifact. The relevant guidelines can be predetermined, or dynamically determined based on the artifact. To dynamically determine relevant guidelines for an artifact, the multi-model superstructure can evaluate metadata tags, keywords, or categories associated with stored guidelines to filter and retrieve those pertinent to the specific context and requirements of the application. Using NLP, the multi-model superstructure can parse the text of the guidelines to identify key terms and phrases that denote regulatory obligations, such as "patient privacy" for healthcare applications. The terms can act as filters to exclude non-relevant guidelines. Additionally, guidelines can be stored in vector space, allowing the multi-model superstructure to calculate the similarity between vectors representing domain-specific terms and other related terms, applying a similarity threshold to filter out insufficiently similar terms.

For each particular dimension in the determined set of dimensions, the multi-model superstructure can determine the one or more models of the second set of models used test the particular dimension. The multi-model superstructure can include a third set of models used to dynamically route the artifacts to the second set of models. The third set of models can be interchangeable with the second set of models, meaning that sometimes the third set of models can be used to validate the artifact, and sometimes the second set of models can be used to validate the artifact.

In some implementations, the models in the multi-model superstructure include 1) general-purpose models and/or 2) domain-specific models. The artifacts can be routed to the one or more models of the second set of models trained on data sharing a common domain with one or more artifacts of the set of artifacts. The domain can indicate 1) an area of knowledge, such as healthcare or finance, 2) a data type, such as text, image, or numerical data, 3) a guideline type, such as regulatory compliance or industry standards, and/or 4) a type of task, such as classification, prediction, or summarization. The multi-model superstructure can categorize/tag the artifacts from the first set of models based on the artifact's domain's characteristics (e.g., keywords identified using NLP). For instance, if the artifact is a text document related to healthcare, it is tagged with the "healthcare" domain. The multi-model superstructure can use the tags to route the artifacts to the models in the second set.

The models in the first, second, and/or third set can be trained to execute specific types of tasks through transfer learning, where a pre-trained model is adapted to a specific task using a smaller, task-specific dataset. Transfer learning uses the knowledge gained from a large, general-purpose dataset to improve performance on a related but more specialized task. For example, a pre-trained language model like BERT, initially trained on a vast corpus of general text, can be fine-tuned on a specialized dataset including financial regulations, compliance guidelines, and historical compliance reports by adjusting the model's weights and parameters to improve interpretation of the specific language and requirements of financial compliance documents. The adapted model can perform tasks such as identifying non-compliant sections in financial reports, extracting regulatory requirements, and/or suggesting modifications to ensure compliance.

In some implementations the one or more models of the second set of models are determined randomly to introduce variability. By randomly selecting models from the second set, the multi-model superstructure can avoid potential biases that may arise from consistently using the same models. The random selection process can be implemented using algorithms such as random sampling or stochastic processes to ensure that each model in the second set has an equal probability of being chosen. The random determination can be combined with other selection criteria, such as performance metrics or resource availability, to balance randomness with practical considerations.

In some implementations, the multi-model superstructure can establish a predefined schedule to change the one or more models in the second set of models. The predefined schedule can be established using time intervals, such as changing models every hour or day, and/or a number of output generation requests processed, such as switching models after every 100 requests. Using the predefined schedule, the multi-model superstructure can determine the one or more models of the second set of models. By adhering to this schedule, the multi-model superstructure ensures that different models are periodically utilized, which can help in balancing the load, preventing model overfitting, and introducing variability in the outputs. The scheduling algorithm used can be, for example, a round-robin scheduling algorithm that assigns a fixed time slice to each model in a cyclic order. A weighted round-robin algorithm can allocate more processing time to higher-performing models based on assigned weights. Further, the scheduling algorithm used can include priority scheduling to ensure that preferred models are used more frequently by assigning them higher priority levels. Least Recently Used (LRU) scheduling can be used to ensure periodic usage of all models by selecting the model(s) that habe been used the least recently. Dynamic scheduling can adjust the shifting of the models based on real-time metrics such as model performance and system load.

In some implementations, the multi-model superstructure can dynamically select the one or more models of the second set of models using the third set of models and using dimension-specific features of the particular dimension being evaluated. For instance, if the dimension being evaluated is related to financial data, the third set of models can extract features such as transaction types, regulatory requirements, and market conditions. The features can be used to match the artifact with models in the second set that are specifically trained on similar financial datasets. The selection process can be implemented (e.g., using the third set of models) using machine learning algorithms, such as decision trees, which are a type of supervised learning algorithm that splits the data into branches based on feature values, ultimately leading to a decision node that indicates the most suitable model. Alternatively, the third set of models can map the artifact to the most suitable model(s) in the second set by minimizing a loss function, which measures the difference between the predicted and actual model selections. When a new artifact is received, the multi-model superstructure can input certain features (e.g., artifact type, artifact timestamp, artifact location, last used models in the second set, predefined schedules, metadata of capabilities and specializations of models in the second set, other metadata, and so forth) into the trained third set of models, which then predicts the most suitable model(s) from the second set of models to use to validate the artifact. Dynamically determining the monitoring models enables the multi-model superstructure to use, for example, different monitoring models on different artifact types (e.g., format, domain such as technical field) depending on the monitoring model's performance (e.g., better performing monitoring models for a particular artifact type is used on the particular artifact).

In addition to dynamically selecting models based on dimension-specific features, the multi-model superstructure can vary the monitoring models using dynamic balancing based on model performance metrics such as latency, accuracy, and/or precision. For instance, monitoring models with lower latency and higher accuracy can be prioritized for real-time applications, while those with higher precision can be selected for tasks executed by higher risk applications. Furthermore, the superstructure can use previous results by clustering artifacts with similar characteristics and thus select monitoring models that have historically performed well on similar artifacts.

In operation 1808, the second set of models can, for each particular dimension in the determined set of dimensions, evaluate each particular model-specific output of the set of model-specific outputs against a set of assessments to determine satisfaction of the particular model-specific output with a corresponding set of assessment metrics of each assessment. In some implementations, the set of assessments are predefined for each dimension. In some implementations, the multi-model superstructure dynamically maps assessments to the particular dimensions. For example, the multi-model superstructure can evaluate historical data and identify patterns that indicate which metrics are most related for different types of artifacts and/or determined dimensions. For example, clustering algorithms like K-means can group similar artifacts/dimensions and identify common characteristics. In some implementations, the multi-model superstructure can use a rules engine to define and manage the logic for dynamically selecting assessment metrics. The rules engine can evaluate the artifact and/or dimensions, and apply predefined rules to determine the most appropriate metrics. For example, a rule can state that if the artifact is related to financial transactions, the system prioritizes accuracy and compliance metrics.

Once the assessment metrics are defined, the system can implement a scoring mechanism to evaluate each artifact, such as a model-specific output. For instance, a rule-based system can apply predefined rules to check if the artifact meets the required assessment metric values. In some implementations, the system can use ensemble methods to combine the evaluations from multiple models in the second set of models. For example, the multi-model superstructure can use multiple models trained different subsets of the data and average their predictions.

In some implementations, the second set of models can construct the set of assessments including a set of seed assessments testing the particular dimension of the particular model-specific output against threshold values of the corresponding set of assessment metrics. For example, in a financial context, seed assessments can include checks for basic accuracy, compliance with the broadest regulations, and initial risk assessments. The threshold values for these metrics can be established based on industry standards, regulatory requirements, and historical performance data. The second set of models can compare values of the corresponding set of assessment metrics of the particular model-specific output with the threshold values of the corresponding set of assessment metrics by calculating the actual values of the assessment metrics for the output and checking whether the values satisfy the predefined thresholds. For example, the system can check that all PII, such as names, addresses, social security numbers, and other sensitive information, is properly anonymized or pseudonymized in the artifact.

Using the comparison, the second set of models can generate a set of seed assessment results indicating a degree of satisfaction of the particular model-specific output with the threshold values of the corresponding set of assessment metrics of the set of seed assessments. The degree of satisfaction can be represented using various scales, such as binary (e.g., pass/fail, 0/1), categorical (e.g., high/medium/low, one through five), or continuous (e.g., percentage or score).

Using the set of seed assessment results, the second set of models can dynamically construct a set of subsequent assessments within the set of assessments constructed subsequent to the set of seed assessments. For example, if the seed assessments indicate that the output meets basic accuracy requirements but falls short in financial compliance, the subsequent assessments can include more detailed financial compliance checks, such as verifying adherence to specific regulatory clauses or conducting a more detailed risk analysis. The second set of models can apply the set of subsequent assessments of the set of assessments to the particular model-specific output to generate a set of overall assessment results based on a degree of satisfaction of the particular model-specific output with the threshold values of the assessment metrics of: (i) the set of seed assessments and (ii) the set of subsequent assessments. The overall assessment results can be aggregated using various techniques, such as weighted averaging, where more prioritized metrics are given higher weights.

In some implementations, the multi-model superstructure can determine whether the particular model-specific output fails to satisfy one or more particular assessment metrics of the set of assessments using a majority vote between the one or more models of the second set of models. Each model in the second set of models can independently evaluate the artifact against the predefined assessment metrics. A majority voting mechanism is applied to decide whether the artifact meets the criteria of the dimensions. For instance, if three models are used and two of them determine that the output fails to meet a specific compliance metric, the majority vote can indicate a failure for that metric, reducing the likelihood of errors and biases that might occur if a single model were used.

In operation 1810, responsive to the set of assessment results of a particular model-specific output failing to satisfy one or more threshold values of the corresponding set of assessment metrics of the set of assessments, the second set of models can generate a set of actions to add a set of pre-loaded query context to the output generation request indicated by the particular assessment metrics. For example, if the assessment results indicate that the artifact fails to comply with certain regulatory requirements, the second set of models can augment the original request with additional context or queries that target these specific issues. This pre-loaded query context can include supplementary data, clarifying questions, or specific instructions to generate a new artifact that better complies with the threshold values of the corresponding set of assessment metrics.

The generated set of actions include any task, computer-executable or not, to improve the degree of satisfaction of the artifact with the threshold values of the assessment metrics. For instance, the actions can include additional data validation steps, where the system cross-references the artifact with external databases to ensure data accuracy and integrity. Another action can be enrichment, where additional data is fetched and integrated into the artifact directly (e.g., adding a required clause that was not identified in a contract) and/or the first set of models (e.g., identifying bias from the artifact and thus adding a weight into the model to bias the prediction a certain direction to remove the bias). The system can further trigger formatting and standardization actions to ensure that the artifact adheres to specific presentation guidelines or regulatory formats. The system can further initiate review and approval processes, where the artifact is routed to subject matter experts for manual validation and feedback (e.g., human-in-the-loop).

In some implementations, using the generated set of actions, the multi-model superstructure can update the output generation request by automatically triggering an automated workflow indicated by the generated set of actions. The automated workflow can include executing the generated set of actions. For example, the multi-model superstructure can define the generated set of actions as discrete steps within a workflow definition file. The workflow definition specifies each step's action and parameters, such as querying a database, using NLP to generate clarifying questions, and/or updating the request with the new context. Once the workflow definition is created, a workflow engine (e.g., APACHE AIRFLOW, AWS STEP FUNCTIONS) can execute each step in the defined sequence. As each step is completed, the workflow engine can update the state of the workflow and passes the intermediate results to the next step.

In some implementations the multi-model superstructure can automatically take corrective measures on both the model output and the monitored model that generated the output, based on the compliance indicators in the evaluation report 1532. For example, if the evaluation report 1532 indicates non-compliant results, the superstructure can modify the input data of the monitored model(s) to drive desired changes, such as adjusting data distributions or incorporating additional data sources (i.e., knowledge bases). Additionally, the superstructure can initiate a retraining process for the monitored model(s) to guide the selection of new training data that addresses the indicated issues. For example, the superstructure can retrain the monitored model(s) with reduced or different input variables to eliminate those contributing to non-compliance.

For example, using the updated output generation request, the multi-model superstructure can supply the updated output generation request to the one or more models of the first set of models to generate a set of updated model-specific outputs. The second set of models can re-evaluate each particular updated model-specific output of the updated model-specific outputs against the set of assessments to determine satisfaction of the particular updated model-specific output with the corresponding set of assessment metrics of each assessment.

In some implementations, the set of model-specific outputs is a first set of model-specific outputs. The multi-model superstructure can provide the output generation request loaded with the pre-loaded query context to the one or more models of the first set of models to generate a second set of model-specific outputs. Responsive to the second set of model-specific outputs satisfying each assessment metrics of the set of assessments, the multi-model superstructure can automatically transmit, to the computing device, the second set of model-specific outputs.

In some implementations, for each particular artifact of the set of artifacts, the multi-model superstructure can generate for display on the computing device, a layout indicating the set of assessment results. The layout can include a first representation of the particular artifact (e.g., model output, document, report, data visualization) and a second representation of the corresponding set of actions generated. The second representation can be displayed as a graphical representation, a list and/or a flowchart, showing one or more of the generated actions.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A non-transitory computer-readable storage medium comprising instructions thereon, wherein the instructions when executed by at least one data processor of a system, cause the system to:

obtain an artifact set generated using a first AI model set within a multi-model superstructure, wherein the multi-model superstructure includes: (i) the first AI model set and (ii) a second AI model set to test the first AI model set;

assign, by the multi-model superstructure, the artifact set of the first AI model set to one or more AI models of the second AI model set, wherein the one or more AI models of the second Al model set are determined randomly or pseudo-randomly;

input one or more artifacts of the artifact set into the second AI model set to use at least one hardware processor to output an indication of satisfaction of the one or more artifacts with an assessment metric set of an assessment set; and responsive to a particular artifact failing to satisfy one or more assessment metrics of the assessment set, generate, by the second AI model set, an action set to modify one or more AI models of the first AI model set using the indication of satisfaction of the one or more artifacts with the assessment metric set of the assessment set.

2. The non-transitory computer-readable storage medium of claim 1, wherein the action set includes one or more of: 1) parameters of one or more AI models of the first AI model set indicated by the one or more assessment metrics or 2) an output generation request configured to generate the artifact set using the first AI model set.

3. The non-transitory computer-readable storage medium of claim 2, further comprising:

using the generated action set, update the output generation request by automatically triggering one or more computer-implemented commands indicated by the generated action set.

4. The non-transitory computer-readable storage medium of claim 1 further comprising:

cause display of a layout including one or more of: (1) a first representation of the artifact set, (2) a second representation of corresponding indications of satisfaction of the artifact set with the assessment metric set of the assessment set and (2) a second representation of corresponding action sets generated.

5. A computer-implemented method for multi-model monitoring and validation of an artificial intelligence model, the method comprising:

obtaining an artifact set generated using a first AI model set within a multi-model superstructure, wherein the multi-model superstructure includes: (i) the first AI model set and (ii) a second AI model set to test the first AI model set;

assigning, by the multi-model superstructure, the artifact set of the first AI model set to one or more AI models of the second AI model set, wherein the one or more AI models of the second AI model set are determined based on a predefined schedule;

inputting one or more artifacts of the artifact set into the second AI model set to use at least one hardware processor to output an indication of satisfaction of the one or more artifacts with an assessment metric set of an assessment set; and generating, by the second AI model set, an action set to modify one or more AI models of the first AI model set using the indication of satisfaction of the one or more artifacts with the assessment metric set of the assessment set.

6. The computer-implemented method of claim 5, further comprising:

obtaining a dimension set of the artifact set against which to evaluate the artifact set; and for one or more dimensions in the dimension set, identifying, by the multi-model superstructure, the one or more AI models of the second AI model set used to test the one or more dimensions.

7. The computer-implemented method of claim 5, further comprising:

causing display of a layout including (1) a first representation of the artifact set and (2) a second representation of the action set.

8. The computer-implemented method of claim 5, wherein the action set includes one or more of: 1) parameters of one or more AI models of the first AI model set indicated by the assessment metric set or 2) an output generation request configured to generate the artifact set using the first AI model set.

9. The computer-implemented method of claim 8, further comprising:

using the generated action set, update the output generation request by automatically triggering one or more computer-implemented commands indicated by the action set.

10. The computer-implemented method of claim 5, wherein the first AI model set and the second AI model set are the same.

11. The computer-implemented method of claim 5, wherein the predefined schedule is configured to rotate a plurality of AI models based on one or more of: (1) time intervals or (2) a number of output generation requests processed by the second AI model set.

12. A computer-implemented method for multi-model monitoring and validation of an artificial intelligence model, the method comprising:

obtaining an artifact set generated using a first AI model set within a multi-model superstructure, wherein the multi-model superstructure includes: (i) the first AI model set and (ii) a second AI model set to test the first AI model set;

assigning, by the multi-model superstructure, the artifact set of the first AI model set to one or more AI models of the second AI model set;

inputting one or more artifacts of the artifact set into the second AI model set to use at least one hardware processor to output an indication of satisfaction of the one or more artifacts with an assessment metric set of an assessment set, wherein the second AI model set is configured to determine whether a particular assessment metric value fails to satisfy a particular threshold metric value using a majority vote between the one or more AI models of the second AI model set; and generating, by the second AI model set, an action set to modify one or more AI models of the first AI model set using the indication of satisfaction of the one or more artifacts with the assessment metric set of the assessment set.

13. The computer-implemented method of claim 12, wherein the first AI model set and the second AI model set are different.

14. The computer-implemented method of claim 12, wherein the artifact set is a first artifact set, further comprising:

providing the first AI model set with a pre-loaded query context to generate a second artifact set using the first AI model set.

15. The computer-implemented method of claim 12, wherein the one or more AI models of the second AI model set are determined randomly or pseudorandomly.

16. The computer-implemented method of claim 12, wherein the one or more AI models of the second AI model set are determined based on a predefined schedule.

17. A computer-implemented method for multi-model monitoring and validation of an artificial intelligence model, the method comprising:

obtaining an artifact set generated using a first AI model set within a multi-model superstructure, wherein the multi-model superstructure includes: (i) the first AI model set and (ii) a second AI model set to test the first AI model set, wherein the second AI model set includes a domain-specific AI model set;

assigning, by the multi-model superstructure, the artifact set of the first AI model set to one or more AI models of the second AI model set, wherein the artifact set is routed to the one or more AI models of the second AI model set trained on data sharing a common domain with one or more artifacts of the artifact set;

inputting one or more artifacts of the artifact set into the second AI model set to use at least one hardware processor to output an indication of satisfaction of the one or more artifacts with an assessment metric set of an assessment set; and generating, by the second AI model set, an action set to modify one or more AI models of the first AI model set using the indication of satisfaction of the one or more artifacts with the assessment metric set of the assessment set.

18. The computer-implemented method of claim 17, wherein the one or more AI models of the second AI model set are determined randomly or pseudorandomly.

19. The computer-implemented method of claim 17, wherein the one or more AI models of the second AI model set are determined based on a predefined schedule.

20. The computer-implemented method of claim 17, wherein the second AI model set is configured to determine whether a particular assessment metric value fails to satisfy a particular threshold metric value using a majority vote between the one or more AI models of the second AI model set.

* * * * *